United States Patent
Sasaki et al.

(10) Patent No.: US 10,627,034 B2
(45) Date of Patent: Apr. 21, 2020

(54) MANIFOLD APPARATUS

(71) Applicant: SMC CORPORATION, Chiyoda-ku (JP)

(72) Inventors: Hideo Sasaki, Tsukubamirai (JP); Ken Gunji, Moriya (JP)

(73) Assignee: SMC CORPORATION, Chiyoda-ku (JP)

( * ) Notice: Subject to any disclaimer, the term of this patent is extended or adjusted under 35 U.S.C. 154(b) by 119 days.

(21) Appl. No.: 15/657,617

(22) Filed: Jul. 24, 2017

(65) Prior Publication Data
US 2018/0023743 A1    Jan. 25, 2018

(30) Foreign Application Priority Data

Jul. 25, 2016  (JP) .................................. 2016-145072

(51) Int. Cl.
| | |
|---|---|
| *F16L 41/03* | (2006.01) |
| *F16K 27/00* | (2006.01) |
| *F24D 3/10* | (2006.01) |
| *E03B 7/09* | (2006.01) |

(52) U.S. Cl.
CPC ............ *F16L 41/03* (2013.01); *F16K 27/003* (2013.01); *F24D 3/1075* (2013.01); *E03B 7/09* (2013.01)

(58) Field of Classification Search
CPC ...... F16L 41/03; F16K 27/003; F24D 3/1075; Y10T 137/87885; F15B 13/087; E03B 7/09
See application file for complete search history.

(56) References Cited

U.S. PATENT DOCUMENTS

| | | | | |
|---|---|---|---|---|
| 3,556,147 A | * | 1/1971 | Sizer ....................... | F15B 13/04 137/614.11 |
| 3,747,623 A | * | 7/1973 | Greenwood ........ | F15B 13/0839 137/269 |
| 4,712,578 A | * | 12/1987 | White ..................... | F16L 41/03 137/269 |

(Continued)

FOREIGN PATENT DOCUMENTS

| | | |
|---|---|---|
| JP | 2004-197766 A | 7/2004 |
| JP | 2004-316667 A | 11/2004 |

(Continued)

OTHER PUBLICATIONS

Office Action dated Mar. 19, 2019 in Japanese Patent Application No. 2016-145072, 6 pages (with unedited computer generated English translation).

(Continued)

*Primary Examiner* — Seth W. Mackay-Smith
(74) *Attorney, Agent, or Firm* — Oblon, McClelland, Maier & Neustadt, L.L.P.

(57) ABSTRACT

A manifold apparatus includes a plurality of manifold blocks which are coupled together in a line. In each of the manifold blocks, an axial line of a branch port is deviated from an axial line of a main port in a direction perpendicular to a coupling direction in which the manifold blocks are coupled together. The plurality of manifold blocks are configured to be coupled together in a state where one of the adjacent manifold blocks is inverted 180° from the other of the adjacent manifold blocks in a direction perpendicular to the axial direction of the branch port and the coupling direction.

12 Claims, 44 Drawing Sheets

(56) References Cited

U.S. PATENT DOCUMENTS

| | | | | |
|---|---|---|---|---|
| 4,782,852 A * | 11/1988 | Legris | F16L 37/252 | 137/269 |
| 4,848,391 A * | 7/1989 | Miller | E03C 1/023 | 137/270 |
| 5,279,331 A * | 1/1994 | Fernandez | F15B 13/0839 | 137/596 |
| 6,058,975 A * | 5/2000 | Hui-Chen | F16K 11/20 | 137/271 |
| 6,874,756 B2 * | 4/2005 | Hawkins | F15B 13/0817 | 137/553 |
| 6,929,032 B2 * | 8/2005 | Rehder | F16K 27/003 | 137/884 |
| 7,198,063 B2 * | 4/2007 | Abe | F16K 27/003 | 137/271 |
| 7,973,923 B2 * | 7/2011 | Wynn | F16L 41/03 | 356/246 |
| 8,061,385 B2 * | 11/2011 | Kaitsuka | F16K 17/04 | 137/614 |
| 8,109,297 B2 * | 2/2012 | Cimberio | E03B 7/072 | 137/315.06 |
| 8,202,040 B2 * | 6/2012 | Koenig | F04B 53/16 | 415/151 |
| 8,336,573 B2 * | 12/2012 | Ellis | F16L 41/03 | 137/271 |
| 8,356,632 B2 * | 1/2013 | Tiberghien | F16L 27/093 | 137/561 A |
| 8,469,059 B1 * | 6/2013 | Forst | F16K 11/0716 | 137/595 |
| 2007/0044574 A1 * | 3/2007 | Kawamoto | E03B 7/09 | 73/861.74 |
| 2008/0012290 A1 * | 1/2008 | Hamada | F16L 41/03 | 285/124.5 |
| 2011/0168285 A1 * | 7/2011 | Seabolt | F16K 27/003 | 137/884 |

FOREIGN PATENT DOCUMENTS

| | | |
|---|---|---|
| JP | 2007-056975 | 3/2007 |
| JP | 2012-097776 A | 5/2012 |
| WO | WO 2009/072873 A2 | 6/2009 |

OTHER PUBLICATIONS

Office Action dated Oct. 23, 2019 issued in Japanese Patent Application No. 2016-145072 w/English translation, 8 pages.

* cited by examiner

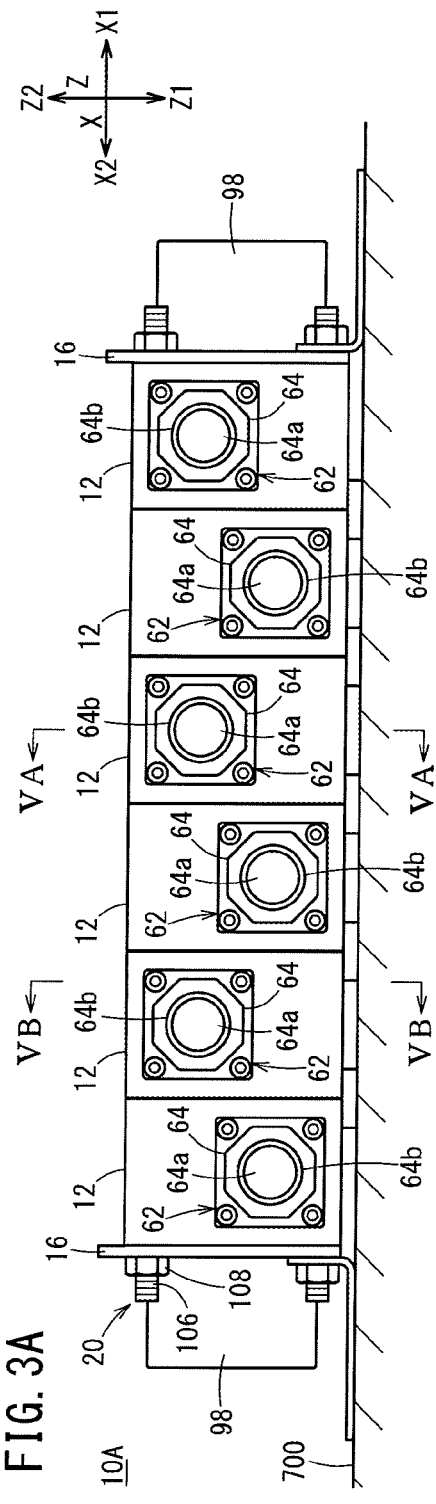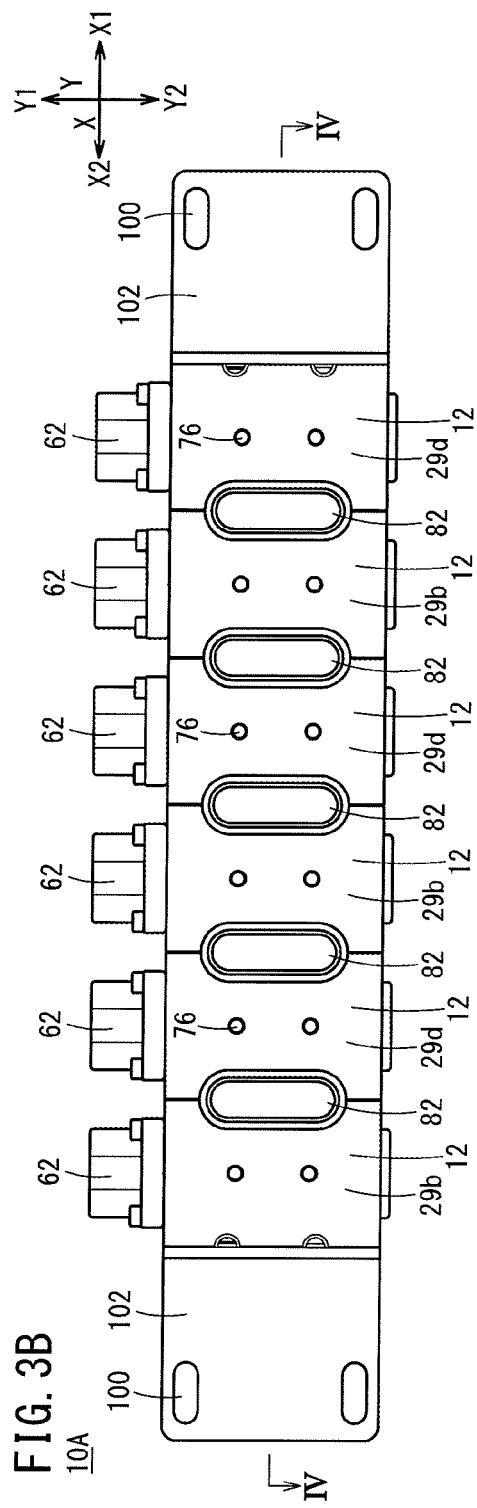

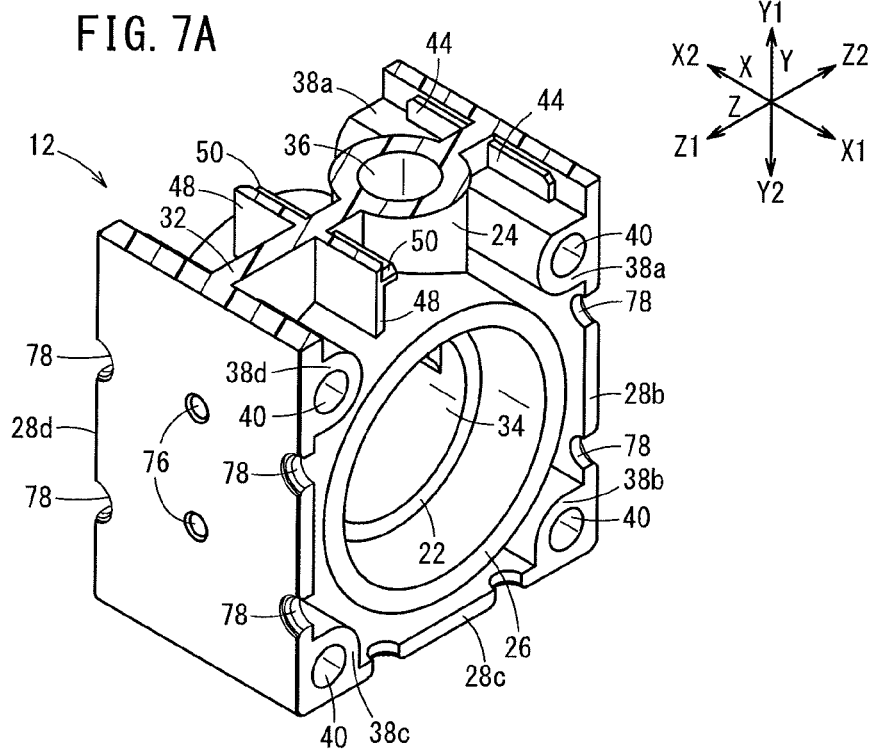
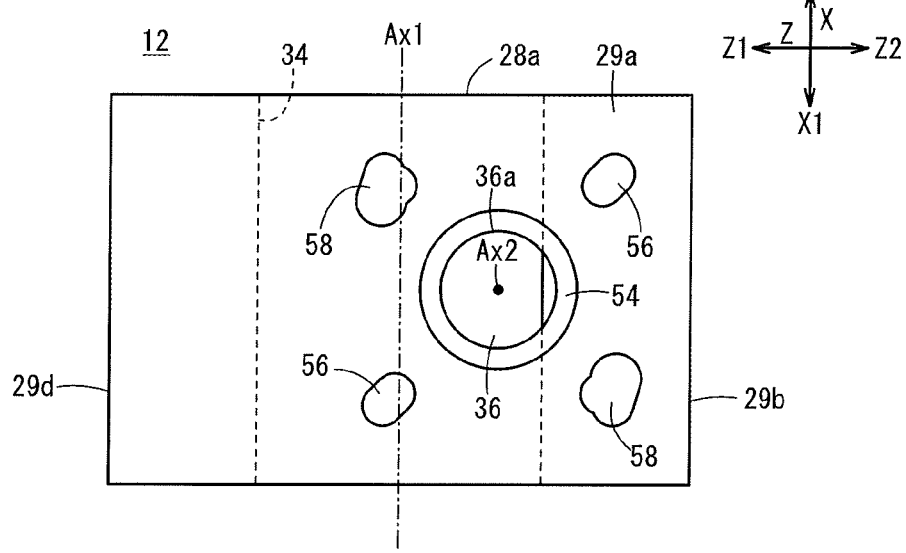

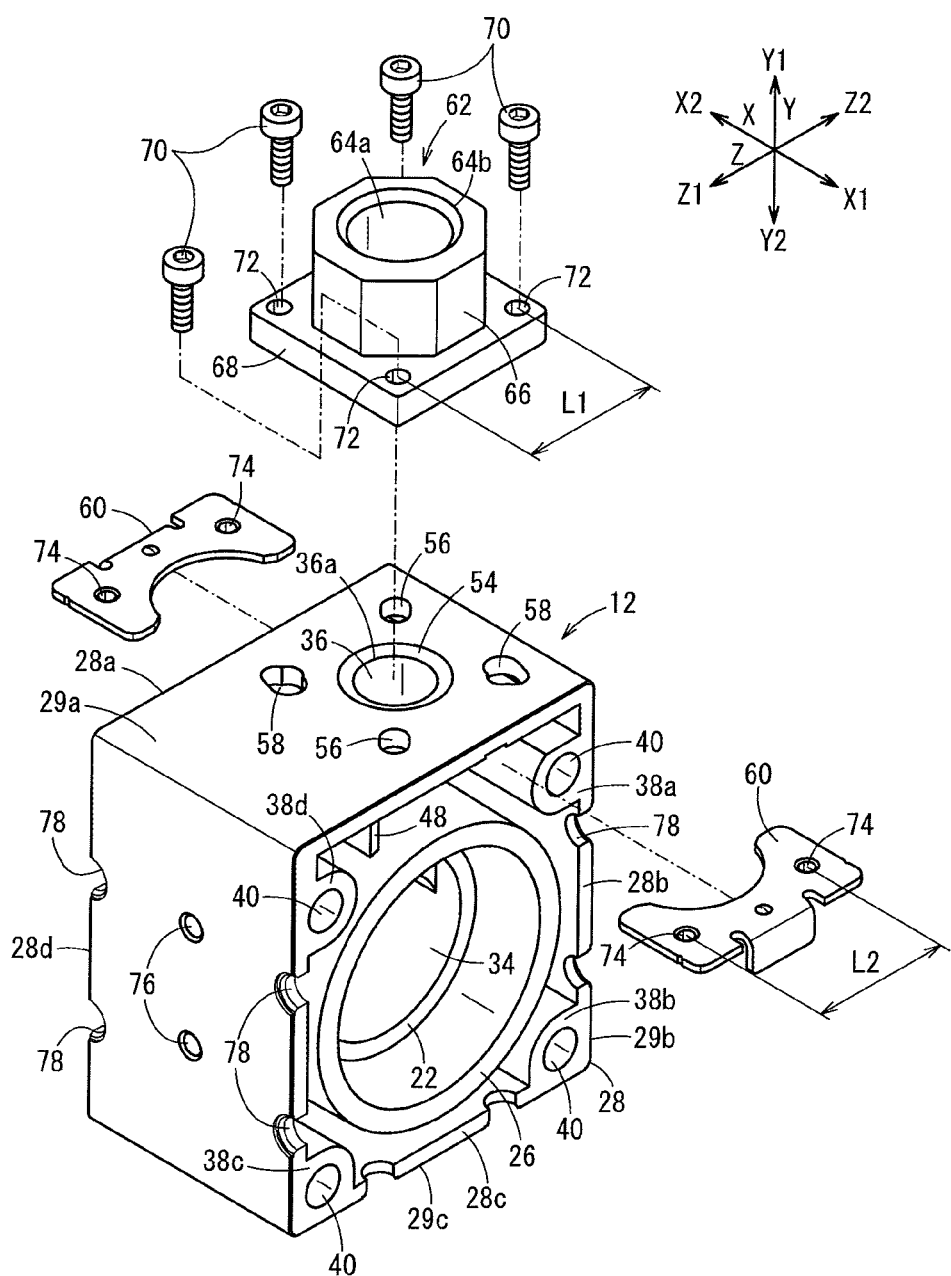

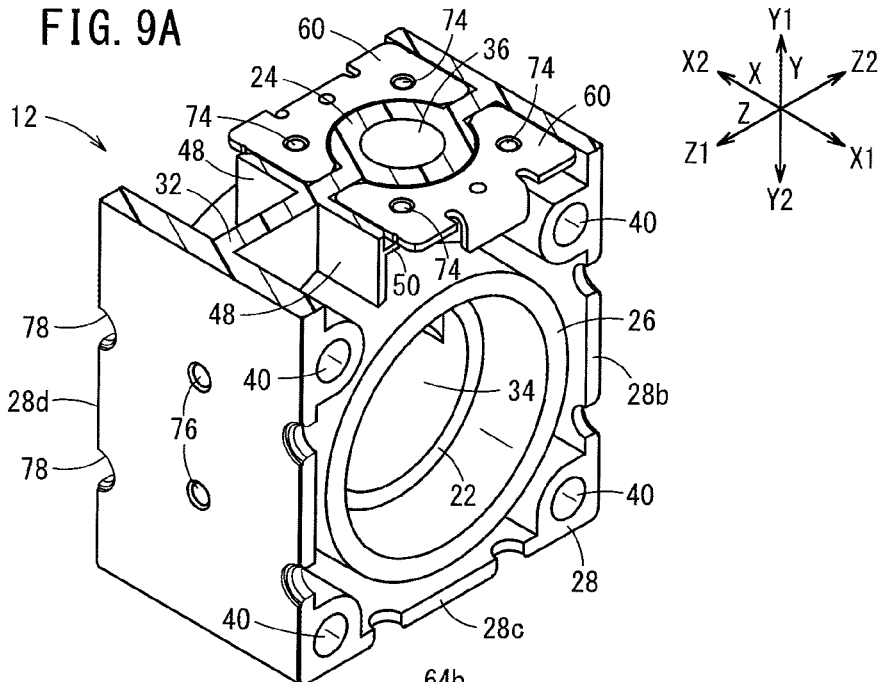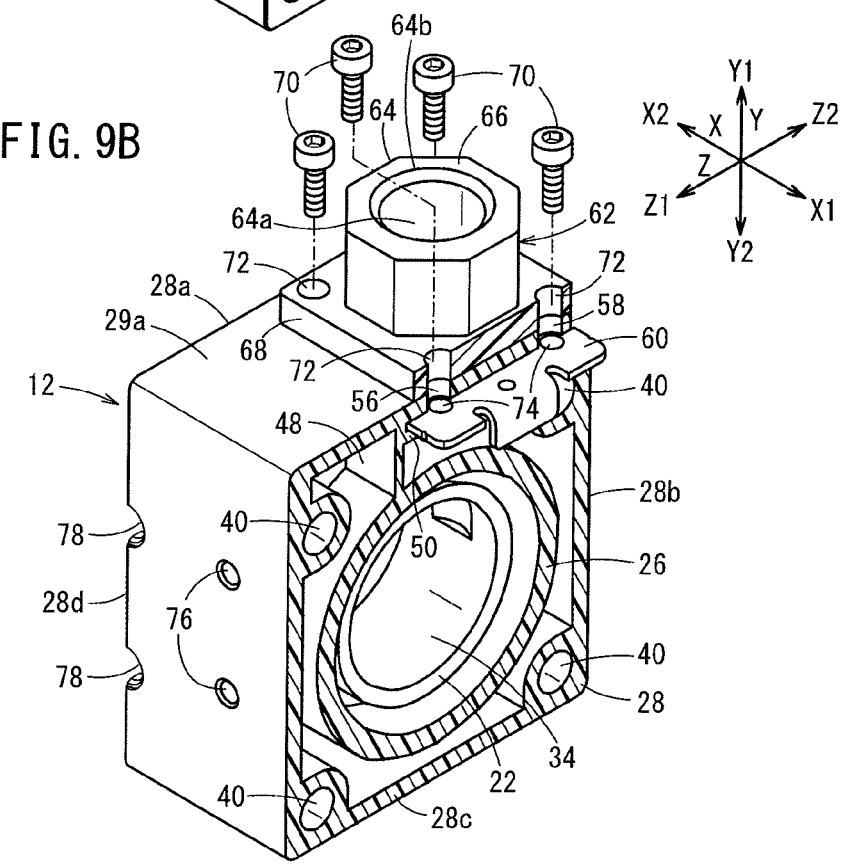

FIG. 11
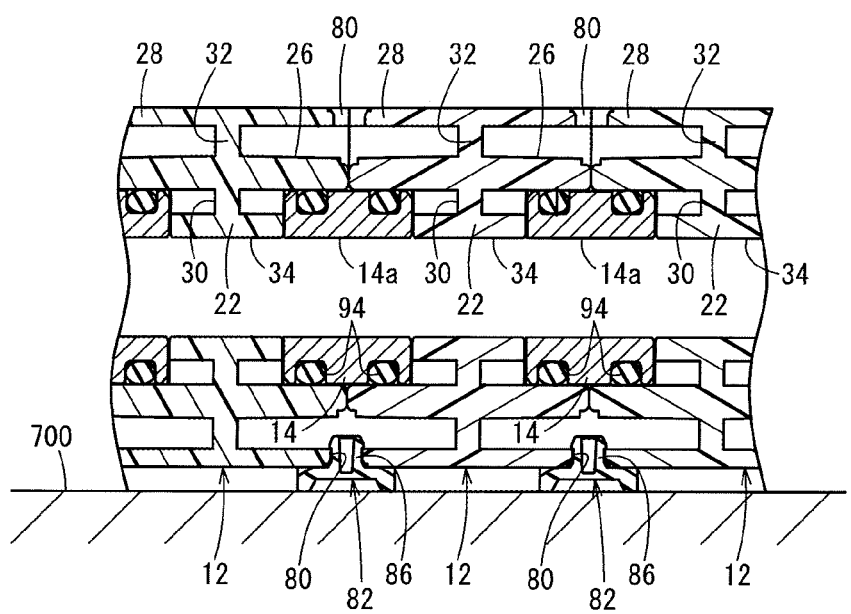
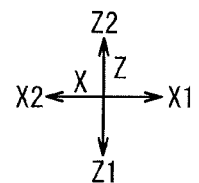

MANIFOLD APPARATUS

CROSS-REFERENCE TO RELATED APPLICATION

This application is based upon and claims the benefit of priority from Japanese Patent Application No. 2016-145072 filed on Jul. 25, 2016, the contents of which are incorporated herein by reference.

BACKGROUND OF THE INVENTION

Field of the Invention

The present invention relates to a manifold apparatus having a plurality of manifold blocks coupled together in a line.

Description of the Related Art

Conventionally, manifold apparatuses for causing flow of fluid such as water to diverge or merge have been used widely. For example, Japanese Laid-Open Patent Publication No. 2007-056975 discloses a manifold apparatus including a main pipe, and a plurality of branch pipes provided integrally with the main pipe. The axial lines of these branch pipes are perpendicular to the axial line of the main pipe, and are arranged in a line. Connector members (tube adaptors) are provided respectively at protruding ends of the branch pipes which protrude from the branch pipes, in order to connect the branch tubes to the branch pipes.

SUMMARY OF THE INVENTION

However, in the conventional technique like Japanese Laid-Open Patent Publication No. 2007-056975, since the axial lines of the plurality of branch pipes are perpendicular to the axial line of the main pipe, and the branch pipes are arranged in a line, at the time of attaching/detaching a branch tube to/from a connector member of each branch pipe, the adjacent tubes may interfere with each other. For this reason, it may not be possible to perform operation of attaching/detaching branch tubes to/from connector members.

The present invention has been made taking the above problems into account, and an object of the present invention is to provide a manifold apparatus in which it is possible to carry out operation of attaching/detaching branch tubes to/from connector members.

In order to achieve the above object, a manifold apparatus according to the present invention includes a plurality of manifold blocks coupled together in a line, and a plurality of connector members each provided on an outer surface of each of the manifold blocks. Branch tubes are attachable to and detachable from the connector members. Each of the manifold blocks includes a main port as a passage of fluid, extending through the manifold block in a coupling direction in which the plurality of manifold blocks are coupled together, and a branch port opened on the outer surface of the manifold block. The branch port is configured to allow an inner hole of each of the branch tubes attached to the connector members and the main port to communicate with each other. The axial line of the branch port of each of the manifold blocks is deviated from the axial line of the main port in a direction perpendicular to the coupling direction, and the plurality of manifold blocks are configured to be coupled together in a state where one of the adjacent manifold blocks is inverted 180° from the other of the adjacent manifold blocks in a direction perpendicular to the axial direction of the branch port and the coupling direction.

In the structure, the plurality of manifold blocks are coupled together in a state where one of the adjacent manifold blocks is inverted at 180° from the other of the adjacent manifold blocks in a direction perpendicular to the axial direction of the branch port and the coupling direction. Therefore, the connector members provided on the manifold blocks that are adjacent to each other can be positioned in a staggered pattern. Accordingly, it is possible to perform operation of attaching/detaching the branch tubes to/from the connector members efficiently.

In the manifold apparatus, each of the connector members may be provided on each of the manifold blocks.

In the structure, since all of the connector members can be arranged in a staggered pattern, it is possible to perform operation of attaching/detaching the tubes to/from the connector members even more efficiently.

The manifold apparatus may further include two main adaptors provided so as to sandwich the manifold blocks coupled together from both sides thereof in the coupling direction, main tubes may be attachable to and detachable from the main adaptors, and the main port may communicate with an inner hole of each of the main tubes attached to the main adaptors.

In the structure, the fluid can flow from the main tube into the main port, and flow out of the main port to the main tube.

In the manifold apparatus, each of the manifold blocks may further include an inner pipe having an inner hole as the main port, an outer pipe provided around the inner pipe, and extending beyond the inner pipe on both sides in the coupling direction, and an inner joining portion configured to join the inner pipe and the outer pipe together. The manifold apparatus may further include a coupling pipe fitted into each of the adjacent outer pipes, and the coupling pipe may be configured to allow the inner holes of the adjacent inner pipes to communicate with each other.

In the structure, by the coupling pipe, it is possible for the main ports of the adjacent manifold blocks to reliably communicate with each other.

In the manifold apparatus, each of the manifold blocks may further include a rectangular ring shaped outer frame provided around the outer pipe and forming the outer surface of the manifold block, and an outer joining portion configured to join the outer pipe and the outer frame together.

In the structure, the structure of the manifold blocks is simplified, and it is possible to easily provide the connector member on the outer surface of the outer frame.

In the manifold apparatus, the manifold apparatus may further include screw members configured to attach the connector member to the manifold block, and fixing members configured to be inserted between the outer frame and the outer pipe. A plurality of screw insertion holes may be formed in the connector member, and the screw members may be inserted into the screw insertion holes. A plurality of through holes may be formed in the outer frame, and the screw members may be inserted into the through holes. A plurality of attachment holes may be formed in the fixing members, the screw members being brought into screw engagement with the attachment holes, and the connector members and the fixing members may be replaceable with a plurality of types of connector members having different pitches of the screw insertion holes and a plurality of types of fixing members with the attachment holes having pitches corresponding to the pitches of the screw insertion holes. Each of the through holes may have a size configured to communicate with the screw insertion holes of the plurality of types of the connector members and the plurality of types of attachment holes.

In the structure, it is possible to attach the plurality of types of connector members to the manifold blocks. Further, for example, the plurality of types of connector members may be provided mixedly on one manifold apparatus. Therefore, it is possible to improve the flexibility in the design of the manifold apparatus.

The manifold apparatus may further include a leg configured to support the manifold blocks coupled together, and the leg may be attached to another outer surface of the manifold block that is different from the outer surface where the connector member is provided.

In the structure, it is possible to stably install the manifold apparatus by the leg. Further, even in the case where the number of coupled manifold blocks is large, it is possible to suppress sagging of the manifold apparatus under its own weight.

In the manifold apparatus, a cutout opened in the coupling direction may be formed in the outer surface of each of the manifold blocks, the cutouts of the manifold blocks that are adjacent to each other may be connected together to form a mount hole, and the leg may have a shaft configured to be attached to and detached from the mount hole.

In the structure, it is possible to attach the leg to the manifold block and detach the leg from the manifold block easily.

In the manifold apparatus, the connector member may include a branch adaptor and a connector member body configured to couple the branch adaptor and the manifold block. The branch tube is attachable to and detachable from the branch adaptor.

In the structure, it is possible to replace the connector member attached to the manifold block with another connector member easily.

In the manifold apparatus, the connector member body may include at least one of a flow rate regulating valve, a stop valve, and a flow rate meter.

In the structure, it is possible to reduce the size of the manifold apparatus, and improve the degree of freedom in the design of the manifold apparatus.

In the manifold apparatus, the connector member body may include a coupling block having a fluid channel configured to allow an inner hole of the branch adaptor and the branch port to communicate with each other, and the fluid channel may include a first communication port opened on a first outer surface of the coupling block, and communicating with the branch port, and a second communication port opened on a second outer surface extending perpendicularly to the first outer surface, and communicating with the inner hole of the branch adaptor.

In the structure, it is possible to change the orientation of the opening of the branch adaptor relative to the manifold block easily.

In the manifold apparatus, the connector member body may include an intermediate block provided on the outer surface of the manifold block, and a first open/close valve and a second open/close valve provided on the intermediate block. The intermediate block may include an intermediate channel communicating with the inner hole of the branch adaptor, a first intermediate communication port configured to allow the branch port and the intermediate channel to communicate with each other, and a second intermediate communication port communicating with the intermediate channel. Fluid which is different from fluid flowing through the branch port flows through the second intermediate communication port. The first open/close valve may be configured to open and close the first intermediate communication port, and the second open/close valve may be configured to open and close the second intermediate communication port.

In the structure, for example, two types of fluid can selectively flow through the branch tube.

The manifold apparatus may further include a first unit configured to cause fluid supplied from a fluid supply source to diverge into a plurality of channels, and guide the fluid to a plurality of fluid supply destinations, and a second unit configured to cause the fluid utilized at each of the fluid supply destinations to merge, and guide the fluid to the fluid supply source. Each of the first unit and the second unit may be formed by coupling the plurality of manifold blocks provided with the connector members.

In this case, with the simple structure, the fluid supplied from the fluid supply source can return to this fluid supply source through the first unit, the plurality of fluid supply destinations, and the second unit.

In the manifold apparatus, the first unit and the second unit may be provided integrally by coupling the manifold blocks together, and a closing member configured to interrupt communication between the main ports of the manifold blocks that are adjacent to each other may be provided between the first unit and the second unit.

In the structure, for example, it is possible to provide the first unit for supplying the fluid to a predetermined fluid supply destination and the second unit into which the fluid utilized at the fluid supply destination is introduced can be provided integrally in the coupling direction of the manifold blocks.

The manifold apparatus may further include an indication member attached to the manifold block to indicate a position of the closing member.

In the structure, since it is possible to indicate the position of the closing member by the display member, it is possible to easily recognize the border between the first unit and the second unit.

The manifold apparatus may further include a fixing member configured to fix the plurality of manifold blocks coupled together to an installation location where the manifold apparatus is installed, and the fixing member may be attached to another outer surface of the manifold block that is different from the outer surface where the connector member is provided.

In the structure, it is possible to reliably fix the manifold apparatus to the installation location.

In the present invention, since the connector members provided for the manifold blocks that are adjacent to each other can be positioned in a staggered pattern, it is possible to perform operation of attaching and detaching the branch tubes to and from the connector members efficiently.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 3A is a front view of the manifold apparatus;

FIG. 3B is a bottom view of the manifold apparatus;

FIG. 7A is a perspective view of the manifold block with a partial cross section taken along a direction perpendicular to the axial line of the branch port;

FIG. 7B is a plan view of the manifold block;

FIG. 8 is an exploded perspective view of the manifold block and a connector member shown in FIG. 1;

FIG. 9A is a view for explaining attaching of fixing plates to the manifold block;

FIG. 9B is a view for explaining attaching of a connector member to the manifold block;

FIG. 11 is a view for explaining attaching of the leg to the manifold block;

DESCRIPTION OF THE PREFERRED EMBODIMENTS

Figure 1:
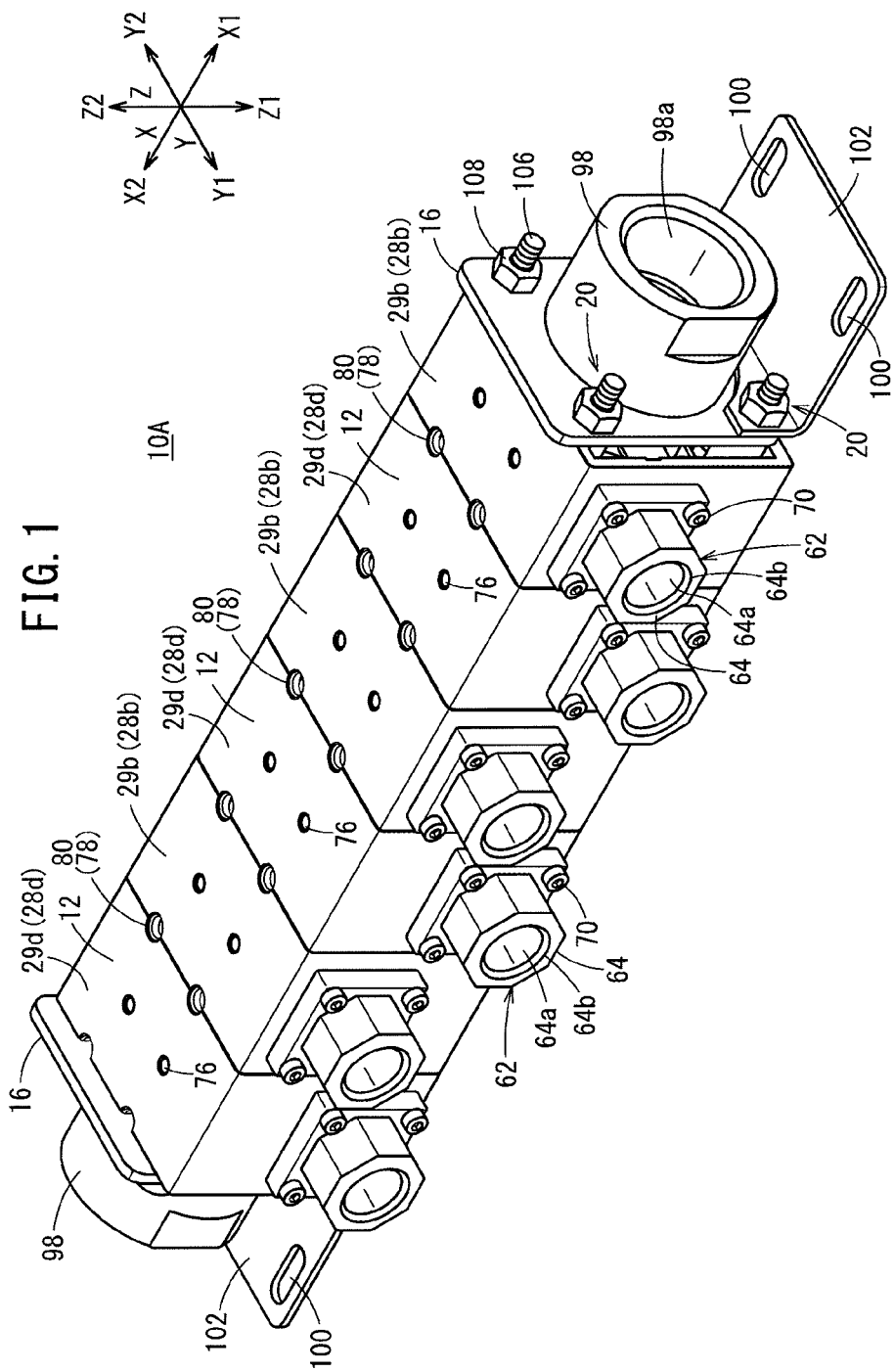
FIG. 1 is a perspective view of a manifold apparatus according to a first embodiment of the present invention.

Hereinafter, preferred embodiments of a manifold apparatus according to the present invention will be described with reference to the accompanying drawings. The manifold apparatus according to the present invention is a coupled structural body assembled by coupling a plurality of manifold blocks together in a line. Each of the manifold blocks has a main port and a branch port. The manifold apparatus causes flow of fluid such as water to diverge (branch) or merge.

In the following description, a coupling direction in which the manifold blocks are coupled together will be referred to as X direction, one side of the X direction will be referred to as X1 direction, and the other side of the X direction will be referred to as X2 direction. Further, the width direction of the manifold apparatus perpendicular to the X direction will be referred to as Y direction, and particularly, one side of the Y direction will be referred to as Y1 direction, and the other side of the Y direction will be referred to as Y2 direction. Further, the height direction of the manifold apparatus perpendicular to the X direction and the Y direction will be referred to as Z direction, and particularly, one side of the Z direction will be referred to as Z1 direction, and the other side of the Z direction will be referred to as Z2 direction.

It should be noted that these directions are used for ease of explanation. It is a matter of course that the manifold apparatus can be used in any orientation (e.g., in an upside down orientation).

First Embodiment

As shown in FIGS. 1 to 4, a manifold apparatus 10A includes a plurality of manifold blocks 12 coupled together in a line, a plurality of coupling pipes 14 provided in the manifold blocks 12, a pair of end plates 16 sandwiching the manifold blocks 12 from both sides to fix the manifold blocks 12, and a plurality of holding members 20 holding the plurality of manifold blocks 12 coupled together in a line. The embodiment of the present invention is described in connection with an example where six manifold blocks 12 are coupled together in line. However, the manifold apparatus 10A may include 2 to 5, or 7 or more manifold blocks 12 that are coupled together.

A plurality of manifold blocks 12 have the same structures as one another. Each of the manifold blocks 12 is integrally formed using resin. It should be noted that the manifold blocks 12 may be made of material other than resin, such as metal.

As shown in FIGS. 4, 5B to 7A, each of the manifold blocks 12 includes a cylindrical inner pipe 22, a branch pipe 24 extending from the inner pipe 22, a cylindrical outer pipe 26 provided around the inner pipe 22, a rectangular ring shaped outer frame 28 provided around the outer pipe 26, an inner joining portion 30 joining the inner pipe 22 and the outer pipe 26, and an outer joining portion 32 joining the outer pipe 26 and the outer frame 28.

The inner pipe 22 and the outer pipe 26 extend in the coupling direction (X direction) of the manifold blocks 12, and are coaxial with each other. The inner hole of the inner pipe 22 functions as a main port 34 of a fluid channel. The branch pipe 24 extends from the inner pipe 22, and passes through the outer pipe 26, and extends up to the outer frame 28 (see FIG. 6B). The inner hole of the branch pipe 24 communicates with the main port 34, and is opened to an outer surface 29a of the outer frame 28. The inner hole of the branch pipe 24 functions as a branch port 36 of the fluid channel.

Figure 5A:
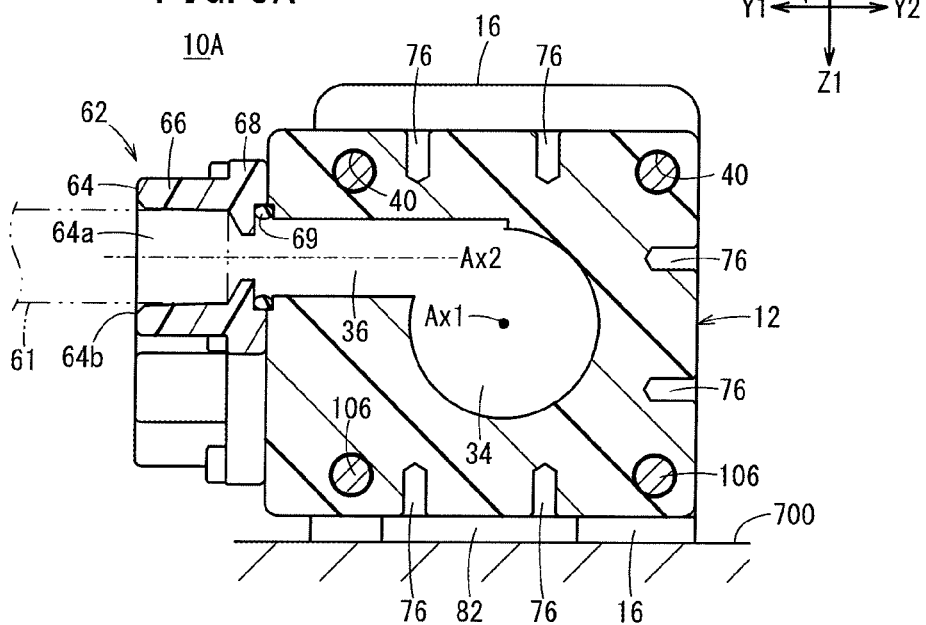
FIG. 5A is a transverse cross sectional view taken along a line VA-VA in FIG. 3A.

As shown in FIGS. 5A and 7B, the branch port 36 extends straight from the main port 34 in the direction (Y direction) perpendicular to the axial line Ax1 of the main port 34. The axial line of the branch port 36 does not intersect with the axial line Ax1 of the main port 34. That is, the axial line Ax1 of the branch port 36 is deviated from the axial line Ax1 of the main port 34 in the Z direction. The channel cross sectional area of the branch port 36 is smaller than the channel cross sectional area of the main port 34.

Figure 4:
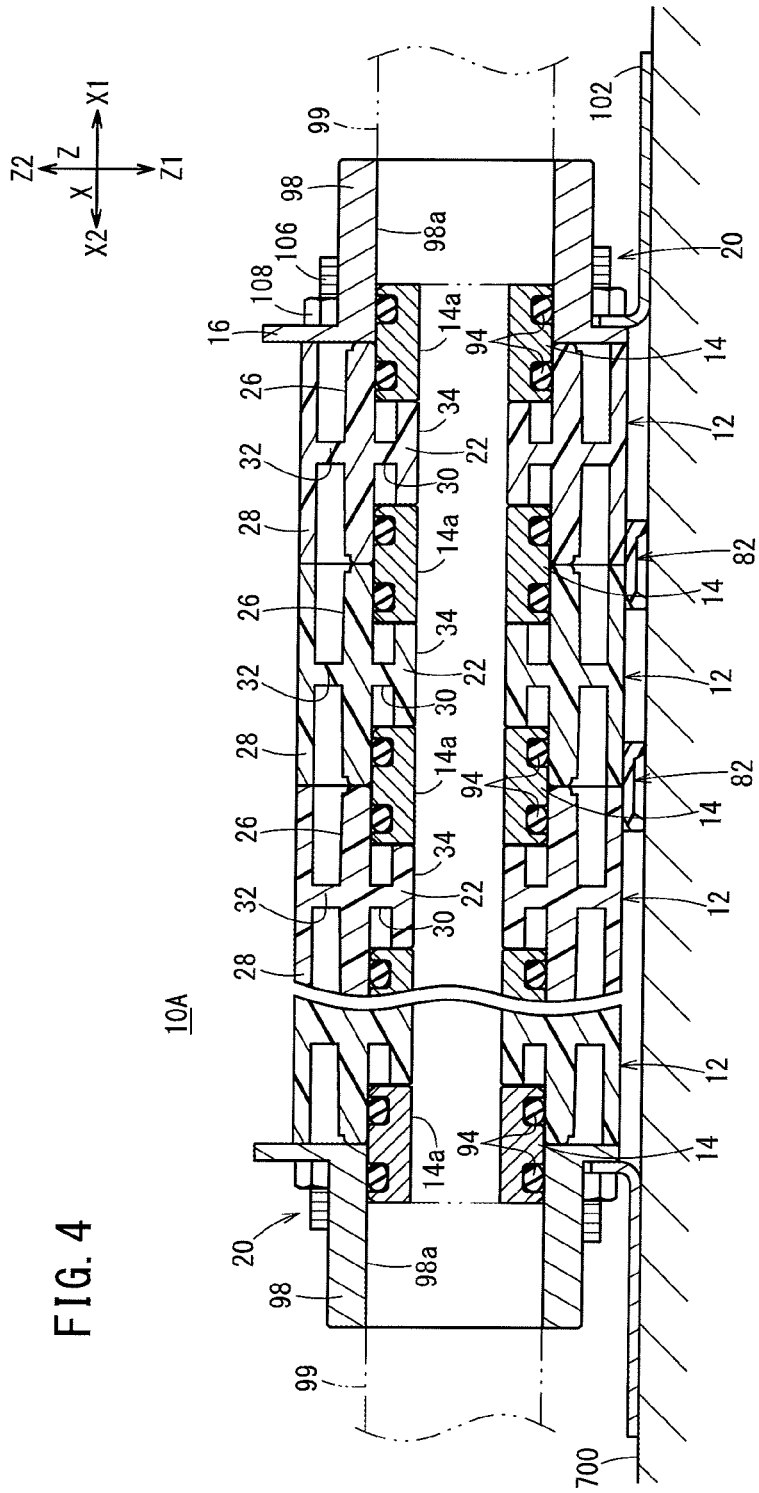
FIG. 4 is a vertical perspective view taken along a line IV-IV in FIG. 3B.
Figure 5B:
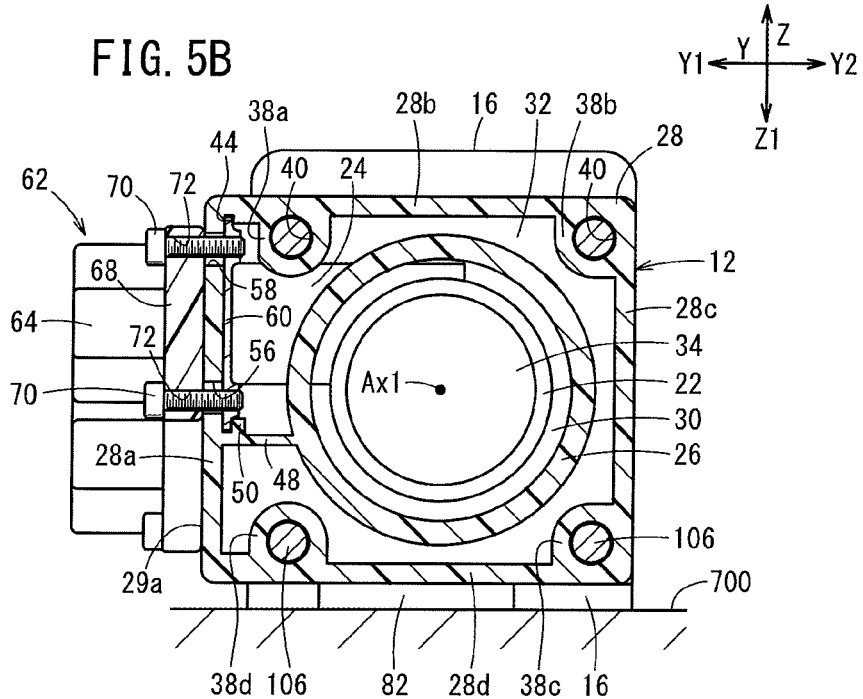
FIG. 5B is a transverse cross sectional view taken along a line VB-VB in FIG. 3A.
Figure 6A:
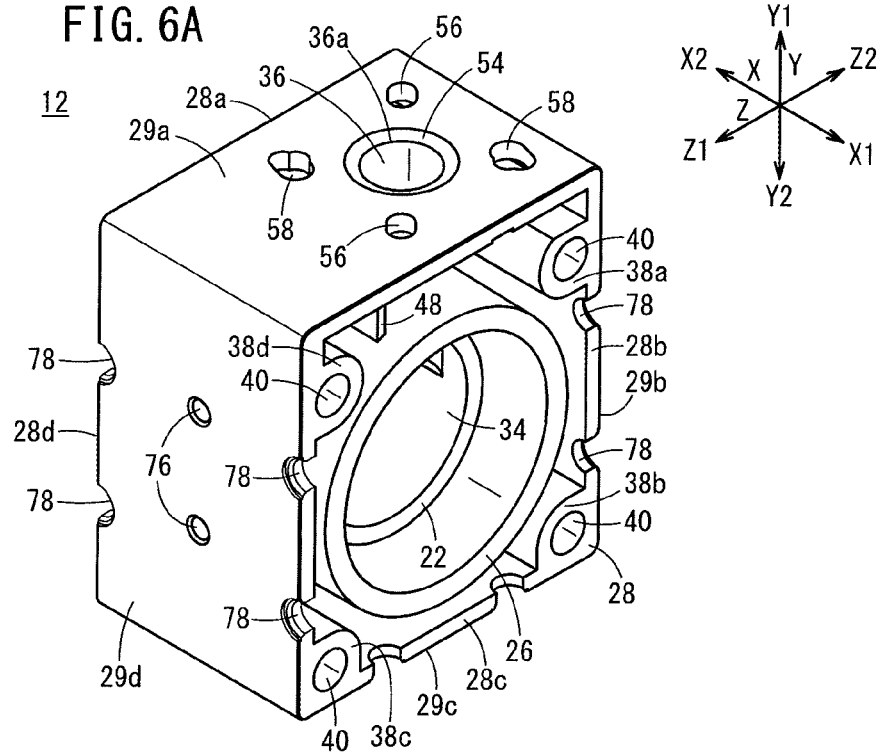
FIG. 6A is a perspective view of a manifold block shown in FIG. 1.
Figure 6B:
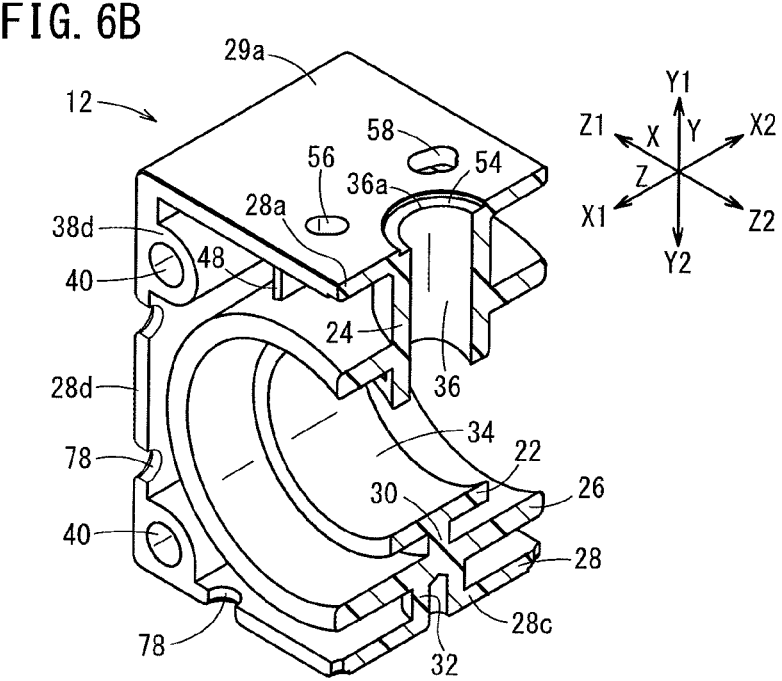
FIG. 6B is a perspective view of the manifold block with a partial cross section taken along an axial line of a branch port.

The outer pipe 26 extends beyond the inner pipe 22 on both sides in the X direction (see FIGS. 4 and 6B). As shown in FIGS. 5B and 6B, the inner joining portion 30 extends in a direction perpendicular to the axial direction of the inner pipe 22, and is joined to the outer surface of the branch pipe 24. The outer joining portion 32 extends in the direction perpendicular to the axial direction of the outer pipe 26, and is joined to the outer surface of the branch pipe 24 (see FIG. 7A). The length of the outer pipe 26 in the X direction is substantially the same as the length of the outer frame 28 in the X direction (see FIG. 4).

As shown in FIGS. 5B and 6A, the outer frame 28 includes a first wall 28a joined to the branch pipe 24, and extending in the direction (Z direction) perpendicular to the coupling direction of the manifold blocks 12, a second wall 28b extending from one end of the first wall 28a (end in the Z2 direction) in the Y2 direction, a third wall 28c extending from the extended end of the second wall 28b toward the other end side of the first wall 28a (i.e., in the Z1 direction), and a fourth wall 28d connecting the extended end of the third wall 28c and the other end of the first wall 28a (end in the Z1 direction).

The first wall 28a and the third wall 28c face each other in the Y direction, and the second wall 28b and the fourth wall 28d face each other in the Z direction. Further, the length of the first wall 28a and the third wall 28c in the longitudinal direction (Z direction) is smaller than the length of the second wall 28b and the fourth wall 28d in the longitudinal direction (Y direction).

In FIG. 5B and FIGS. 6A to 7A, a pair of bulging portions 38a are provided on the inner surface of the second wall 28b. The bulging portions 38a extend from the outer joining portion 32 to respective both ends of the second wall 28b in the X direction. A pair of bulging portions 38b are provided at inner corners formed by the second wall 28b and the third wall 28c. The bulging portions 38b extend from the outer joining portion 32 to respective both ends of the second wall 28b in the X direction. A pair of bulging portions 38c are provided at inner corners formed by the third wall 28c and the fourth wall 28d. The bulging portions 38c extend from the outer joining portion 32 to respective both ends of the third wall 28c in the X direction. A pair of bulging portions 38d are provided on the inner surface of the fourth wall 28d. The bulging portions 38d extend from the outer joining portion 32 to respective both ends of the fourth wall 28d in the X direction.

The bulging portions 38a and the bulging portions 38d face each other at positions deviated from the inner pipe 22 in the Y1 direction. Four insertion holes 40 are formed in the manifold blocks 12 (see FIGS. 2 and 5B). The insertion holes 40 extend from the end surfaces of the bulging portions 38a to 38d in the X1 direction, pass through the outer joining portion 32, and extend up to the end surfaces of the bulging portions 38a to 38d in the X2 direction. Rods 106 of the holding members 20 can be inserted into the insertion holes 40.

As shown in FIGS. 5A and 5B, the four insertion holes 40 are positioned at an equal distance from the axial line Ax1 of the main port 34 and arranged at constant angular intervals of a predetermined angle (90°) about the axial line of the main port 34. That is, the four insertion holes 40 are point symmetrical about the axial line Ax1 of the main port 34. The centers of the adjacent insertion holes 40 are spaced from each other by the same distance.

As shown in FIG. 7A, first protrusions 44 are formed on flat surfaces of the bulging portions 38a facing the first wall 28a. The first protrusions 44 protrude toward the first wall 28a (in the Y1 direction). Each of the first protrusions 44 is joined to the second wall 28b and the outer joining portion 32. The protruding end surfaces of the first protrusions 44 are spaced from the first wall 28a.

A pair of walls 48 are provided between the bulging portions 38a and the bulging portions 38d. The pair of walls 48 extend from the outer joining portion 32 toward respective both sides in the X direction. The walls 48 are joined to the outer circumferential surface of the outer pipe 26. Second protrusions 50 are formed on surfaces of the walls 48 facing toward the second wall 28b. The second protrusions 50 protrude toward the second wall 28b (in the Z2 direction). The second protrusions 50 are spaced from the first wall 28a.

More specifically, the distance between the second protrusions 50 and the first wall 28*a* is the same as the distance between the first protrusions 44 and the first wall 28*a*.

As shown in FIGS. 6A and 7B, an opening 36*a* of the branch port 36, and an annular groove 54 around an edge of the opening 36*a* are formed in the outer surface 29*a* of the first wall 28*a*. The opening 36*a* of the branch port 36 is formed at a position deviated in the Z2 direction, from the center of the outer surface 29*a* in the longitudinal direction. Two through holes 56 and two through holes 58 are formed in the first wall 28*a*. The shape of the through holes 56 and the shape of the through holes 58 are different from each other. The through holes 56, 58 are provided point symmetrical with each other about the axial line Ax2 of the branch port 36. The through holes 58 are larger than the through holes 56.

As shown in FIG. 8, a connector member 62 is attached to the outer surface 29*a* of the first wall 28*a* using a pair of fixing plates (fixing members) 60. A branch tube 61 (see FIG. 12) is connectable to the connector member 62. As shown in FIGS. 5A and 8, the connector member 62 has a branch adaptor 64 having an inner hole 64*a* for allowing the branch port 36 and the inner hole of the branch tube 61 to communicate with each other. The branch adaptor 64 includes a branch adaptor body 66 to which the branch tube 61 is inserted, and a rectangular-plate-shaped flange 68 provided at one end of the branch adaptor body 66.

A seal member 69 for suppressing leakage of the fluid to the outside is provided between the branch adaptor 64 and the manifold block 12. As shown in FIGS. 5B, 8, and 9B, four screw insertion holes 72 are formed at corners of the flange 68. Screw members 70 for attaching the branch adaptor 64 to the manifold block 12 are inserted into the screw insertion holes 72.

As shown in FIGS. 8 and 9A, the pair of fixing plates 60 are attached to the manifold block 12 such that the branch pipe 24 is interposed between the pair of fixing plates 60 in the X direction. The fixing plates 60 are inserted between the first wall 28*a* and the first protrusions 44, and between the first wall 28*a* and the second protrusions 50.

Two attachment holes 74 are formed in each of the fixing plates 60. The attachment holes 74 are spaced from each other by a predetermined distance in the Z direction. The attachment holes 74 can lock the screw members 70. The positions (pitch L2) of these attachment holes 74 correspond to (are the same as) the positions (pitch L1) of the screw insertion holes 72 of the branch adaptor 64. Each of the fixing plates 60 is formed by cutting out a semicircular shape in order to prevent interference with the branch pipe 24.

In the embodiment of the present invention, the pair of fixing plates 60 are attached to each of the manifold blocks 12. The screw members 70 are inserted into the screw insertion holes 72 of the branch adaptor 64 and the through holes 56, 58. The screw members 70 are brought into screw engagement with the attachment holes 74 of the fixing plates 60. Thus, the connector member 62 is attached to the manifold block 12 (see FIGS. 8 and 9B).

As shown in FIGS. 1, 3B, 5A, and 6A, etc., two fixing holes 76 are formed in each of the outer surface 29*b* of the second wall 28*b*, the outer surface 29*c* of the third wall 28*c*, and the outer surface 29*d* of the fourth wall 28*d*. The two fixing holes 76 are spaced from each other by a predetermined distance in the longitudinal direction. For example, the two fixing holes 76 are holes for attaching a fixing member 550 shown in FIG. 42B to the manifold block 12.

The fixing member 550 is a member for fixing the manifold block 12 to an installation location 700 (see FIG. 4), and the detailed structure of the fixing member 550 will be described later. In the illustrated embodiment, the fixing member 550 is not fixed to the manifold block 12. It is a matter of course that the fixing member 550 may be attached to the manifold block 12 of the embodiment.

In FIGS. 1 and 6A, each of both sides of the second wall 28*b* in the coupling direction (X direction) of the manifold block 12 has two semicircular cutouts 78. These cutouts 78 have the same size. The two cutouts 78 formed on the same side are spaced from each other by a predetermined distance in the longitudinal direction of the second wall 28*b*. Each of the third wall 28*c* and the fourth wall 28*d* has four cutouts 78 as in the case of the second wall 28*b*.

Figure 2:
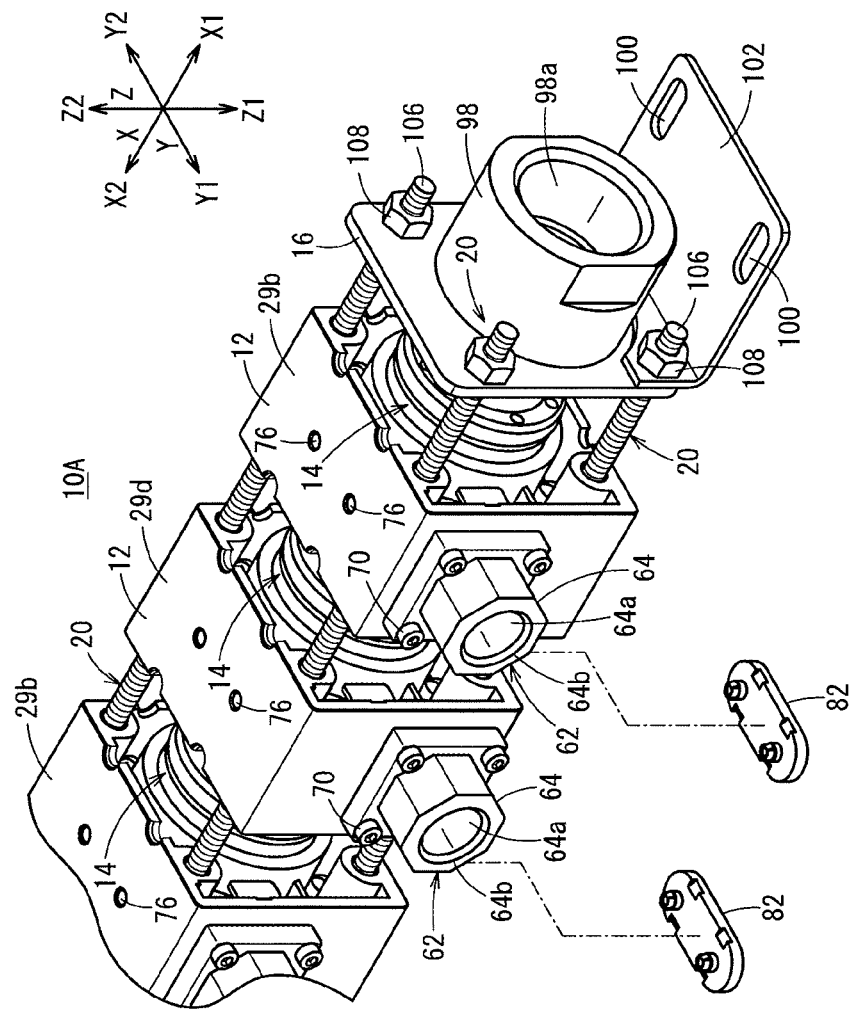
FIG. 2 is a partially exploded perspective view of the manifold apparatus.

As can be seen from FIG. 1, when a plurality of the manifold blocks 12 are coupled together, the adjacent two cutouts 78 are joined (connected) together so as to form one circular mount hole 80. As shown in FIGS. 2 and 3B, legs 82 are attached to the mount holes 80. That is, each of the legs 82 is attached between the adjacent manifold blocks 12. In the embodiment, five legs 82 are attached to the manifold blocks 12 that are coupled together in a line.

Figure 10A:
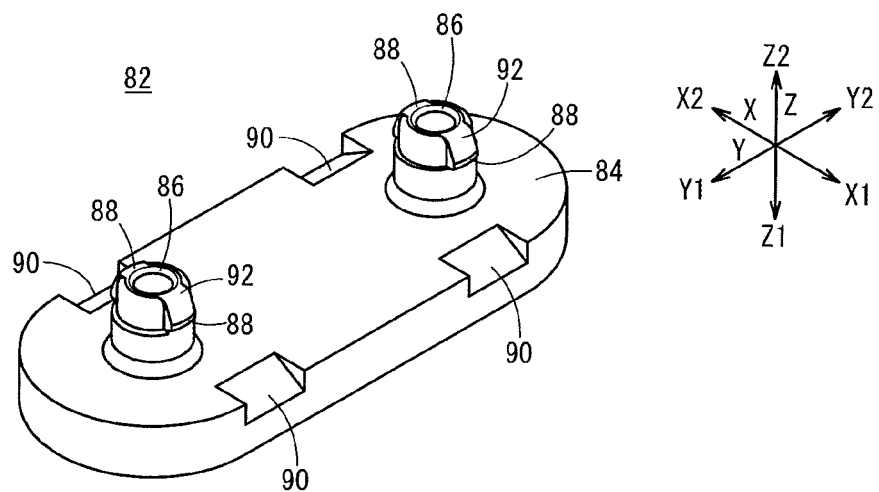
FIG. 10A is a perspective view of a leg shown in FIG. 2.
Figure 10B:
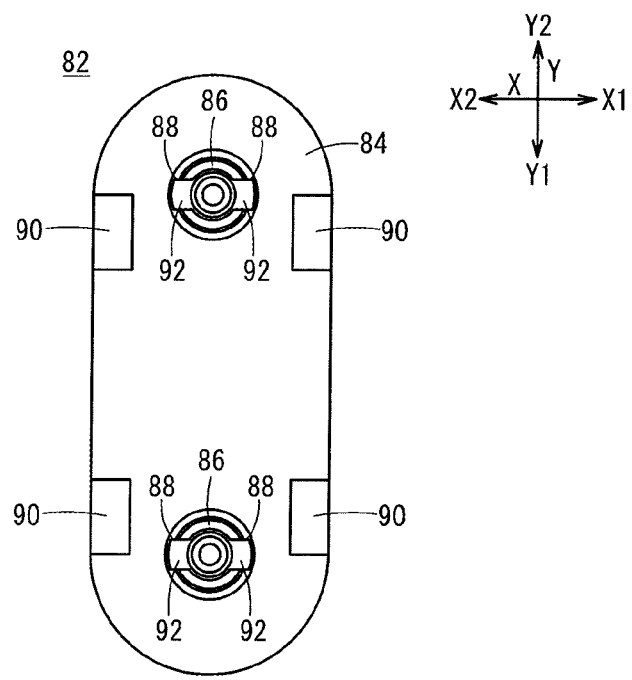
FIG. 10B is a plan view of the leg.

As shown in FIGS. 10A and 10B, the leg 82 is made of a material having flexibility such as rubber. The leg 82 includes a flat plate 84 extending in one direction, a pair of shafts 86 protruding from the flat plate 84, and claws 88. Two claws 88 are provided at the front end of each of the shafts 86. A plurality of (e.g., four) recesses 90 are formed in the flat plate 84.

The pair of shafts 86 are arranged on the flat plate 84 in the longitudinal direction. The shafts 86 are spaced from each other by a predetermined distance. The pair of claws 88 are arranged on the outer surface of the front end of each of the shafts 86 along the lateral direction of the flat plate 84. Each of the claws 88 has a tapered surface 92 that is inclined toward the axial line of the shaft 86, as approaching the front end of the shaft 86.

The legs 82 having the above structure can be attached to the manifold blocks 12 by coupling the plurality of manifold blocks 12 together and thereafter pushing the shafts 86 from the outside into the mount holes 80. In this case, the tapered surface 92 of each claw 88 contacts the wall surface of the mount hole 80, whereby the shafts 86 are deformed elastically in a manner that the pair of claws 88 get closer to each other. Thus, it is possible to smoothly insert the shafts 86 into the mount holes 80. Further, when the shafts 86 are inserted into the mount holes 80 completely, the shafts 86 restore their original shape, and the pair of claws 88 contact the inner surface of the outer frame 28 (see FIG. 11). In the structure, it is possible to prevent detachment of the shafts 86 from the mount holes 80.

Further, for attaching the legs 82 to the manifold blocks 12, the shafts 86 of the legs 82 may be set in the cutouts 78 of the manifold blocks 12 beforehand, and at the time of coupling the plurality of manifold blocks 12, the shafts 86 may be sandwiched between the adjacent manifold blocks 12.

The leg 82 attached to the manifold blocks 12 can be removed easily, e.g., by inserting a tool such as a flathead screwdriver into the recess 90 formed in the leg 82, and pulling out the tool from the recess.

As shown in FIG. 4, the coupling pipe 14 has a circular cylindrical shape. Two annular grooves are formed in the outer surface of the coupling pipe 14. Annular seal members 94 are provided in the annular grooves. The coupling pipe 14 is fitted into the end of the outer pipe 26 of the manifold block 12. That is, in the embodiment of the present invention, the plurality of coupling pipes 14 at the intermediate positions are interposed between the inner pipes 22 of the adjacent manifold blocks 12. In the structure, the main ports 34 of the manifold blocks 12 communicate with each other through the inner holes 14a of the coupling pipes 14. Further, in the presence of the coupling pipe 14, it is possible to suppress leakage of fluid to the outside through the space between the adjacent manifold blocks 12.

The two coupling pipes 14 are fitted into the outer pipes 26 of the manifold blocks 12 at the outermost positions in the X direction, and fitted into inner holes 98a of main adaptors 98 provided for the end plates 16. Therefore, it is possible to suppress leakage of the fluid to the outside through the spaces between the main adaptors 98 and the manifold blocks 12.

As shown in FIGS. 1 and 4, the end plate 16 is a rectangular plate member. The central portion of the end plate 16 is provided integrally with the main adaptor 98. The main adaptor 98 has the inner hole 98a that communicates with the main port 34 through the inner hole 14a of the coupling pipe 14. The main tube 99 is connectable to the main adaptor 98. A base plate 102 is attached to each of the end plates 16 by the holding members 20. The base plate 102 has a plurality of (two in an example of FIG. 1) long holes 100. Bolts (not shown) for fixing the base plate 102 to the installation location 700 are inserted into the long holes 100.

As shown in FIGS. 1 and 2, each of the holding members 20 has a rod 106. The rod 106 penetrates through the corner of each end plate 16, and is inserted into the insertion hole 40 of each of the manifold blocks 12. A male screw is formed over the entire length of the outer surface of each rod 106. The male screw is screw engaged with the female screw of a nut member 108 for tightening the pair of end plates 16 inward. The male screw may be formed only at both ends of each rod 106.

In FIG. 1, in the embodiment of the present invention, the plurality of manifold blocks 12 are coupled together in a manner where one of the adjacent manifold blocks 12 is inverted 180° from the other of the adjacent manifold blocks 12 in a direction (Z direction) perpendicular to the axial direction of the branch port 36 and the coupling direction of the manifold blocks 12. Further, an opening 64b of the branch adaptor 64 connected to each manifold block 12 is oriented in the Y1 direction.

Figure 12:
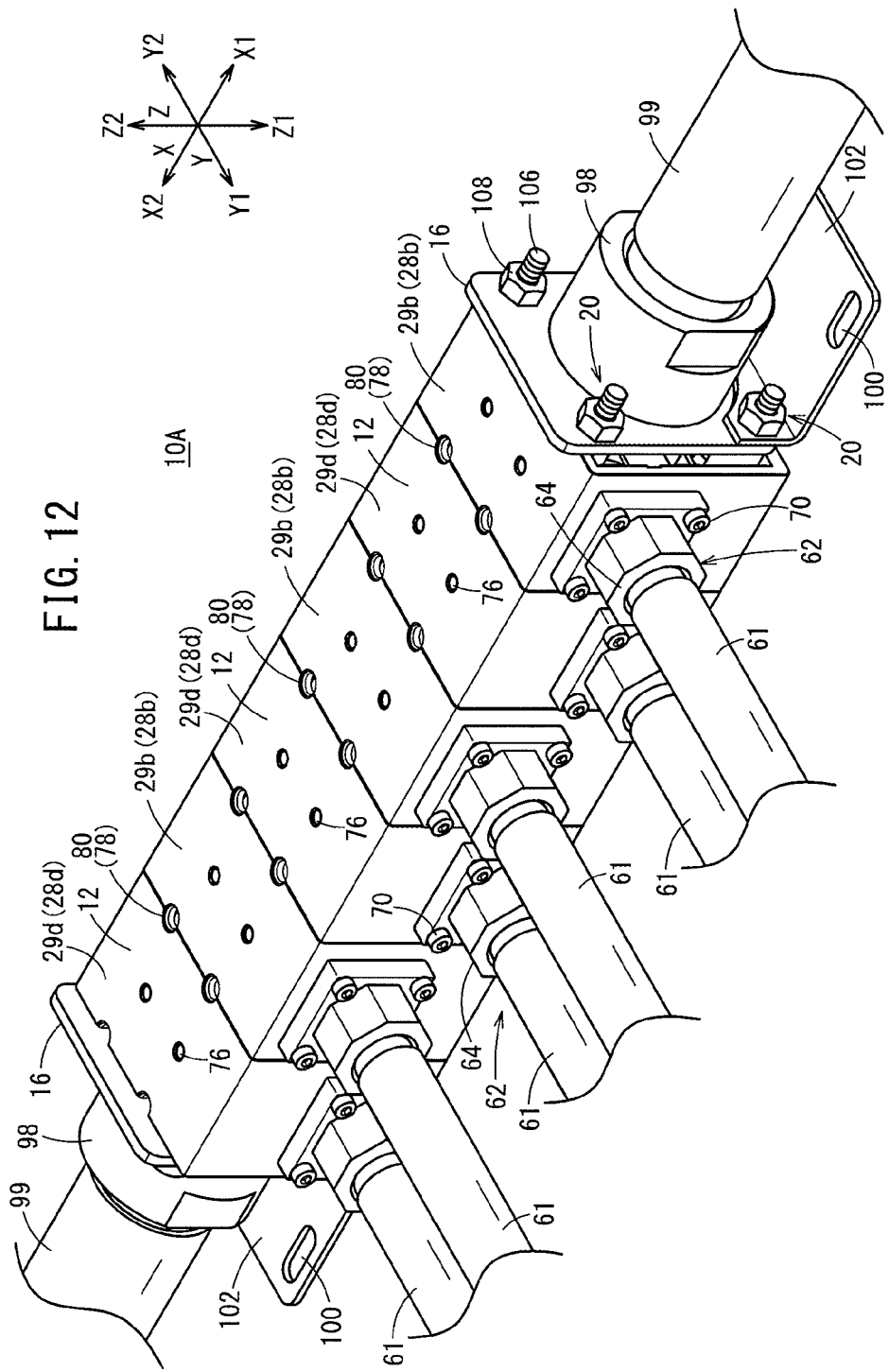
FIG. 12 is a perspective view showing the manifold apparatus to which a plurality of branch tubes and two main tubes are connected.

In the embodiment of the present invention, the axial line Ax1 of the branch port 36 is deviated from the axial line Ax1 of the main port 34 in a direction (Z direction) perpendicular to the X direction (see FIG. 5A). Therefore, the branch adaptors 64 provided on the adjacent manifold blocks 12 can be positioned in a staggered arrangement (see FIG. 1 and FIG. 3A). In the structure, as shown in FIG. 12, it is possible to perform operation of attaching the branch tube 61 to the connector member 62, and detaching the branch tube 61 from the connector member 62 efficiently.

Further, since one connector member 62 is provided on each of the manifold blocks 12, all of the connector members 62 can be arranged in a staggered pattern. Therefore, it is possible to perform operation of attaching/detaching the branch tube 61 to/from the connector member 62 more efficiently.

Further, two main adaptors 98 are provided on both ends of the coupled manifold blocks 12 so as to sandwich the manifold blocks 12 in the coupling direction. The main tubes 99 are attachable and detachable with respect to the main adaptors 98. The inner hole of the main tube 99 communicates with the main port 34. Therefore, the fluid can flow from the main tube 99 into the main port 34 or the fluid can flow out of the main port 34 to the main tube 99.

In the embodiment of the present invention, the coupling pipe 14 is fitted into the adjacent outer pipes 26. The inner holes of the adjacent inner pipes 22 communicate with each other through the coupling pipe 14. In the structure, it is possible to reliably communicate the main ports 34 of the adjacent manifold blocks 12 with each other by the coupling pipe 14.

Further, in each of the manifold blocks 12, the rectangular-ring-shaped outer frame 28 and the outer pipe 26 are joined together by the outer joining portion 32. Therefore, the structure of the manifold blocks 12 is simplified, and it is possible to easily provide the connector member 62 on the outer surface 29a of the outer frame 28.

In the embodiment of the present invention, since the legs 82 are attached to the manifold blocks 12, it is possible to stably install the manifold blocks 12 at the installation location 700. In particular, when the number of manifold blocks 12 is large, intermediate portions of the coupled manifold blocks 12 in the X direction tend to sag under the own weight of the manifold blocks 12. Even under the circumstances, by using the legs 82, it is possible to suppress sagging of the coupled-in-line manifold blocks 12 (manifold apparatus 10A).

Further, for example, even in the case where the manifold apparatus 10A is stepped on by a user, the load applied to the manifold blocks 12 can be received by the legs 82. Therefore, it is possible to prevent decoupling of the manifold blocks 12.

The embodiment of the present invention is not limited to the above structure. For example, as shown in FIGS. 13 to 16, instead of the connector member 62, a connector member 110 may be provided for the outer surface 29a of the manifold block 12. The constituent elements of the connector member 110 that are identical to those of the connector member 62 are labeled with the same reference numeral, and detailed description thereof is omitted.

Figure 13:
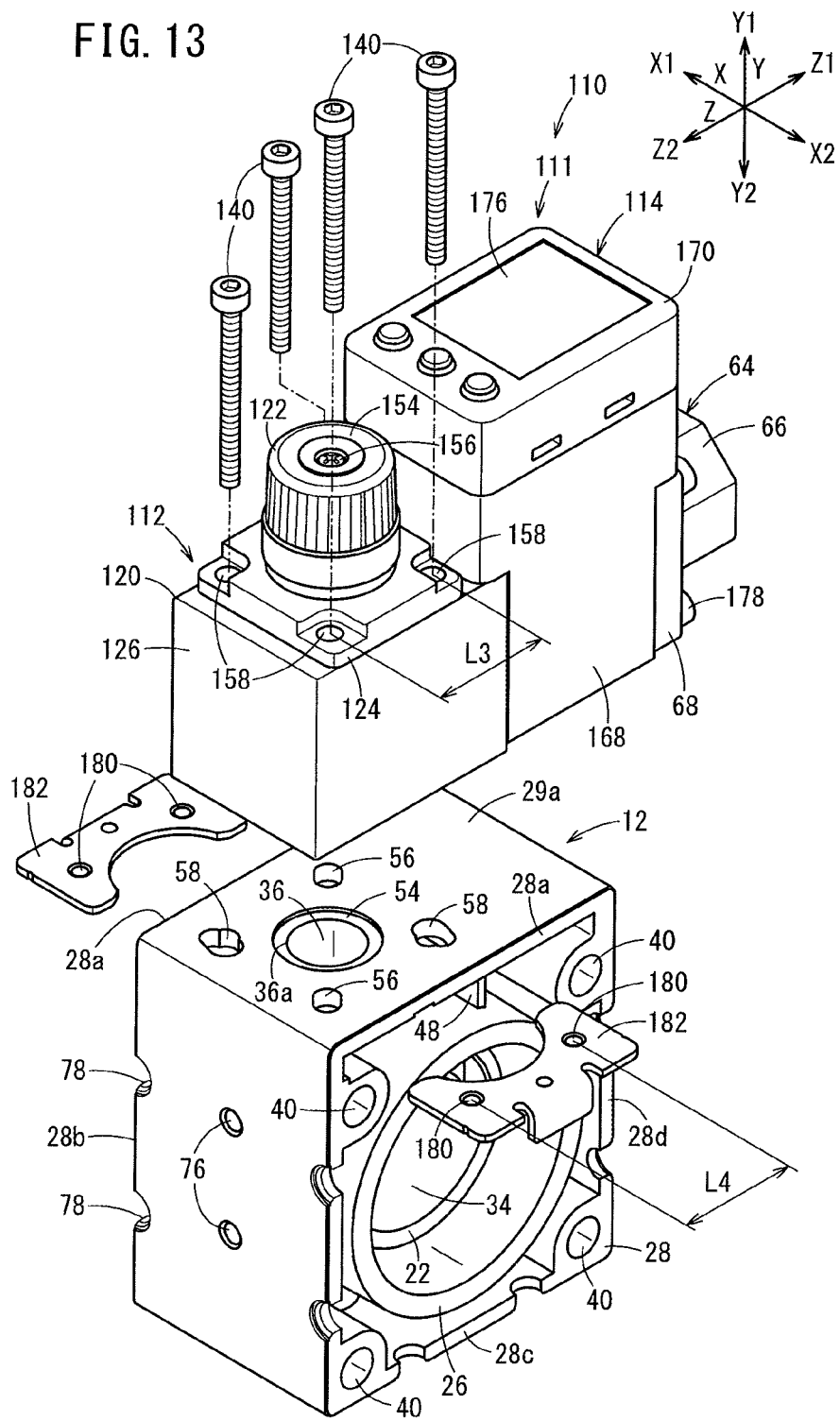
FIG. 13 is an exploded perspective view of a connector member and a manifold block according to a first modified example.

As shown in FIG. 13, the connector member 110 includes a connector member body 111 attached to the outer surface 29a of the manifold block 12, and a branch adaptor 64 provided on the connector member body 111. The connector member body 111 includes a flow rate regulating valve 112 and a flow rate meter 114 provided on the flow rate regulating valve 112.

Figure 14:
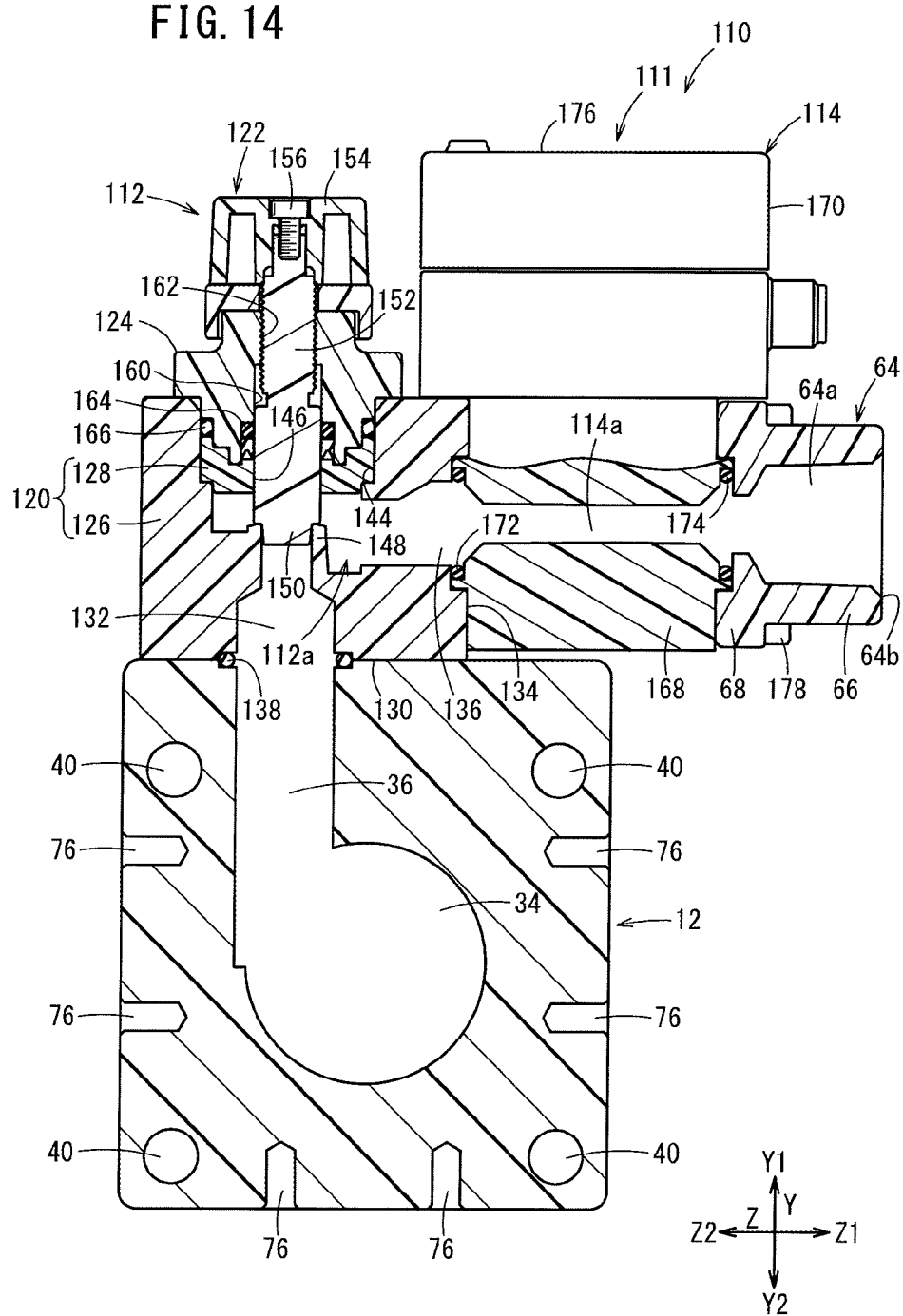
FIG. 14 is a first vertical cross sectional view of a connector member and a manifold block shown in FIG. 13.

As shown in FIG. 14, the flow rate regulating valve 112 includes a valve body 120 having a fluid channel 112a, a valve mechanism 122 provided on the valve body 120, and a valve support 124 supporting the valve mechanism 122. The valve body 120 includes a substantially rectangular parallelepiped first body 126 attached to the manifold block 12, and a second body 128 provided on the first body 126.

The fluid channel 112a includes a first port 132 opened on a first attachment surface 130 attached to the manifold block 12 of the first body 126, and a second port 136 opened on a second attachment surface 134 extending perpendicular to the first attachment surface 130. An annular seal member 138 for suppressing leakage of the fluid to the outside is provided between the first body 126 and the manifold block 12.

Figure 15:
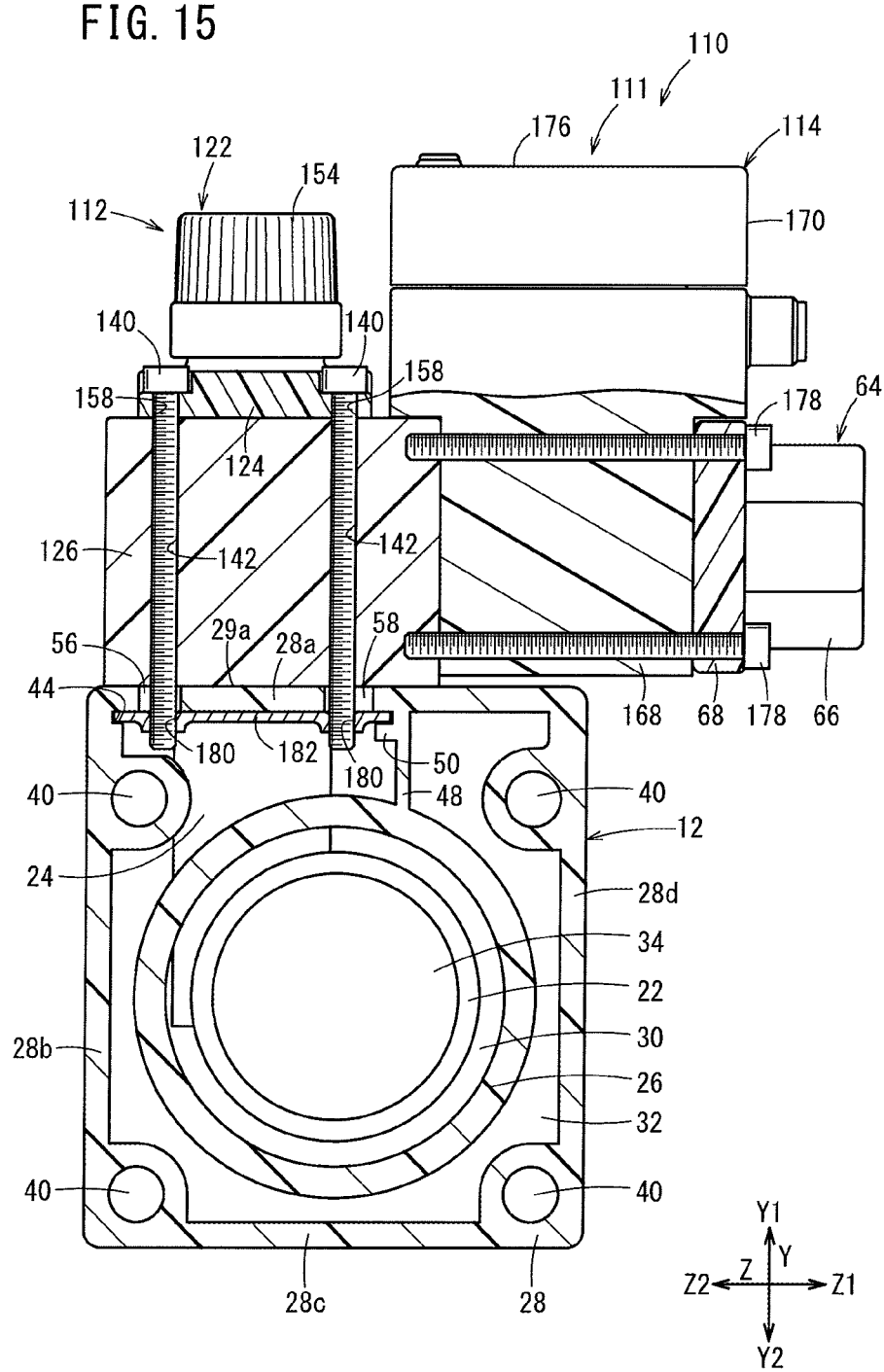
FIG. 15 is a second vertical cross sectional view of the connector member and the manifold block shown in FIG. 13.
Figure 16:
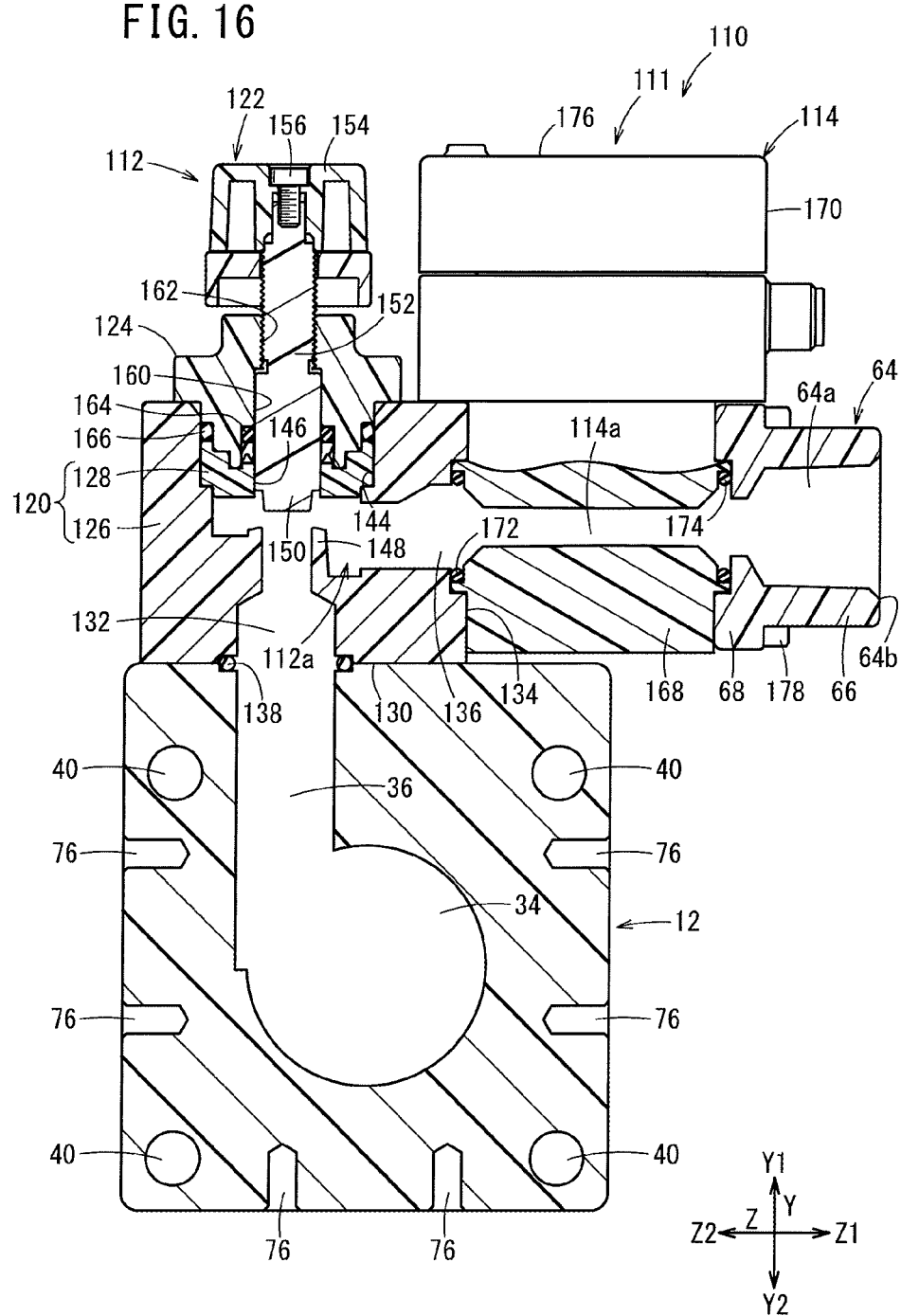
FIG. 16 is a view for explaining operation of the connector member shown in FIG. 13.

Four screw insertion holes 142 extend through the first body 126 in a direction perpendicular to the first attachment surface 130 (see FIG. 15). Screw members 140 can be inserted into the four screw insertion hole 142. In FIG. 15, two screw insertion holes 142 are shown. The second body 128 has a hole 146. In a state where the second body 128 is provided at a hole 144 formed in the first body 126, the valve mechanism 122 can be inserted into the hole 146.

The valve mechanism 122 includes a cylindrical valve plug 150, a shaft 152, and an operation part 154 provided at the shaft 152. The valve plug 150 is provided in the fluid channel 112a such that the valve plug 150 can be seated on a valve seat 148 formed in the first body 126. The shaft 152 extends from the valve plug 150 in a direction away from the valve seat 148 (in the Y1 direction). A male screw is formed on the outer circumferential surface of the shaft 152. The operation part 154 is fixed to the shaft 152 by screw member 156.

Four screw insertion holes 158 are formed in the valve support 124. In a state where the valve support 124 is provided on the second body 128, the screw insertion holes 158 communicate with the screw insertion holes 142 of the first body 126 (see FIGS. 13 and 15). The distance (pitch L3) between the adjacent screw insertion holes 158 in the Z direction is different from the above pitch L1. The valve support 124 has a first hole 160 and a second hole 162. The valve plug 150 can be inserted into the first hole 160. The second hole 162 communicates with the first hole 160, and the shaft 152 is positioned in the second hole 162. A female screw is formed on a wall surface of the second hole 162. The male screw of the shaft 152 can be screw engaged with the female screw of the second hole 162.

An annular seal member 164 for preventing the flow of the fluid into the second hole 162 is provided between the valve support 124 and the valve plug 150. An annular seal member 166 for preventing leakage of the fluid to the outside is provided between the valve support 124 and the first body 126.

The flow rate meter 114 includes a body 168 and a flow rate meter body 170 provided on the body 168. A fluid channel 114a is formed in the body 168 for communication between a fluid channel 112a of the flow rate regulating valve 112 and the inner hole 64a of the branch adaptor 64. An annular seal member 172 for preventing leakage of fluid to the outside is provided between the first body 126 and the body 168. An annular seal member 174 for preventing leakage of the fluid to the outside is provided between the body 168 and the branch adaptor 64.

The flow rate meter body 170 includes a display unit 176 for displaying the flow rate of the fluid flowing through the fluid channel 114a. The body 168 of the flow rate meter 114 and the branch adaptor 64 are fixed to the first body 126 by a plurality of (four) screw members 178 (see FIG. 15). In FIG. 15, two screw members 178 are shown.

In the connector member 110, at the time of closing the flow rate regulating valve 112, the valve plug 150 is seated on the valve seat 148 to interrupt communication between the branch port 36 and the fluid channel 114a of the flow rate meter 114 (see FIG. 14).

At the time of opening the flow rate regulating valve 112, the operation part 154 is rotated. As a result, the shaft 152 is displaced relative to the valve support 124 toward the operation part 154. Therefore, the valve plug 150 is spaced from the valve seat 148, and the branch port 36 and the fluid channel 114a of the flow rate meter 114 are placed into communication with each other (see FIG. 16). At this time, by regulating the rotation amount of the operation part 154, it is possible to change the distance between the valve plug 150 and the valve seat 148, and accordingly increase/decrease the flow rate of fluid flowing through the space between the valve plug 150 and the valve seat 148.

As can be seen from FIGS. 13 and 15, in the connector member 110, the screw insertion holes 158 of the valve support 124 communicate with the through holes 56, 58 of the outer surface 29a through the respective screw insertion holes 142 of the first body 126. In this case, a pair of fixing plates (fixing members) 182 are attached to the manifold block 12. The pair of fixing plates (fixing members) 182 each have two attachment holes 180. The screw members 140 inserted into the screw insertion holes 158 and the screw insertion holes 142 can be screw engaged with the attachment holes 180.

That is, the distance (pitch L4) between the two attachment holes 180 of the fixing plates 182 is the same as the pitch L3 between the screw insertion holes 158 of the valve support 124. The pitch between the screw insertion holes 142 of the first body 126 is the same as the pitch L3. Stated otherwise, the positions of the screw insertion holes 158 and the screw insertion holes 142 of the flow rate regulating valve 112 correspond to the positions of the attachment holes 180 of the fixing plates 182.

In the structures, the screw insertion holes 158 and the attachment holes 180 can communicate with each other through the through holes 56, 58 and the screw insertion holes 142. In this manner, by inserting the screw members 140 into the screw insertion holes 158 and the screw insertion holes 142 and bringing the screw members 140 into screw engagement with the attachment holes 180 of the fixing plate 182, it is possible to attach the connector member 110 to the manifold block 12 easily.

Figure 17:
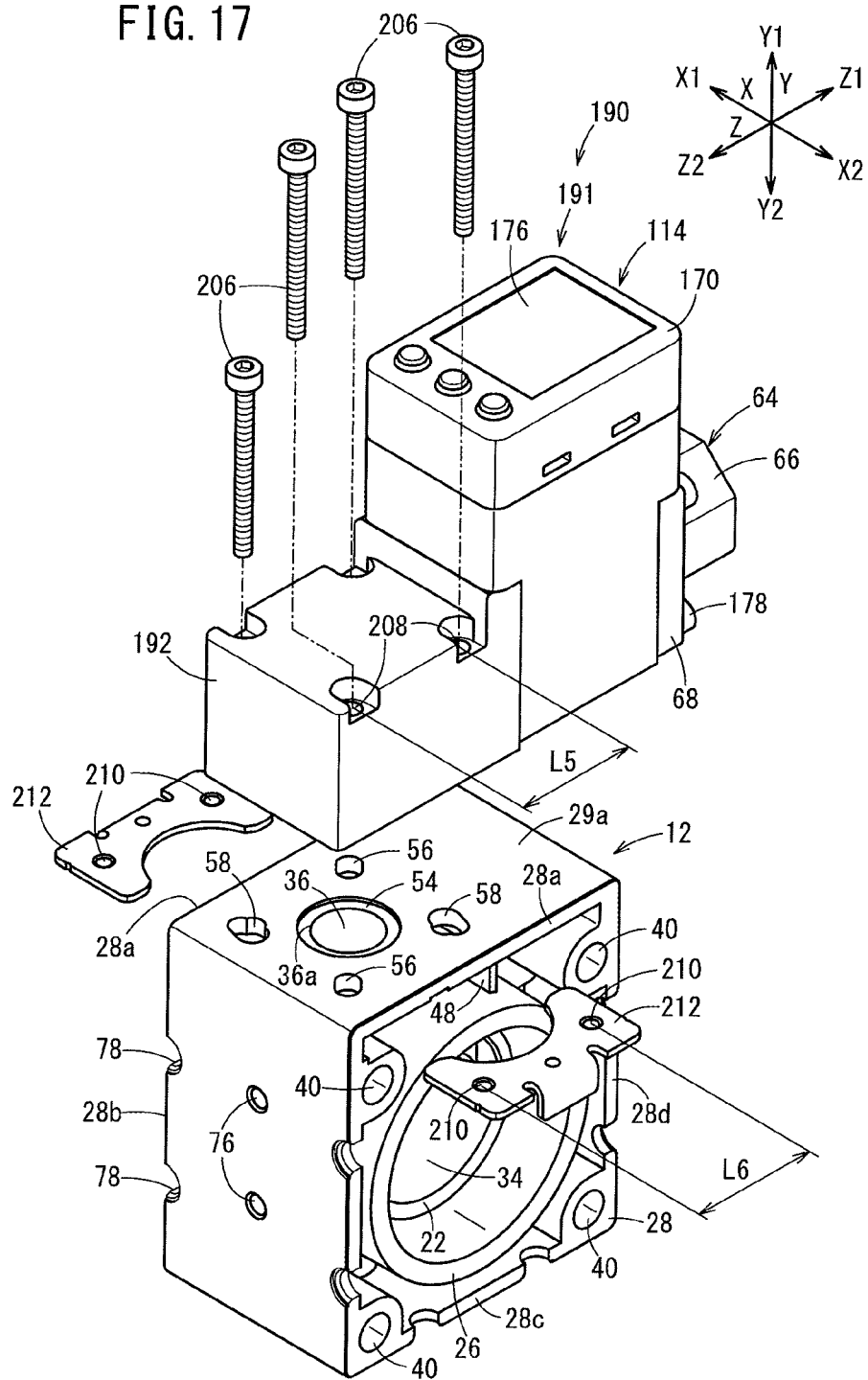
FIG. 17 is an exploded perspective view of the connector member and the manifold block according to a second modified example.
Figure 18:
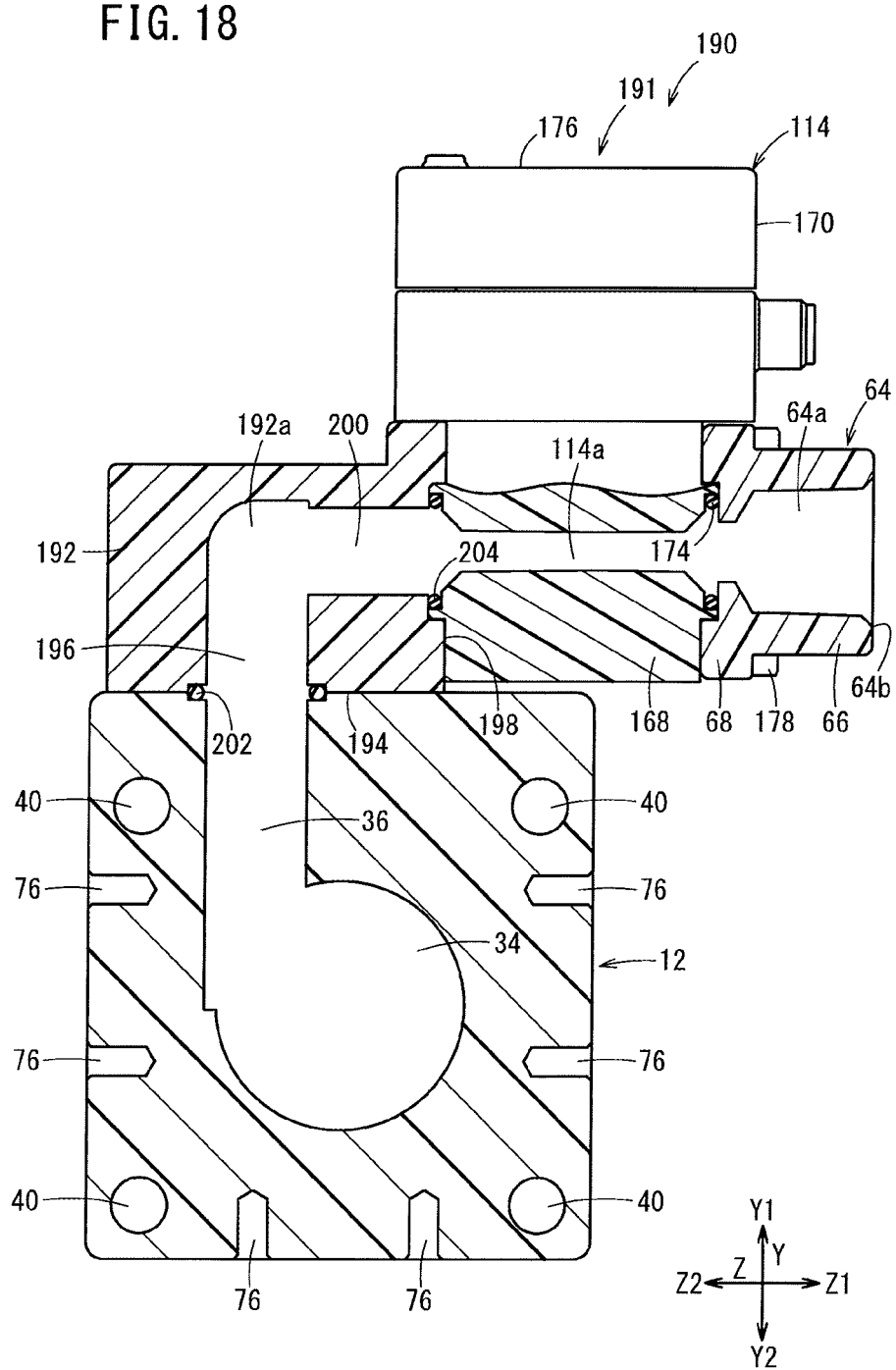
FIG. 18 is a first vertical cross sectional view of the connector member and the manifold block shown in FIG. 17.
Figure 19:
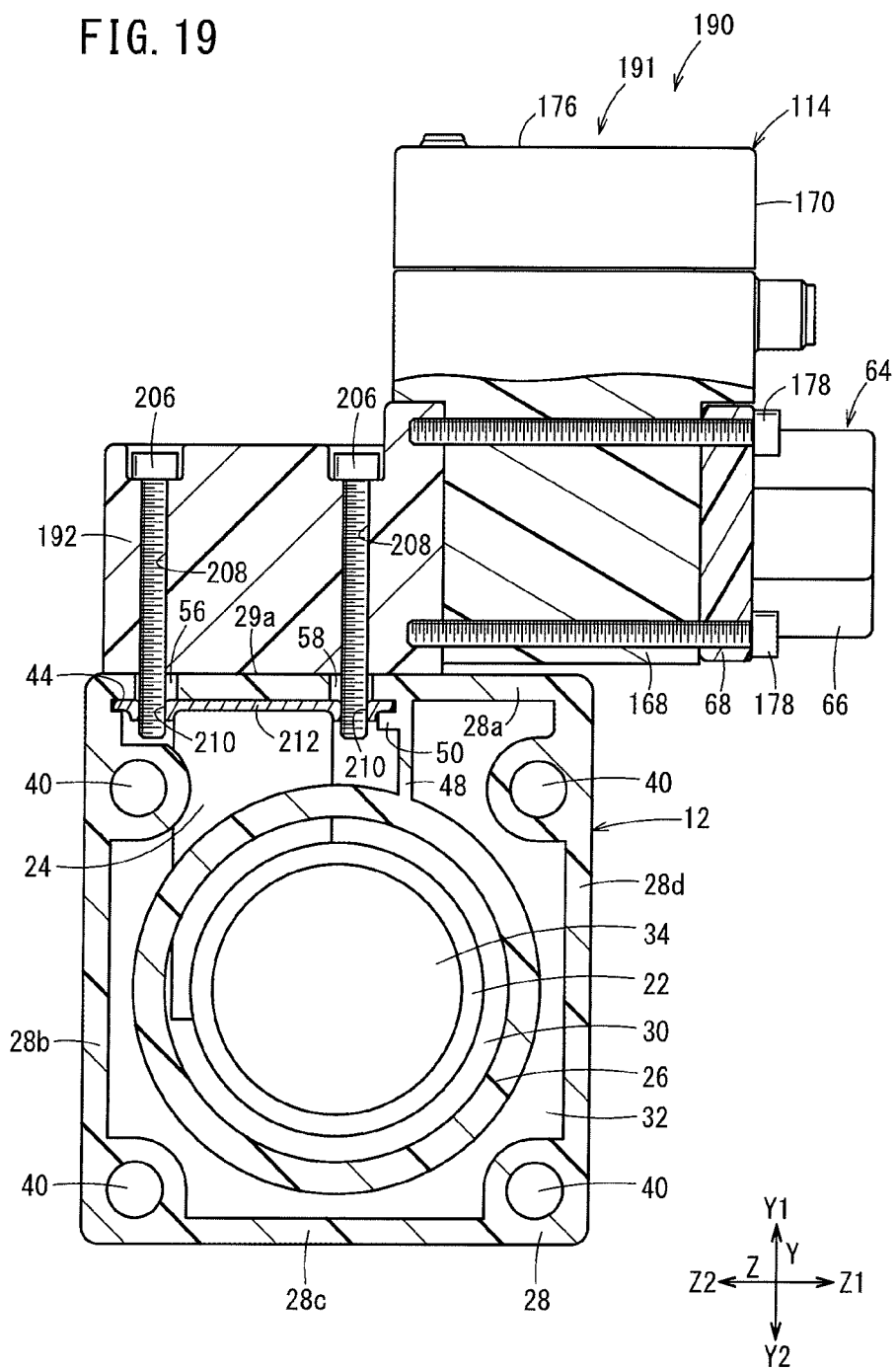
FIG. 19 is a second vertical cross sectional view of the connector member and the manifold block shown in FIG. 17.

In the embodiment of the present invention, for example, as shown in FIGS. 17 to 19, instead of the connector member 62, a connector member 190 may be attached to the outer surface 29a of the manifold block 12. The constituent elements of the connector member 190 that are identical to those of the above described connector members 62, 110 are labeled with the same reference numeral, and detailed description thereof is omitted.

As shown in FIG. 17, the connector member 190 includes a connector member body 191 attached to the outer surface 29a of the manifold block 12, and a branch adaptor 64 provided on the connector member body 191. The connector member body 191 includes a coupling block 192 and a flow rate meter 114 provided on the coupling block 192.

As shown in FIG. 18, the coupling block 192 includes a fluid channel 192a for allowing the branch port 36 and the fluid channel 114a of the flow rate meter 114 to communicate with each other. The fluid channel 192a includes a first communication port 196 and a second communication port 200. The first communication port 196 is opened on a first attachment surface (first outer surface) 194 of the coupling block 192 attached to the outer surface 29a of the manifold block 12, and communicates with the branch port 36. The second communication port 200 is opened on a second attachment surface (second outer surface) 198 of the coupling block 192 extending perpendicular to the first attachment surface 194, and communicates with the inner hole 64a of the branch adaptor 64. That is, the branch port 36 communicates with the inner hole 64a of the branch adaptor 64 through the fluid channel 192a of the coupling block 192 and the fluid channel 114a of the flow rate meter 114.

An annular seal member 202 for suppressing leakage of the fluid to the outside is provided between the coupling block 192 and the manifold block 12. An annular seal member 204 for suppressing leakage of the fluid to the outside is provided between the coupling block 192 and the body 168 of the flow rate meter 114.

Four screw insertion holes 208 pass through the coupling block 192. The screw insertion holes 208 extend in a direction perpendicular to the first attachment surface 194, and screw members 206 can be inserted into the four screw insertion holes 208 (see FIGS. 17 and 19). The distance (pitch L5) between the screw insertion holes 208 that are adjacent to each other in the Z direction is different from the above pitches L1, L3.

In FIGS. 17 and 19, the screw insertion holes 208 of the coupling block 192 are connected to through holes 56, 58 of the outer surface 29a. In this case, a pair of fixing plates (fixing members) 212 are attached to the manifold block 12. Two attachment holes 210 are formed in each of the fixing plates 212. The screw members 206 inserted into the screw insertion holes 208 can be fitted into the respective attachment holes 210. That is, the distance (pitch L6) between the two attachment holes 210 of each of the fixing plates 212 is the same as the pitch L5 between the screw insertion holes 208 of the coupling block 192. Stated otherwise, the positions of the screw insertion holes 208 of the coupling block 192 correspond to the positions of the attachment holes 210 of the fixing plates 212.

In the structure, the screw insertion holes 208 and the attachment holes 210 can communicate with each other through the through holes 56, 58. Therefore, by inserting the screw members 206 into the screw insertion holes 208 and bringing the screw members 206 into screw engagement with the attachment holes 210 of the fixing plates 212, it is possible to attach the connector member 190 to the manifold block 12 easily.

Further, since the connector member 190 has the coupling block 192, it is possible to change the orientation of the opening 64b of the branch adaptor 64 relative to the manifold block 12 easily. Stated otherwise, the opening 64b of the branch adaptor 64 can be oriented in perpendicular to the direction in which the outer surface 29a of the manifold block 12 faces.

In the embodiment of the present invention, for example, as shown in FIGS. 20 to 23, instead of the connector member 62, a connector member 220 may be attached to the outer surface 29a of the manifold block 12. The constituent elements of the connector member 220 that are identical to those of the above described connector members 62, 110, 190 are labeled with the same reference numeral, and the detailed description thereof is omitted.

Figure 20:
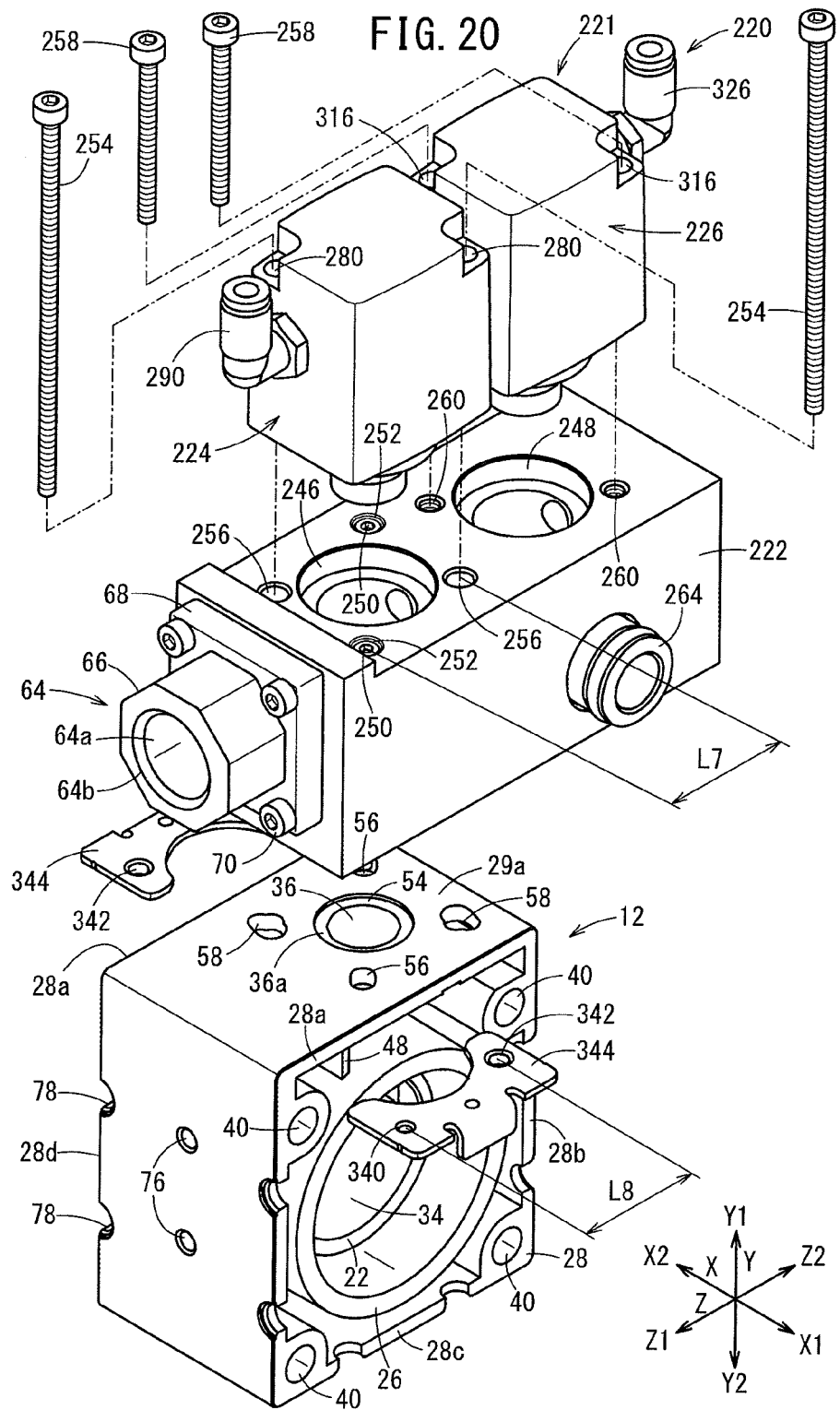
FIG. 20 is an exploded perspective view of a connector member and a manifold block according to a third modified example.

As shown in FIG. 20, the connector member 220 includes a connector member body 221 attached to the outer surface 29a of the manifold block 12 and a branch adaptor 64 provided on the connector member body 221. The connector member body 221 includes a rectangular parallelepiped intermediate block 222, and a first open/close valve 224 and a second open/close valve 226 arranged alongside on the intermediate block 222.

Figure 21:
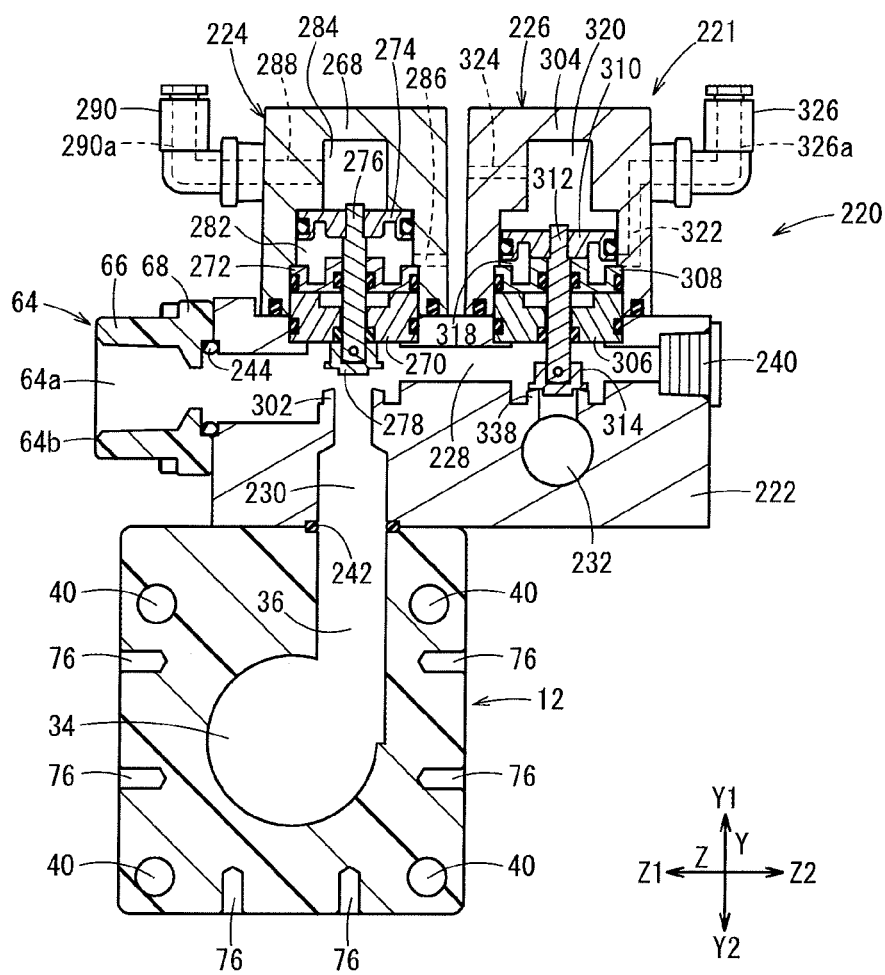
FIG. 21 is a first vertical cross sectional view of the connector member and the manifold block shown in FIG. 20.

As shown in FIG. 21, the intermediate block 222 includes an intermediate channel 228 communicating with the inner hole 64a of the branch adaptor 64, a first inlet port (first intermediate communication port) 230 for allowing the branch port 36 and the intermediate channel 228 to communicate with each other, and a second inlet port (second intermediate communication port) 232 communicating with the intermediate channel 228.

The intermediate channel 228 passes through the intermediate block 222 in a longitudinal direction of the intermediate block 222. One end of the intermediate channel 228 is connected to the inner hole 64a of the branch adaptor 64 provided at one end surface (end surface in the Z1 direction) of the intermediate block 222. The other end of the intermediate channel 228 is closed by a plug 240. The first inlet port 230 is opened on a side surface positioned in a direction perpendicular to the longitudinal direction of the intermediate block 222. The second inlet port 232 is opened on a side surface positioned in a direction perpendicular to the longitudinal direction of the intermediate block 222 and which is different from the side surface where the first inlet port 230 is opened.

An annular seal member 242 for suppressing leakage of the fluid to the outside is provided between the intermediate block 222 and the manifold block 12. An annular seal member 244 for suppressing leakage of the fluid to the outside is provided between the intermediate block 222 and the branch adaptor 64.

Figure 22:
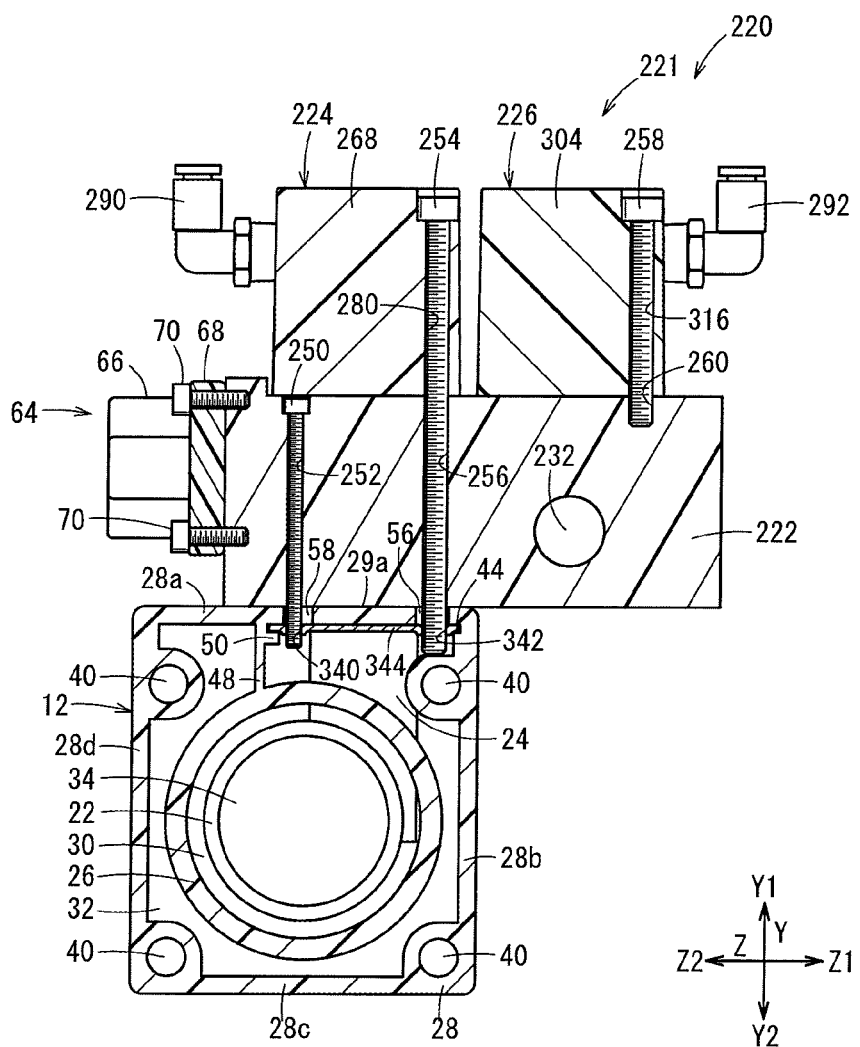
FIG. 22 is a second vertical cross sectional view of the connector member and the manifold block shown in FIG. 20.

As shown in FIGS. 20 to 22, on a surface of the intermediate block 222 opposite to the side surface where the first inlet port 230 is opened, a first hole 246 where the first open/close valve 224 is provided, a second hole 248 where the second open/close valve 226 is provided, two screw insertion holes 252 to which screw members 250 can be inserted, two screw insertion holes 256 to which screw members 254 can be inserted, and two screw holes 260 with which screw members 258 can be screw engaged are formed.

The first hole 246 and the second hole 248 are arranged in the longitudinal direction of the intermediate block 222. The screw insertion holes 252 and the screw insertion holes 256 pass through the intermediate block 222 in the Y direction. The hole diameter of the screw insertion hole 252 is smaller than the hole diameter of the screw insertion hole 256. Further, in FIG. 20, the screw insertion holes 252 and the screw insertion holes 256 are provided alternately along the edge of the first hole 246. The distance (pitch L7) between the screw insertion hole 252 and the screw insertion hole 256 that are adjacent to each other in the Y direction is different from the above described pitches L1, L3, and L5. The screw holes 260 are provided along the edge of the second hole 248.

Further, a connector 264 to which an inlet tube (not shown) is connectable is provided on the second inlet port 232 of the intermediate block 222. Fluid such as water (which will also be hereinafter referred to as a first fluid) is present in the intermediate channel 228, the inner hole 64a of the branch adaptor 64, and the above described branch tube 61. The inlet tube is provided for introducing fluid such as pressurized air (which will also be hereinafter referred to as a second fluid) into the second inlet port 232 to discharge the first fluid.

As shown in FIG. 21, the first open/close valve 224 opens/closes the first inlet port 230 by operation of working fluid. The first open/close valve 224 includes a valve body 268, an outer end block 270 and an inner end block 272 for closing an opening as a hole formed in the valve body 268, a piston 274 provided movably in the valve body 268, a rod 276 joined to the piston 274, and a valve plug 278 provided on the rod 276.

As shown in FIGS. 20 and 22, two screw insertion holes 280 are formed in the valve body 268. The screw insertion holes 280 communicate with the screw insertion holes 256 of the intermediate block 222. The screw insertion holes 280 extend in the direction in which the screw insertion holes 256 extend. In FIG. 21, a first chamber 282 is formed between the piston 274 and the inner end block 272, and a second chamber 284 is formed on a side of the piston 274 opposite to the inner end block 272.

A vent port 286 and a drive port 288 are formed in the valve body 268. The vent port 286 communicates with the first chamber 282, and is opened to the atmospheric air. The drive port 288 communicates with the second chamber 284, and suctions/discharges the working fluid. The drive port 288 communicates with an inner hole 290a of a fitting 290 provided on the valve body 268. A tube (not shown) as a passage of the working fluid is connected to the fitting 290.

The rod 276 passes through the outer end block 270 and the inner end block 272. The valve plug 278 is provided in the intermediate channel 228 in a manner that the valve plug 278 can be seated on a first valve seat 302 formed in the intermediate block 222.

The second open/close valve 226 opens/closes a second inlet port 232, and basically has the same structure as the first open/close valve 224. That is, the second open/close valve 226 includes a valve body 304, an outer end block 306, an inner end block 308, a piston 310, a rod 312, and a valve plug 314. Two screw insertion holes 316 are formed in the valve body 304 of the second open/close valve 226. The screw insertion holes 316 communicate with the screw holes 260 of the intermediate block 222 (see FIGS. 20 and 22). The second open/close valve 226 is fixed to the intermediate block 222 by inserting the screw members 258 into the screw insertion holes 316, and bringing the screw members 258 into screw engagement with the screw holes 260.

A first chamber 318 is formed between the piston 310 and the inner end block 308, and a second chamber 320 is formed on a side of the piston 310 opposite to the inner end block 308. A drive port 322 and a vent port 324 are formed in the valve body 304 of the second open/close valve 226. The drive port 322 communicates with the first chamber 318 on the inner end block 308 side, and suctions/discharges the working fluid. The vent port 324 communicates with the second chamber 320, and is opened to the atmospheric air. The drive port 322 communicates with an inner hole 326a of a fitting 326 provided on the valve body 304. A tube (not shown) as a passage of the working fluid is connected to the fitting 326. The valve plug 314 is provided in the intermediate channel 228 in a manner that the valve plug 314 can be seated on a second valve seat 338 formed in the intermediate block 222.

In the connector member 220, the first open/close valve 224 is in the form of a normally open valve, and the second open/close valve 226 is in the form of a normally closed valve. That is, in a state where no working fluid is supplied to the second chamber 284 of the first open/close valve 224, the valve plug 278 of the first open/close valve 224 is separated from the first valve seat 302. Consequently, the branch port 36 and the intermediate channel 228 are brought into communication with each other. In the structure, for example, the first fluid that branches off from the main port 34 to the branch port 36 can be guided to a fluid supply destination (not shown) through the first inlet port 230, the intermediate channel 228, the inner hole 64a of the branch adaptor 64, and the branch tube 61.

Further, in a state where no working fluid is supplied to the first chamber 318 of the second open/close valve 226, the valve plug 314 of the second open/close valve 226 is seated on the second valve seat 338, and the second inlet port 232 is disconnected from the intermediate channel 228. Therefore, the first fluid guided from the branch port 36 to the intermediate channel 228 does not flow into the second inlet port 232.

Figure 23:
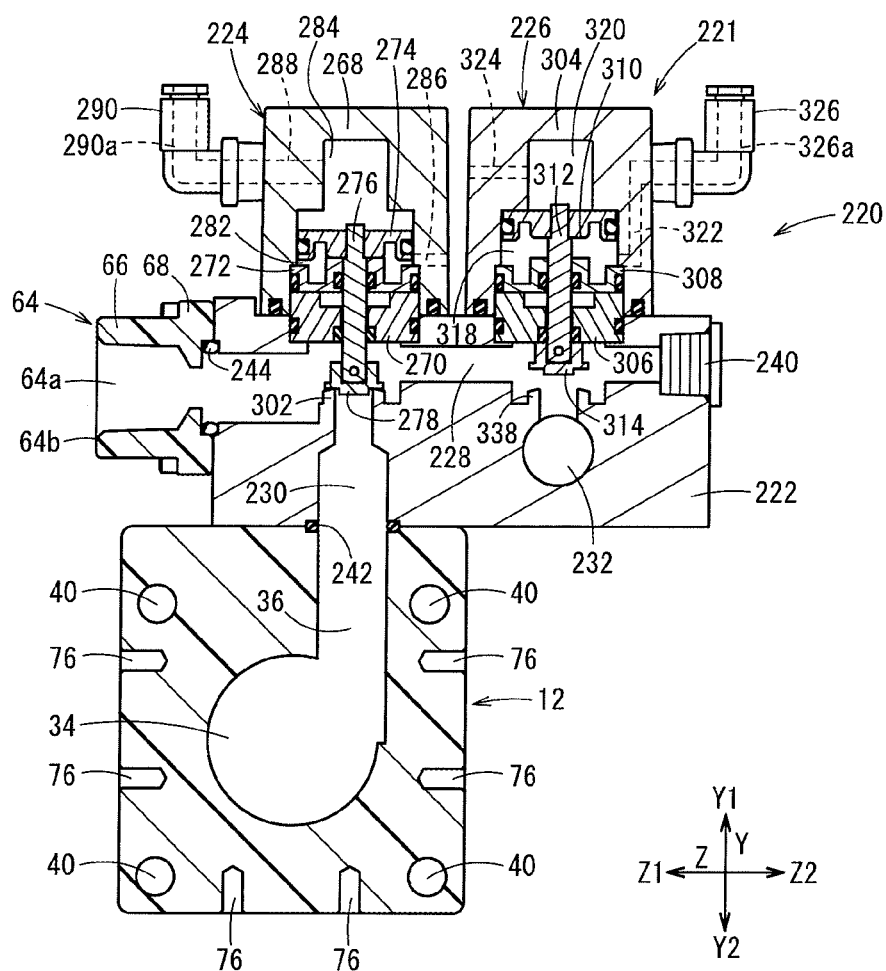
FIG. 23 is a view for explaining operation of the connector member shown in FIG. 20.

As shown in FIG. 23, when the working fluid is supplied to the second chamber 284 of the first open/close valve 224, the valve plug 278 of the first open/close valve 224 is seated on the first valve seat 302, and the branch port 36 is disconnected from the intermediate channel 228. Consequently, for example, the flow of the first fluid from the branch port 36 to the intermediate channel 228 is interrupted.

When the working fluid is supplied to the first chamber 318 of the second open/close valve 226, the valve plug 314 of the second open/close valve 226 is separated from the second valve seat 338, and the second inlet port 232 and the intermediate channel 228 are brought into communication with each other. In the structure, it is possible to supply the second fluid from the second inlet port 232 to the intermediate channel 228, and discharge the first fluid which is present in the intermediate channel 228, the inner hole 64a of the branch adaptor 64 and the branch tube 61.

In the connector member 220, the screw insertion holes 252 of the intermediate block 222 are connected to the through holes 56 of the manifold block 12, and the screw insertion holes 280 of the first open/close valve 224 are connected to the through holes 58 of the manifold block 12 through the screw insertion holes 256 of the intermediate block 222. In this case, a pair of fixing plates (fixing members) 344 are attached to the manifold block 12. The fixing plates 344 have attachment holes 340 which can be screw engaged with the screw members 250 inserted into the screw insertion holes 252, and attachment holes 342 which can be screw engaged with the screw members 254 inserted into the screw insertion holes 256 and the screw insertion holes 280. The hole diameter of the attachment hole 342 is larger than the hole diameter of the attachment hole 340.

The distance (pitch L8) between the attachment hole 340 and the attachment hole 342 of each of the fixing plates 344 is the same as the pitch L7 between the screw insertion hole 252 and the screw insertion hole 256. Stated otherwise, the positions of the screw insertion holes 252 and the screw insertion holes 256 correspond to the positions of the attachment holes 340 and the attachment holes 342 of the fixing plates 344.

Therefore, it is possible to connect the screw insertion holes 252 and the attachment holes 340 through the through holes 56, and connect the screw insertion holes 256 and the attachment holes 342 through the through holes 58. Thus, by bringing the screw members 250 inserted into the screw insertion holes 252 into screw engagement with the attachment holes 340 of the fixing plate 344, and bringing the screw members 254 inserted into the screw insertion holes 256 and the screw insertion holes 280 into screw engagement with the attachment holes 342 of the fixing plate 344, it is possible to attach the connector member 220 to the manifold block 12 easily.

As described above, in the embodiment of the present invention, using the plurality of types of fixing plates 60, 182, 212, and 344, it is possible to attach the plurality of types of connector members 62, 110, 190 220 to the manifold block 12. Therefore, in the manifold apparatus 10A, the plurality of types of connector members 62, 110, 190, and 220 can be used mixedly. Accordingly, it is possible to improve the flexibility in the design of the manifold apparatus 10A. Further, it is possible to attach connector members 386, 388, 420, 422, 538 described later to the outer surface 29a of the manifold block 12. It is possible to reduce the size, and improve the flexibility in the design of the manifold apparatus 10A.

Second Embodiment

Next, a manifold apparatus 10B according to a second embodiment of the present invention will be described with reference to FIGS. 24 and 25. The constituent elements of the manifold apparatus 10B according to the second embodiment that are identical to those of the manifold apparatus 10A according to the first embodiment are labeled with the same reference numeral, and detailed description thereof is omitted.

Figure 24:
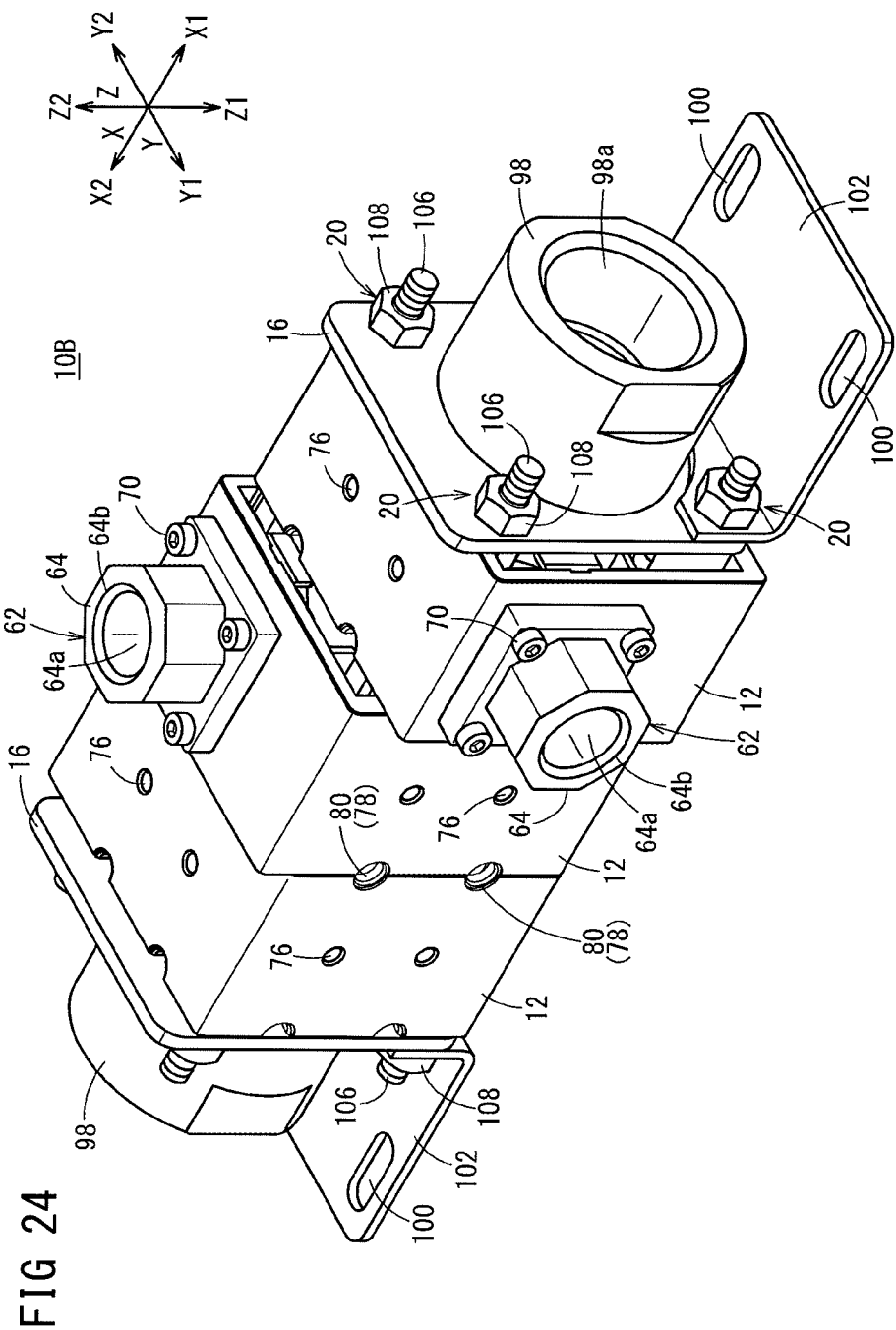
FIG. 24 is a perspective view of a manifold apparatus according to a second embodiment of the present invention.
Figure 25:
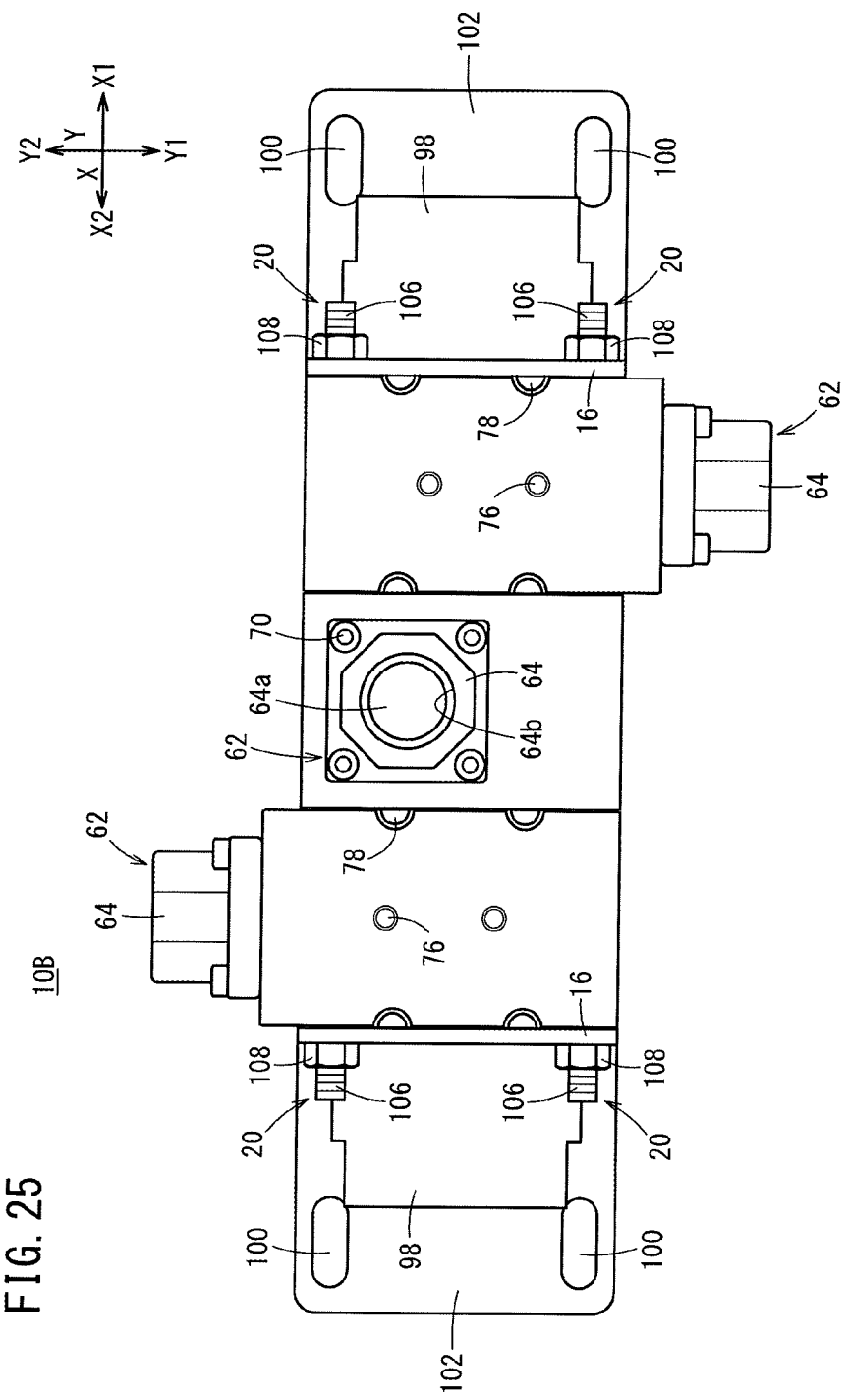
FIG. 25 is a plan view of the manifold apparatus shown in FIG. 24.

As shown in FIG. 24, in the manifold apparatus 10B according to the embodiment of the present invention, three manifold blocks 12 are coupled together with a relative phase shift of 90° about the axial line of the main port 34 such that the openings 64b of the branch adaptors 64 are oriented in different directions. That is, the opening 64b of the branch adaptor 64 positioned at an end in the X1 direction is oriented in the Y1 direction, the opening 64b of the branch adaptor 64 positioned at the center in the X direction is oriented in the Z2 direction, and the opening 64b of the branch adaptor 64 at an end in the X2 direction is oriented in the Y2 direction.

In the embodiment of the present invention, four insertion holes 40 of each of the manifold blocks 12 are provided at the equal distance from the axial line Ax1 of the main port 34 with the phase shift (angular interval) of 90° about the axial line of the main port 34. Therefore, alignment of the positions of the insertion holes 40 of the manifold blocks 12 can be made in a state where the manifold blocks 12 are rotated relatively at predetermined angles (90°, 180°, 270°) about the axial line of the main port 34.

That is, the opening 64b of the branch adaptor 64 attached to each of the manifold blocks 12 can be oriented to any of four directions (Y1 direction, Y2 direction, Z1 direction, Z2 direction). In this manner, for example, as shown in FIGS. 24 and 25, it is possible to design the structure of the manifold apparatus 10B in a manner that openings of the connector members 62 are oriented in different directions from one another. Accordingly, it is possible to design the orientation of the opening 64b of the branch adaptor 64 of each manifold block 12 more freely.

In the embodiment of the present invention, instead of the connector member 62, the above described connector members 110, 190, 220, or connector members 386, 388, 420, 422, 538 described later may be provided.

Third Embodiment

Next, a fluid flow system 360 including a manifold apparatus 10C according to a third embodiment will be described with reference to FIGS. 26 to 36. The constituent elements of the manifold apparatus 10C according to the third embodiment that are identical to those of the manifold apparatus 10A, 10B are labeled with the same reference numeral, and detailed description thereof is omitted.

Figure 26:
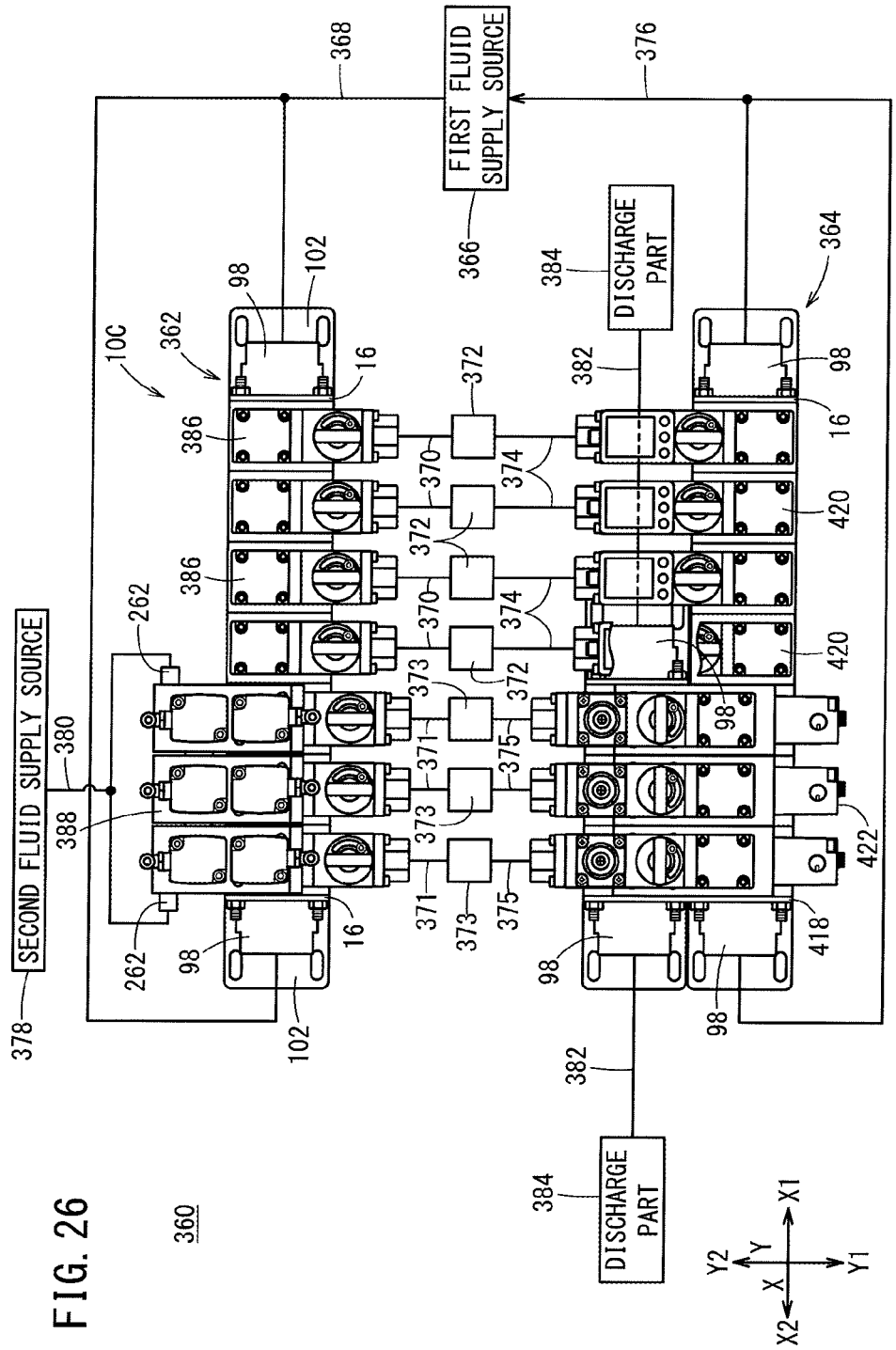
FIG. 26 is a view schematically showing a fluid flow system including a manifold apparatus according to a third embodiment of the present invention.

As shown in FIG. 26, the fluid flow system 360 includes the manifold apparatus 10C formed by combining a first unit 362 and a second unit 364. In the structure of the fluid flow system 360, the first fluid from a first fluid supply source 366 is returned to this first fluid supply source 366 through a first main tube 368, the first unit 362, first branch tubes 370, 371, fluid supply destinations 372, 373, second branch tubes 374, 375, the second unit 364, and a second main tube 376.

That is, the first main tube 368 couples the first fluid supply source 366 and the main adaptor 98 of the first unit 362. The first branch tubes 370 couple the branch adaptors 64 of the connector members 386 of the first unit 362 and the fluid supply destinations 372, and the first branch tubes 371 couple the branch adaptors 64 of the connector members 388 of the first unit 362 and the fluid supply destinations 373. The second branch tubes 374 couple the fluid supply destinations 372 and the branch adaptors 64 of the second unit 364. The second main tube 376 couples the main adaptor 98 of the second unit 364 and the first fluid supply source 366.

Further, the fluid flow system 360 has a so-called flush function for discharging the first fluid such as water present in the fluid channel from the fluid channel. That is, the fluid flow system 360 is configured to guide the second fluid of a second fluid supply source 378 to a discharge part 384 through an inlet tube 380, the first unit 362, the first branch tubes 371, the fluid supply destinations 373, the second branch tubes 375, the second unit 364, and a discharge tube 382.

Figure 27:
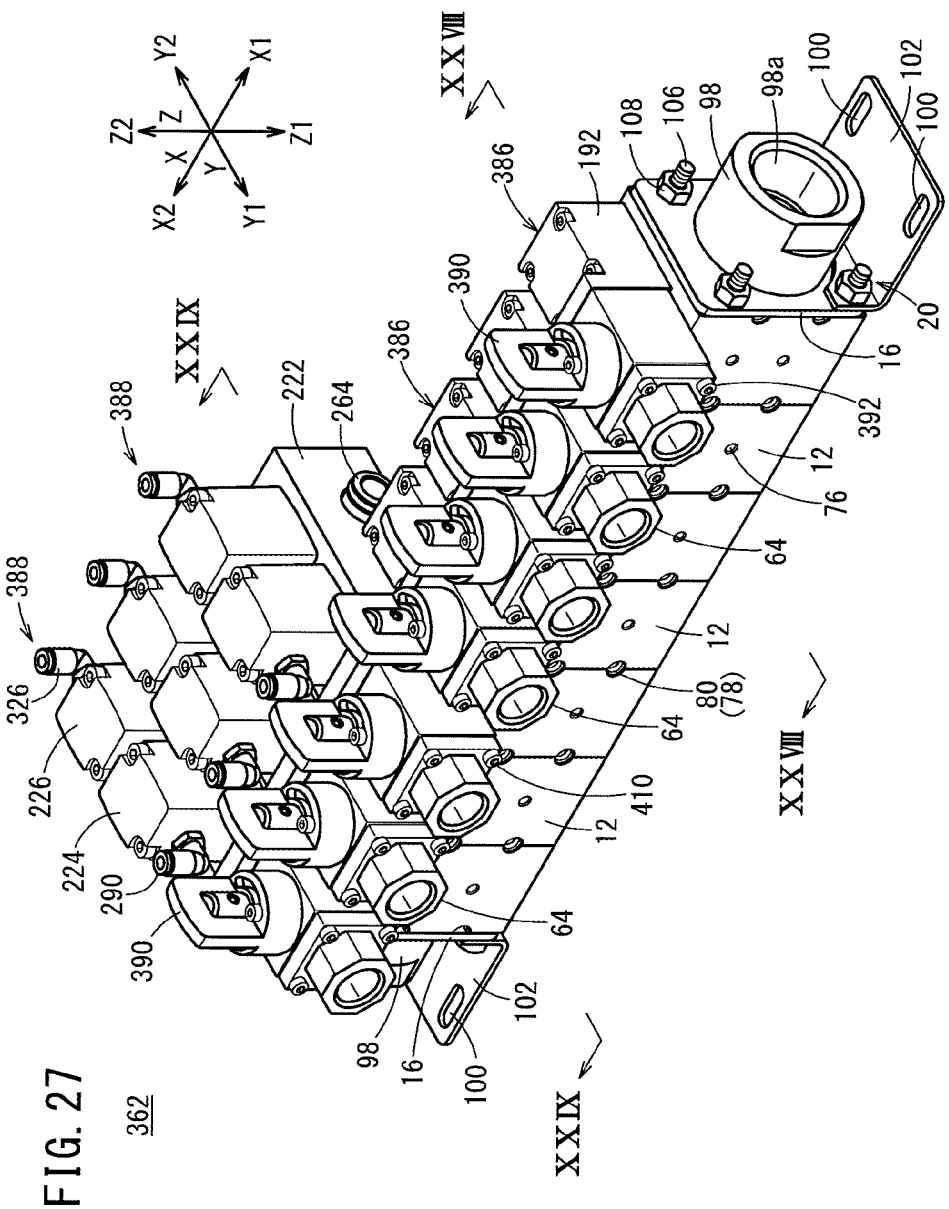
FIG. 27 is a perspective view of a first unit shown in FIG. 26.

As shown in FIG. 27, in the first unit 362, a plurality of (seven in FIG. 27) manifold blocks 12 are coupled together in a line. The connector member 386 is attached to each of four manifold blocks 12 arranged in the X1 direction, and a connector member 388 used for flushing is attached to each of three manifold blocks 12 arranged in the X2 direction.

Figure 28:
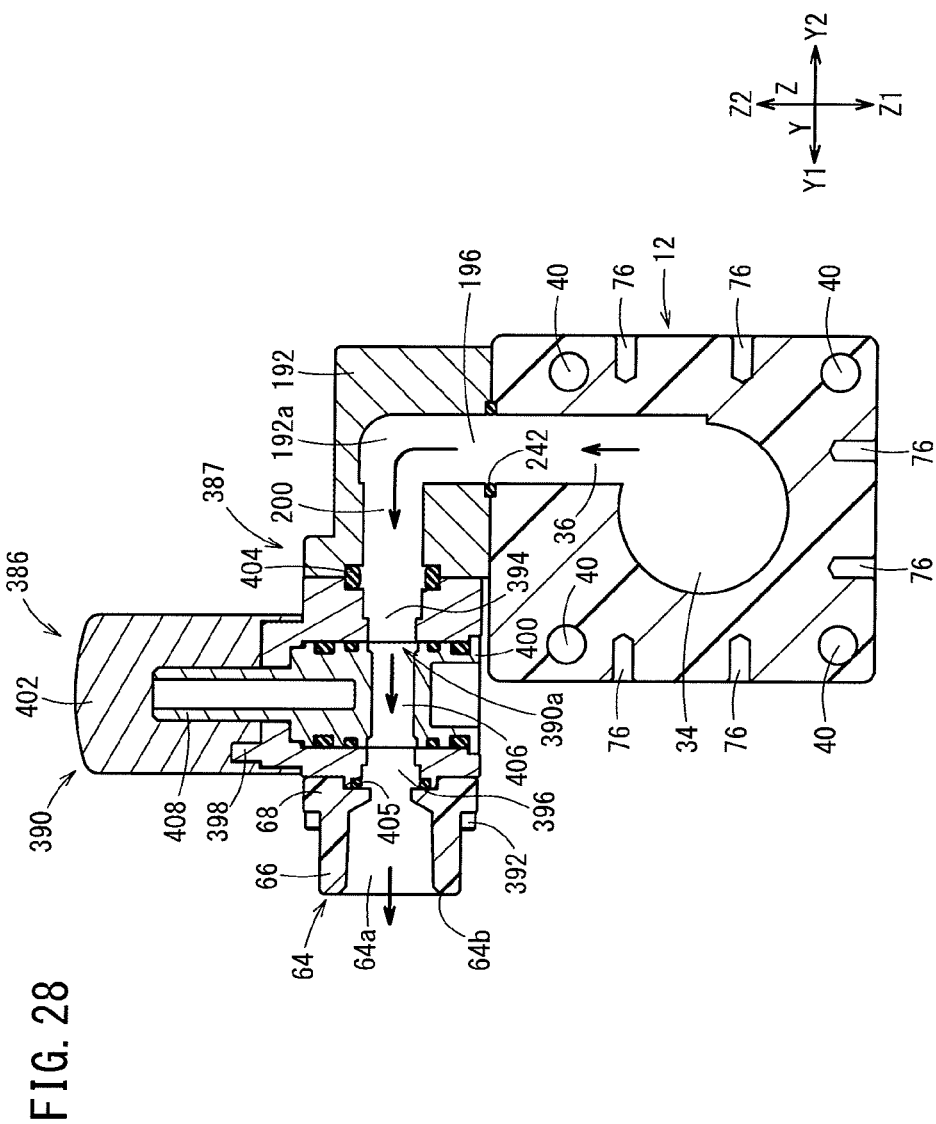
FIG. 28 is a cross sectional view taken along a line XXVIII-XXVIII in FIG. 27.

As shown in FIG. 28, the connector member 386 includes a connector member body 387 and a branch adaptor 64 provided on the connector member body 387. The connector member body 387 includes a coupling block 192 attached to the manifold block 12, and a stop valve 390 provided on the coupling block 192. The coupling block 192 and the branch adaptor 64 have the structure as described above. The branch adaptor 64 is provided on the stop valve 390. The stop valve 390 of the connector member 386 and the branch adaptor 64 are fixed to the coupling block 192 by a plurality of (four) screw members 392 (see FIG. 27).

The stop valve 390 includes a valve body 398, a cylindrical valve plug 400 provided on the valve body 398, and an operation part 402 for operating the valve plug 400. The valve body 398 has a first port 394 communicating with the fluid channel 192a of the coupling block 192, and a second port 396 communicating with the inner hole 64a of the branch adaptor 64. An annular seal member 404 for preventing leakage of fluid to the outside is provided between the valve body 398 and the coupling block 192. An annular seal member 405 for preventing leakage of the fluid to the outside is provided between the valve body 398 and the branch adaptor 64.

A through hole 406 passes through the valve plug 400 in a direction perpendicular to its axial direction. The through hole 406 connects the first port 394 and the second port 396 of the valve body 398, and forms a fluid channel 390a of the stop valve 390.

Further, the valve plug 400 is provided in the valve body 398 in a state where the valve plug 400 is rotatable about its axial line. A plurality of seal members are provided on the outer circumferential surface of the valve plug 400. The valve plug 400 includes a shaft 408 extending for exposure to the outside of the valve body 398, and the operation part 402 is fixed to the shaft 408. That is, the valve plug 400 and the operation part 402 are rotatable about the axial line of the valve plug 400 relative to the valve body 398.

In the connector member 386, by placing the operation part 402 at an open position (opening the stop valve 390), the through hole 406 of the valve plug 400 is brought into communication with the first port 394 and the second port 396. That is, the branch port 36 is brought into communication with the inner hole 64a of the branch adaptor 64 through the fluid channel 192a of the coupling block 192 and the fluid channel 390a of the stop valve 390. When the operation part 402 is rotated to a predetermined closed position (i.e., the stop valve 390 is closed), communication between the first port 394 and the second port 396 is interrupted by the valve plug 400.

Figure 29:
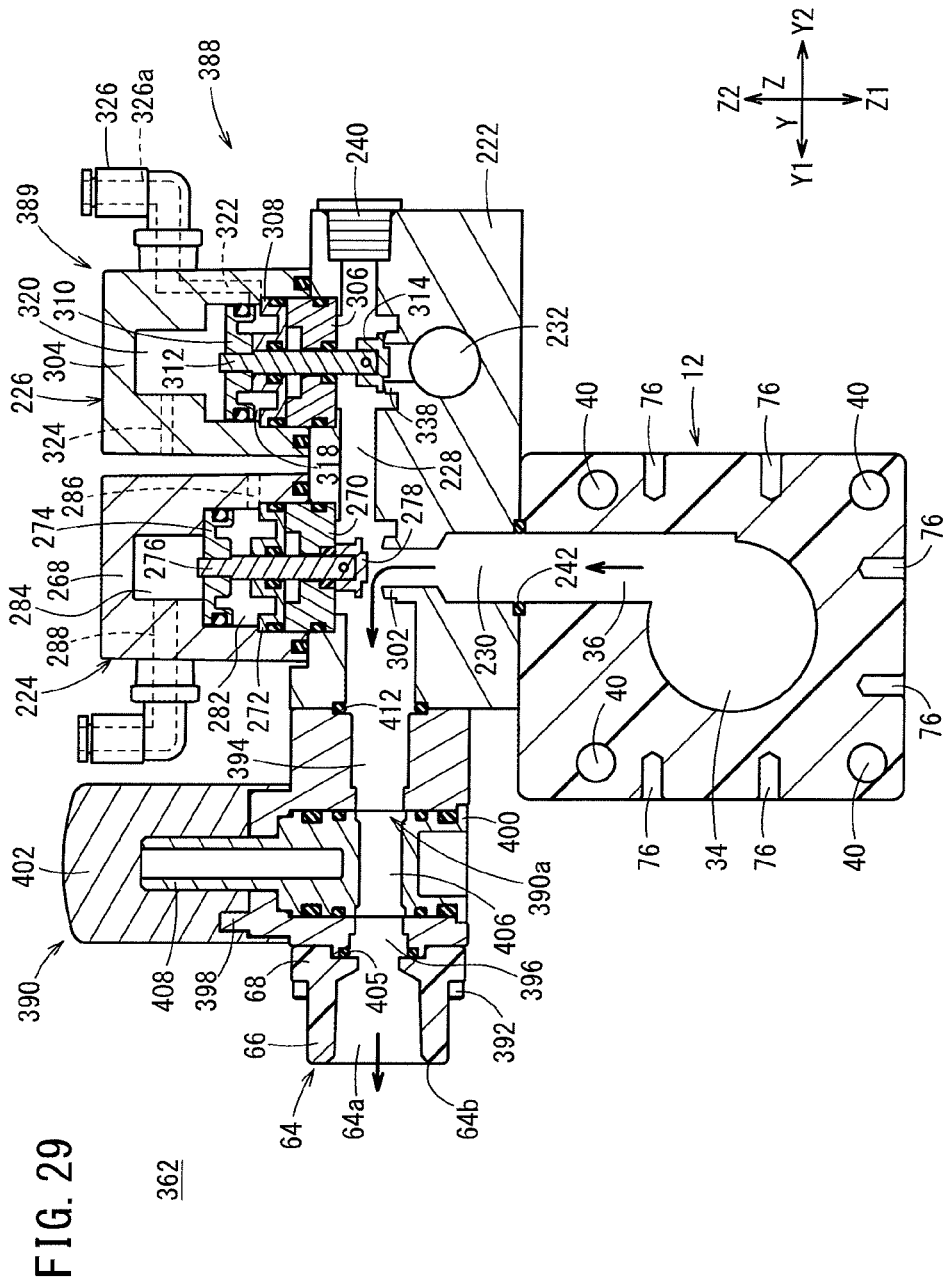
FIG. 29 is a cross sectional view taken along a line XXIX-XXIX in FIG. 27.

As shown in FIG. 29, the connector member 388 includes a connector member body 389 and a branch adaptor 64 provided on the connector member body 389. The connector member body 389 includes an intermediate block 222 attached to the manifold block 12, a first open/close valve 224 and a second open/close valve 226 provided on the intermediate block 222, and a stop valve 390 provided at an end of the intermediate block 222 in the longitudinal direction. The branch adaptor 64 is provided on the stop valve 390.

The intermediate block 222, the first open/close valve 224, the second open/close valve 226, the stop valve 390, and the branch adaptor 64 have the structure as described above. The stop valve 390 and the branch adaptor 64 of the connector member 388 are fixed to the intermediate block 222 by a plurality of (four) screw members 410 (see FIG. 27). Further, an annular seal member 412 for suppressing leakage of the fluid to the outside is provided between the valve body 398 of the stop valve 390 and the intermediate block 222.

In the connector member 388, in a state where the operation part 402 of the stop valve 390 is placed at an open position, and the valve plug 278 of the first open/close valve 224 is separated from the first valve seat 302, the branch port 36 is connected to the inner hole 64a of the branch adaptor 64 through the first inlet port 230 of the intermediate block 222, the intermediate channel 228, the first port 394 of the stop valve 390, the through hole 406, and the second port 396.

Figure 30:
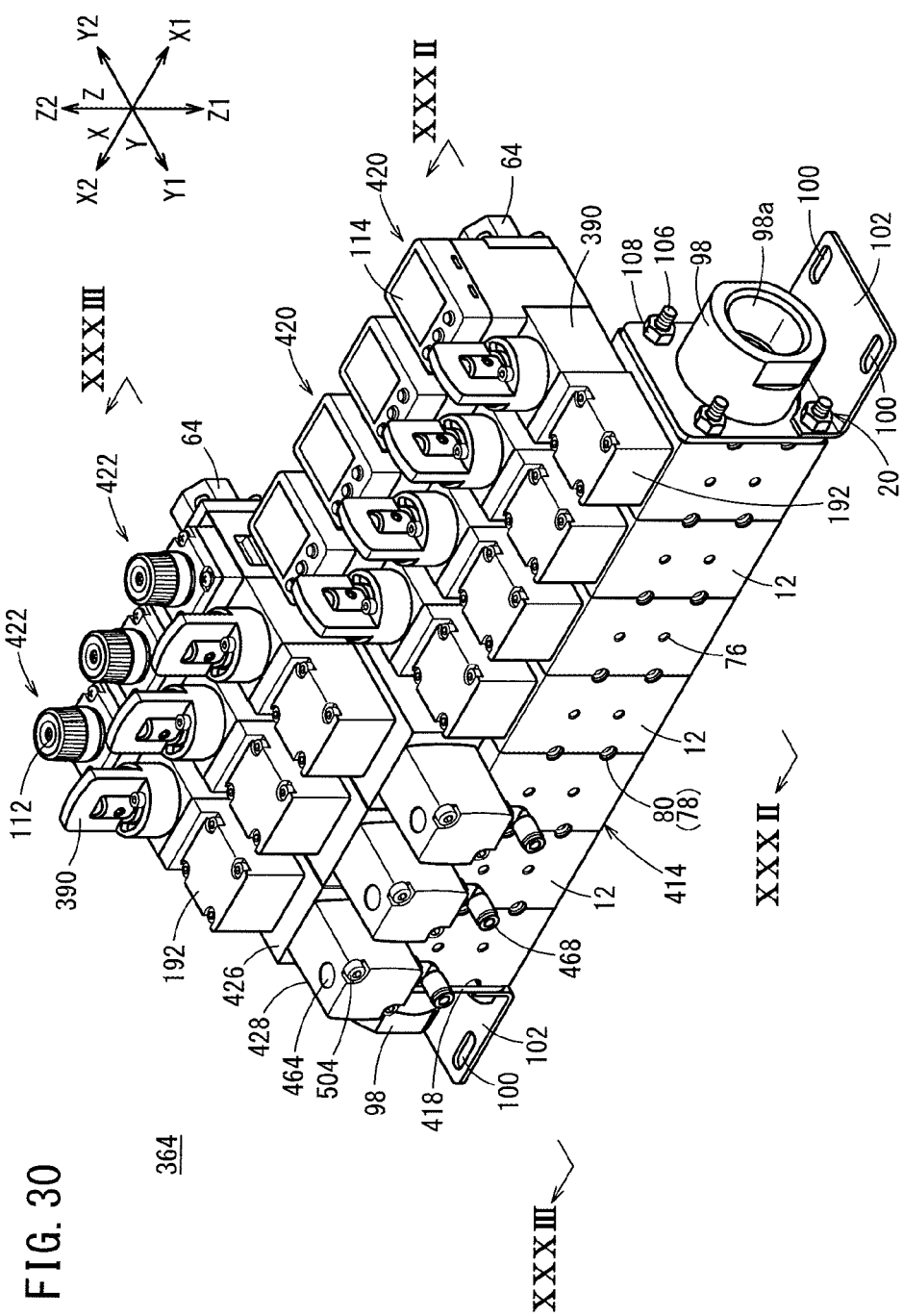
FIG. 30 is a perspective view of a second unit shown in FIG. 26.
Figure 31:
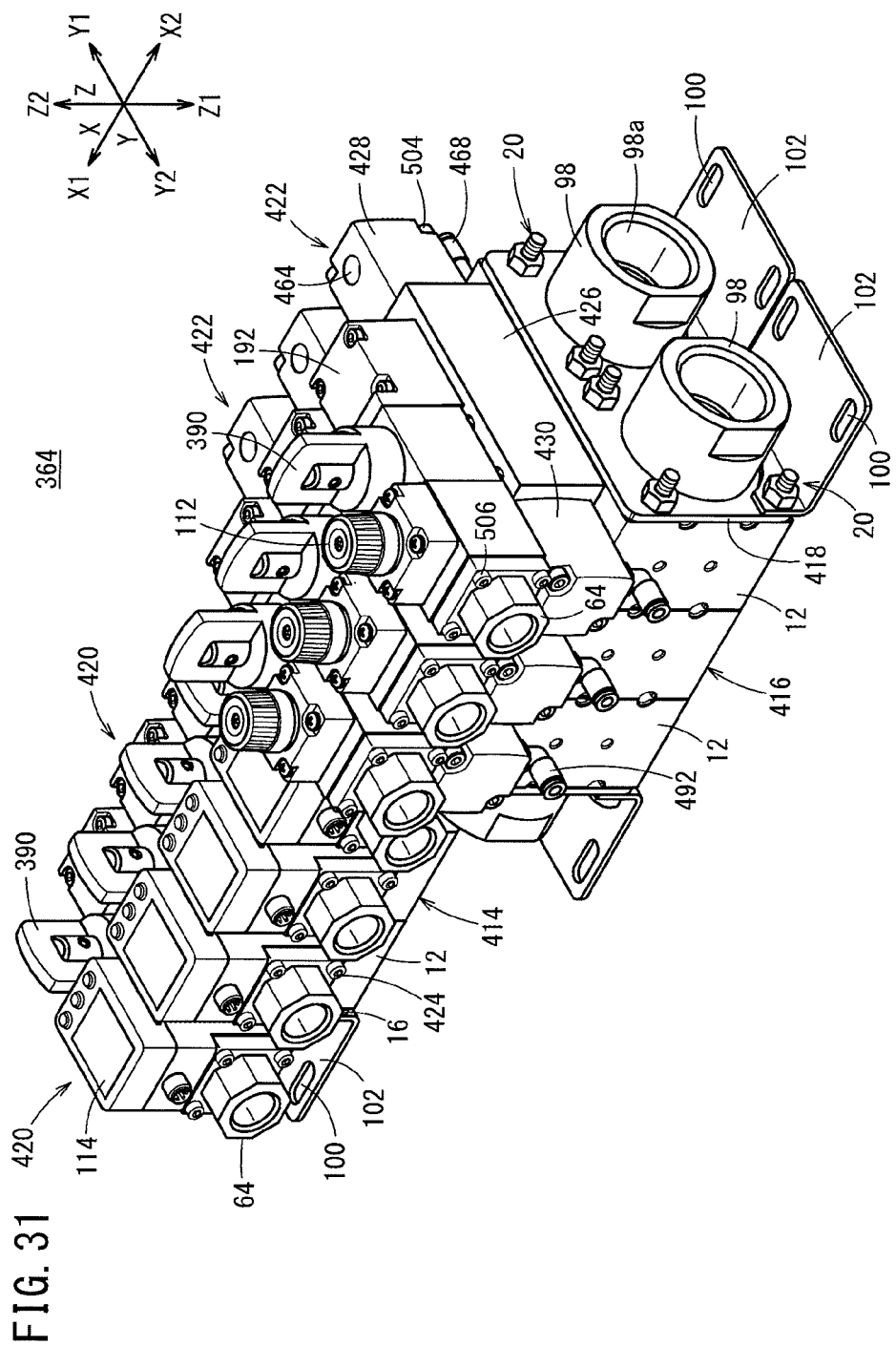
FIG. 31 is a perspective view of the second unit of FIG. 30 viewed from another angle.

As shown in FIGS. 30 and 31, in the second unit 364, a first manifold block group 414 containing seven manifold blocks 12 coupled together in the X direction and a second manifold block group 416 containing three manifold blocks 12 coupled together in the X direction are adjacent to each other in the Y direction. More specifically, three manifold blocks 12 in the first manifold block group 414 that are arranged in the X2 direction are adjacent to the three manifold blocks 12 of the second manifold block group 416 in the Y direction. An end plate 418 of the second unit 364 in the X2 direction is wider than the above described end plate 16 (the dimension of the end plate 418 in the Y direction is larger than that of the end plate 16).

The connector member 420 is connected to each of the four manifold blocks 12 in the first manifold block group 414 that are arranged in the X1 direction. The connector member 422 used for flushing is attached to each of the remaining three manifold blocks 12 in the first manifold block group 414 that are arranged in the X2 direction.

Figure 32:
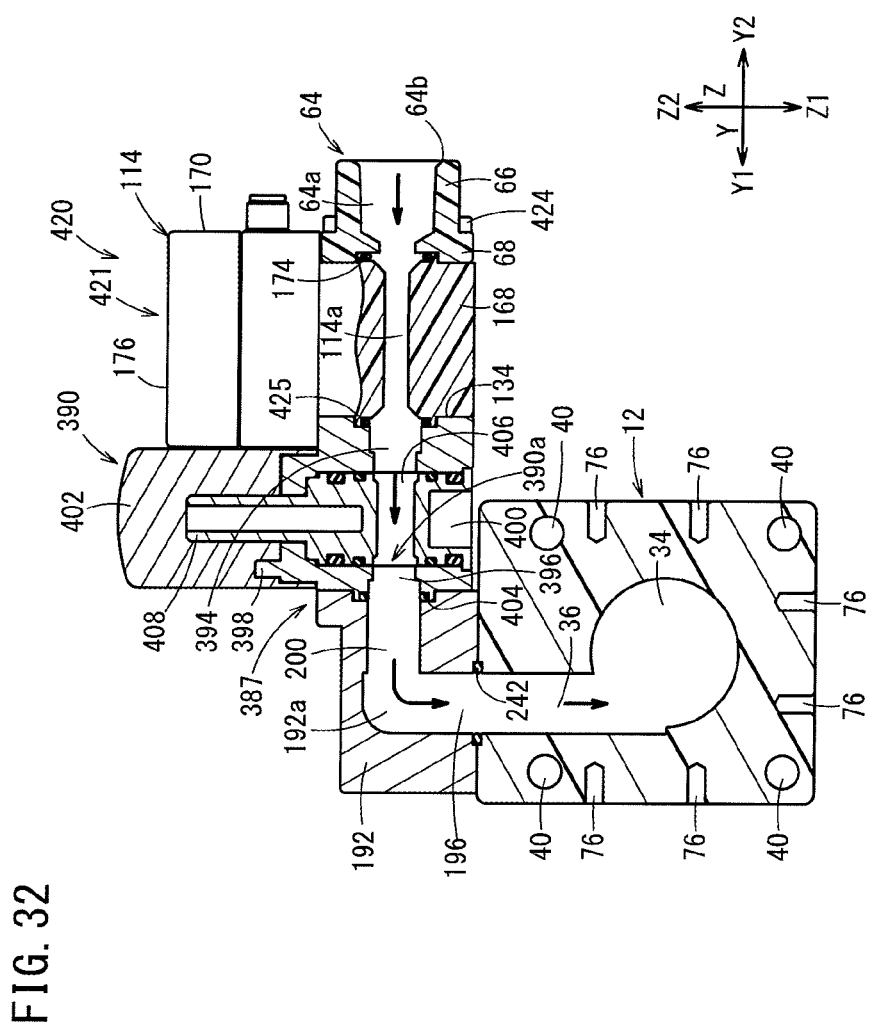
FIG. 32 is a cross sectional view taken along a line XXXII-XXXII in FIG. 30.

As shown in FIG. 32, the connector member 420 includes a connector member body 421 and a branch adaptor 64 provided on the connector member body 421. The connector member body 421 includes a coupling block 192 attached to the manifold block 12, a stop valve 390 provided on the coupling block 192, and a flow rate meter 114 provided on the stop valve 390. The branch adaptor 64 is provided on the flow rate meter 114.

The coupling block 192, the stop valve 390, the flow rate meter 114, and the branch adaptor 64 have the structure as described above. The stop valve 390, the flow rate meter 114, the branch adaptor 64 are fixed to the coupling block 192 by a plurality of (four) screw members 424 (see FIG. 31). Further, an annular seal member 425 for suppressing leakage of the fluid to the outside is provided between the stop valve 390 and the flow rate meter 114.

In the connector member 420, in a state where the operation part 402 of the stop valve 390 is placed at the open position, the branch port 36 communicates with the inner hole 64a of the branch adaptor 64 through the fluid channel 192a of the coupling block 192, the first port 394 of the stop valve 390, the through hole 406, the second port 396, and the fluid channel 114a of the flow rate meter 114.

Figure 33:
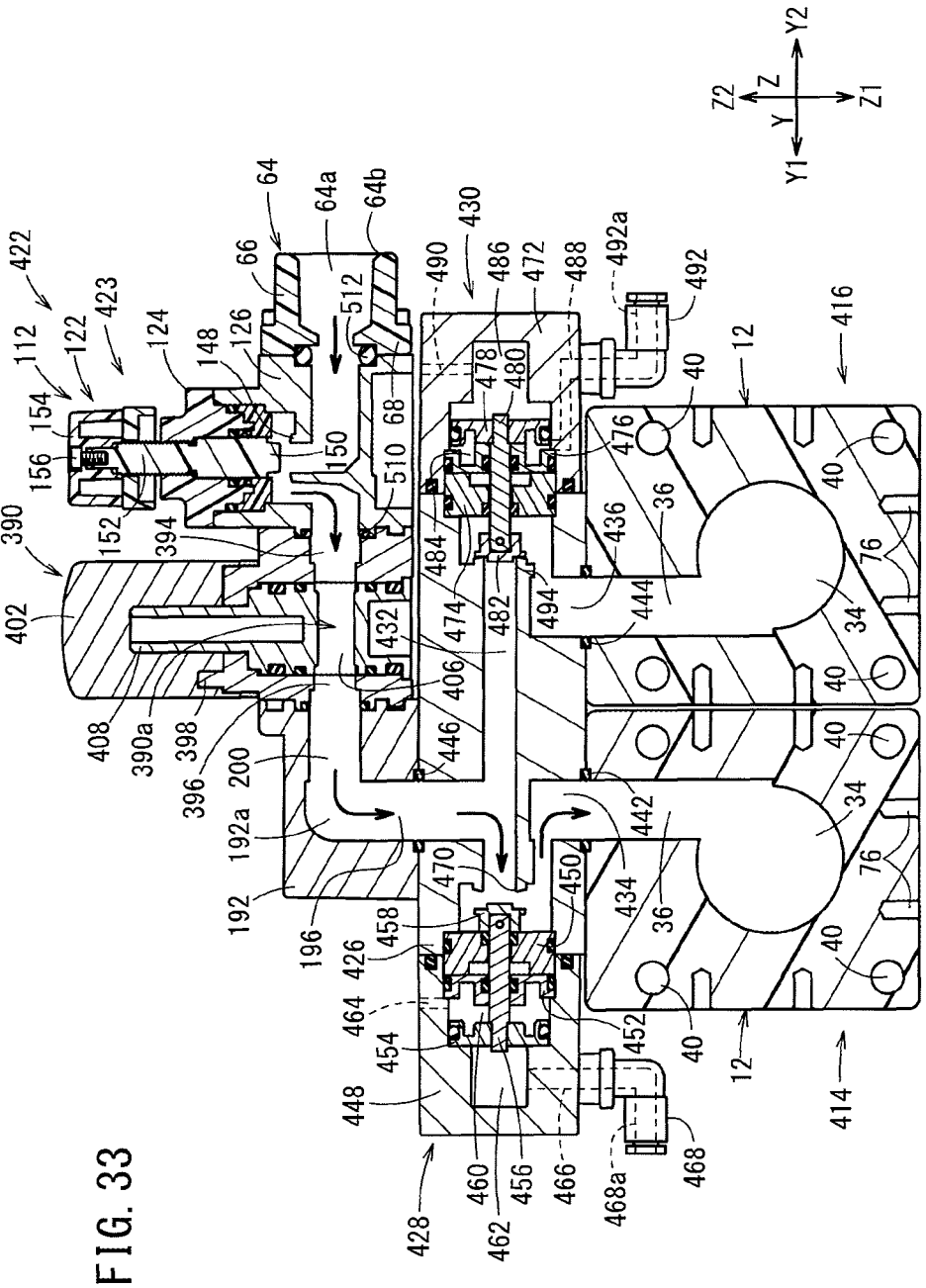
FIG. 33 is a cross sectional view taken along a line XXXIII-XXXIII in FIG. 30.

As shown in FIG. 33, the connector member 422 includes a connector member body 423 and a branch adaptor 64 provided on the connector member body 423. The connector member body 423 includes an intermediate block 426, a third open/close valve 428, a fourth open/close valve 430, a coupling block 192, a stop valve 390, and a flow rate regulating valve 112. The branch adaptor 64 is provided on the flow rate regulating valve 112. The coupling block 192, the stop valve 390, the flow rate regulating valve 112, and the branch adaptor 64 have the structure as described above.

The intermediate block 426 has a substantially rectangular parallelepiped shape, and is attached to the manifold block 12 of the first manifold block group 414 and the manifold block 12 of the second manifold block group 416.

An intermediate channel 432 connected to the fluid channel 192a of the coupling block 192, a first outlet port (first intermediate communication port) 434, and a second outlet port (second intermediate communication port) 436 are formed in the intermediate block 426. The first outlet port 434 connects the branch port 36 of the first manifold block group 414 with the intermediate channel 432. The second outlet port 436 connects the branch port 36 of the second manifold block group 416 with the intermediate channel 432.

The intermediate channel 432 passes through the intermediate block 426 in the longitudinal direction, and is opened on a side surface of the intermediate block 426 in the Z2 direction, the side surface being positioned in a direction perpendicular to the longitudinal direction of the intermediate block 426. The first outlet port 434 and the second outlet port 436 are arranged in the longitudinal direction (Y direction) of the intermediate block 426, and opened on a side surface in the Z1 direction, the side surface being positioned in a direction perpendicular to the longitudinal direction of the intermediate block 426.

An annular seal member 442 for suppressing leakage of the fluid to the outside is provided between the manifold block 12 of the first manifold block group 414 and the intermediate block 426. An annular seal member 444 for suppressing leakage of the fluid to the outside is provided between the manifold block 12 of the second manifold block group 416 and the intermediate block 426.

An annular seal member 446 for suppressing leakage of the fluid to the outside is provided between the intermediate block 426 and the coupling block 192. A hole for providing the third open/close valve 428 is formed at one end surface of the intermediate block 426 in the longitudinal direction (end surface of the intermediate block 426 in the Y1 direction), and a hole for providing the fourth open/close valve 430 is formed at the other end surface of the intermediate block 426 in the longitudinal direction (end surface of the intermediate block 426 in the Y2 direction).

The third open/close valve 428 has the same structure as the above described first open/close valve 224, and includes a valve body 448, an outer end block 450, an inner end block 452, a piston 454, a rod 456, and a valve plug 458. A first chamber 460 is formed between the inner end block 452 and the piston 454, and a second chamber 462 is formed on an opposite side of the inner end block 452 across the piston 454.

A vent port 464 and a drive port 466 are formed in the valve body 448. The vent port 464 communicates with the first chamber 460, and is opened to the atmospheric air. The drive port 466 communicates with the second chamber 462, and suctions/discharges the working fluid. The drive port 466 communicates with an inner hole 468a of a fitting 468 provided on the valve body 448. The valve plug 458 of the third open/close valve 428 is provided in a manner that the valve plug 458 can be seated on a third valve seat 470 formed in the intermediate block 426.

In a state where the valve plug 458 is spaced from the third valve seat 470, the third open/close valve 428 allows the branch port 36 of the first manifold block group 414 and the fluid channel 192a of the coupling block 192 to communicate with each other. Further, in a state where the valve plug 458 is seated on the third valve seat 470, the third open/close valve 428 disconnects the branch port 36 of the first manifold block group 414 from the fluid channel 192a of the coupling block 192.

The fourth open/close valve 430 has the same structure as the above described second open/close valve 226, and includes a valve body 472, an outer end block 474, an inner end block 476, a piston 478, a rod 480, and a valve plug 482. A first chamber 484 is formed between the inner end block 476 and the piston 478, and a second chamber 486 is formed on an opposite side of the inner end block 476 across the piston 478.

A drive port 488 and a vent port 490 are formed in the valve body 472. The drive port 488 communicates with the first chamber 484, and suctions/discharges the working fluid. The vent port 490 communicates with the second chamber 486, and is opened to the atmospheric air. The drive port 488 communicates with an inner hole 492a of a fitting 492 provided on the valve body 472. The valve plug 482 of the fourth open/close valve 430 is provided in a manner that the valve plug 482 can be seated on a fourth valve seat 494 formed in the intermediate block 426.

In a state where the valve plug 482 is spaced from the fourth valve seat 494, the fourth open/close valve 430 connects the branch port 36 of the second manifold block group 416 to the fluid channel 192a of the coupling block 192. Further, in a state where the valve plug 482 is seated on the fourth valve seat 494, the fourth open/close valve 430 disconnects the branch port 36 of the second manifold block group 416 from the fluid channel 192a of the coupling block 192.

Figure 34:
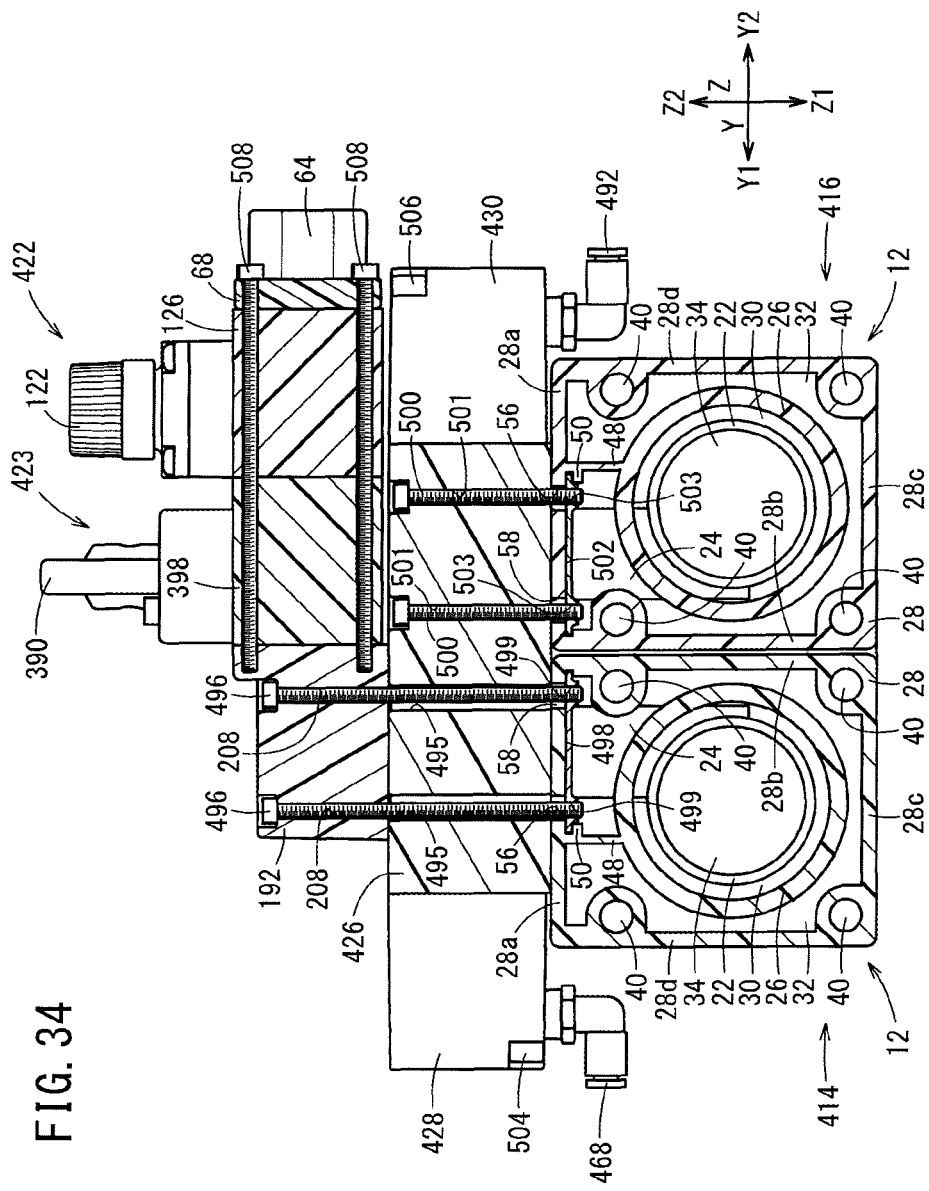
FIG. 34 is a cross sectional view of a structure for connecting a connector member to the manifold block shown in FIG. 33.
Figure 35:
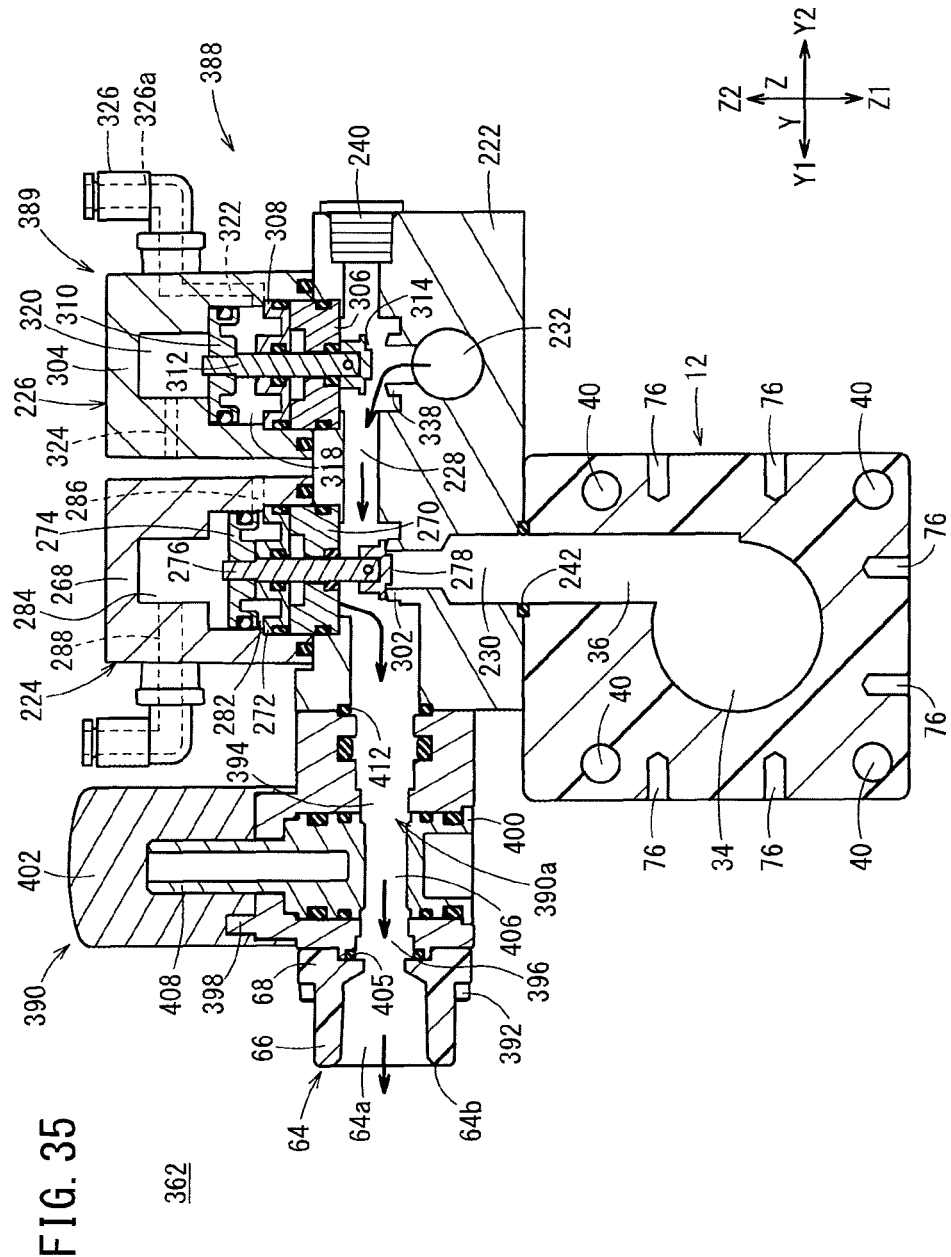
FIG. 35 is a view for explaining operation of a connector member shown in FIG. 29.
Figure 36:
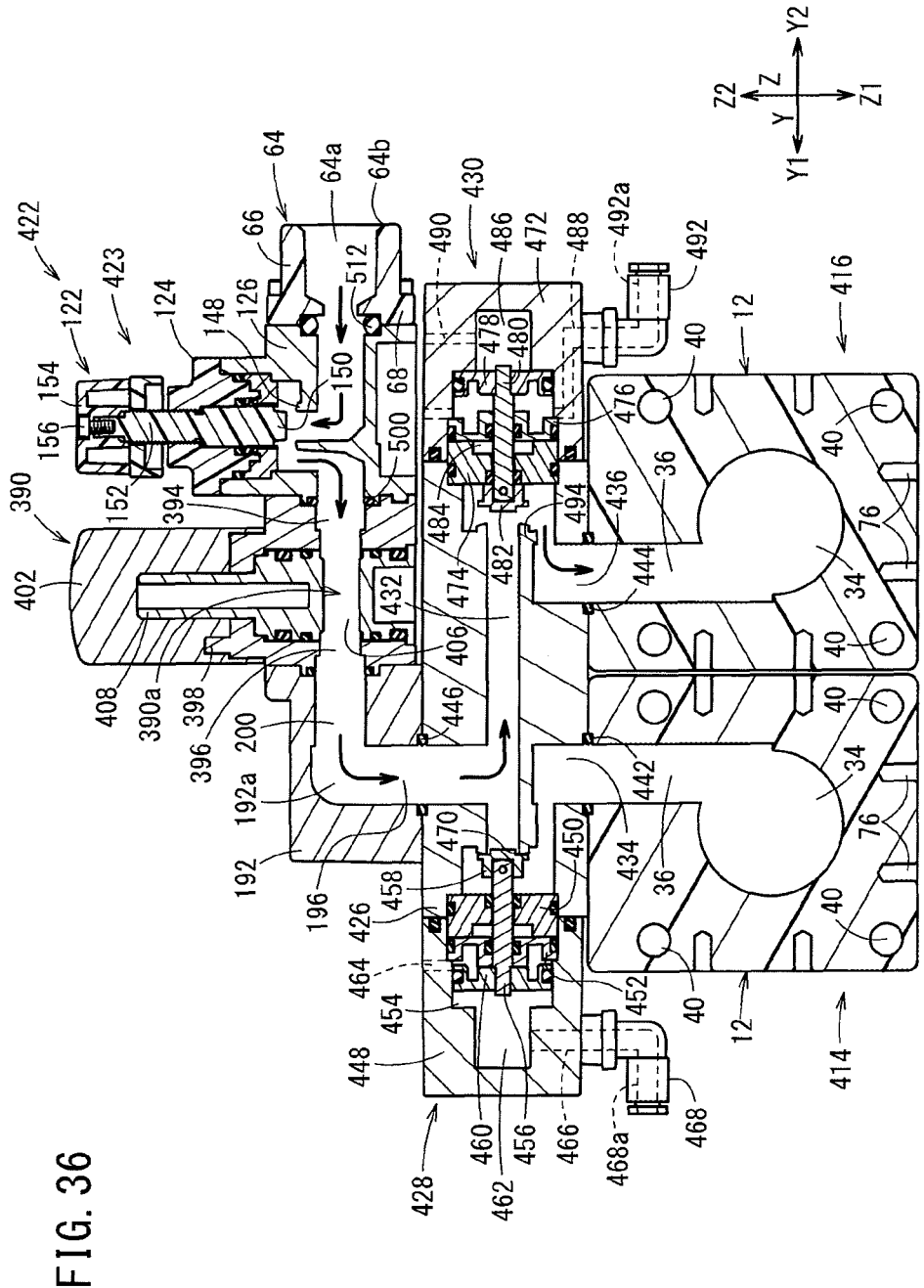
FIG. 36 is a view for explaining operation of a connector member shown in FIG. 33.

As shown in FIG. 34, in the connector member 422, the intermediate block 426 and the coupling block 192 are fixed to fixing plates (fixing members) 498 of the manifold block 12 of the first manifold block group 414 by a plurality of (four) screw members 496. That is, the screw members 496 are inserted into the screw insertion holes 208 of the coupling block 192, the screw insertion holes 495 of the intermediate block 426, the through holes 56, 58 of the manifold block 12 of the first manifold block group 414, and screw engaged with attachment holes 499 formed in the fixing plates 498.

Further, the intermediate block 426 is fixed to fixing plates (fixing members) 502 of the manifold block 12 of the second manifold block group 416 by a plurality of (four) screw members 500. That is, the screw members 500 are inserted into screw insertion holes 501 of the intermediate block 426, and the through holes 56, 58 of the manifold block 12 of the second manifold block group 416, and screw engaged with attachment holes 503 formed in the fixing plates 502.

The third open/close valve 428 is fixed to one end surface of the intermediate block 426 by a plurality of (two) screw members 504, and the fourth open/close valve 430 is fixed to the other end surface of the intermediate block 426 by a plurality of (two) screw members 506 (see FIG. 31). The coupling block 192, the stop valve 390, the flow rate regulating valve 112, and the branch adaptor 64 are fixed to the coupling block 192 by a plurality of (four) screw members 508.

An annular seal member 510 for suppressing leakage of the fluid to the outside is provided between the stop valve 390 and the flow rate regulating valve 112, and an annular seal member 512 for suppressing leakage of the fluid to the outside is provided between the flow rate regulating valve 112 and the branch adaptor 64 (see FIG. 33).

Next, operation of the manifold apparatus 10C according to the embodiment of the present invention will be described. In the case where the first fluid flows toward a plurality of fluid supply destinations 372, in each of the connector members 386 of the first unit 362, the stop valve 390 is opened (see FIG. 28). Further, in each of the connector members 388 of the first unit 362, the stop valve 390 is opened, the valve plug 278 of the first open/close valve 224 is spaced from the first valve seat 302, and the valve plug 314 of the second open/close valve 226 is seated on the second valve seat 338 (see FIG. 29).

Further, in each connector member 420 of the second unit 364, the stop valve 390 is opened (see FIG. 32). Moreover, in each of the connector members 422 of the second unit 364, the valve plug 150 of the flow rate regulating valve 112 is spaced from the valve seat 148 and the stop valve 390 is opened, and the valve plug 458 of the third open/close valve 428 is spaced from the third valve seat 470 and the valve plug 482 of the fourth open/close valve 430 is seated on the fourth valve seat 494 (see FIG. 33).

Then, first fluid is supplied from the first fluid supply source 366 to the inner hole 98a of the main adaptor 98 of the first unit 362 through the first main tube 368. Then, as shown in FIG. 26, the first fluid guided to the inner hole 98a of the main adaptor 98 diverges from the main port 34 of the manifold block 12 into seven branch ports 36, and guided to the four connector members 386 and the three connector members 388. Then, in each of the connector members 386, the first fluid flows through the fluid channel 192a of the coupling block 192, the fluid channel 390a of the stop valve 390, and the inner hole 64a of the branch adaptor 64. The first fluid is guided to each of the four fluid supply destinations 372 through the first branch tubes 370 (see FIG. 28).

Further, in each of the connector members 388, the first fluid flows through the first inlet port 230 of the intermediate block 222, the intermediate channel 228, the fluid channel 390a of the stop valve 390, and the inner hole 64a of the branch adaptor 64. Then, the first fluid is guided to each of the three fluid supply destinations 373 through the first branch tubes 371 (see FIG. 29). At this time, in the connector member 388, since the valve plug 314 of the second open/close valve 226 is seated on the second valve seat 338, the first fluid does not flow into the second fluid supply source 378 through the second inlet port 232.

The first fluid utilized at the four fluid supply destinations 372 is guided to the four connector members 420 of the second unit 364 through the second branch tubes 374, and the first fluid utilized at the three fluid supply destinations 373 is guided to the three connector members 422 of the second unit 364 through the second branch tubes 375. Then, in each of the connector members 420, the first fluid flows through the inner hole 64a of the branch adaptor 64, the fluid channel 114a of the flow rate meter 114, the fluid channel 390a of the stop valve 390, and the fluid channel 192a of the coupling block 192, and then the first fluid is guided to the branch port 36 of the first manifold block group 414 (see FIG. 32).

Further, in each of the connector members 422, the first fluid flows through the inner hole 64a of the branch adaptor 64, the fluid channel 112a of the flow rate regulating valve 112, the fluid channel 390a of the stop valve 390, the fluid channel 192a of the coupling block 192, the intermediate channel 432 of the intermediate block 426, and the first outlet port 434, and the first fluid is guided to the branch port 36 of the first manifold block group 414 (see FIG. 33). At this time, in the connector member 422, since the valve plug 482 of the fourth open/close valve 430 is seated on the fourth valve seat 494, the first fluid does not flow into the branch port 36 of the second manifold block group 416.

In the first manifold block group 414, the first fluid guided to the respective branch ports 36 merges at the main port 34, and the first fluid is returned to the first fluid supply source 366 through the second main tube 376.

At the time of discharging the first fluid in the fluid channel of the fluid flow system 360, the supply of the first fluid from the first fluid supply source 366 to the first unit 362 is stopped. Further, in each of the connector members 388, the valve plug 278 of the first open/close valve 224 is seated on the first valve seat 302, and the valve plug 314 of the second open/close valve 226 is separated from the second valve seat 338 (see FIG. 35). Further, in each of the connector members 422, the valve plug 458 of the third open/close valve 428 is seated on the third valve seat 470, and the valve plug 482 of the fourth open/close valve 430 is separated from the fourth valve seat 494 (see FIG. 36).

The second fluid is supplied from the second fluid supply source 378 to each of the connector members 388 of the first unit 362 through the inlet tube 380. In each of the connector members 388, the second fluid flows through the second inlet port 232, the intermediate channel 228 of the intermediate block 222, the fluid channel 390a of the stop valve 390, and the inner hole 64a of the branch adaptor 64. The second fluid is guided to each of the three fluid supply destinations 373 through the first branch tubes 371. At this time, in the connector member 388, since the valve plug 278 of the first open/close valve 224 is seated on the first valve seat 302, the second fluid does not flow into the branch port 36 of the first unit 362.

After the second fluid flows through the three fluid supply destinations 373, the second fluid is guided to each of the three connector members 422 of the second unit 364 through the second branch tubes 375. Then, in the connector member 422, the second fluid flows through the inner hole 64a of the branch adaptor 64, the fluid channel 112a of the flow rate regulating valve 112, the fluid channel 390a of the stop valve 390, the fluid channel 192a of the coupling block 192, and the intermediate channel 432 of the intermediate block 426, and then the second fluid is guided to the branch port 36 of the second manifold block group 416 (see FIG. 36). At this time, in the connector member 422, since the valve plug 458 of the third open/close valve 428 is seated on the third valve seat 470, the second fluid does not flow into the branch port 36 of the first manifold block group 414. The second fluid guided into the respective branch ports 36 of the second manifold block group 416 merges at the main port 34, and the second fluid is discharged into the discharge part 384 through the discharge tube 382.

In the structure, the first fluid remaining in the fluid channels of the connector members 388 (intermediate channel 432 of the intermediate block 426, the fluid channel 390a of the stop valve 390, the inner hole 64a of the branch adaptor 64), the first branch tube 371, the fluid channels of the connector members 422 (the inner hole 64a of the branch adaptor 64, the fluid channel 112a of the flow rate regulating valve 112, the fluid channel 390a of the stop valve 390, the fluid channel 192a of the coupling block 192, and the intermediate channel 432 of the intermediate block 426) can be discharged into the discharge part 384 by the second fluid.

In the embodiment of the present invention, it is possible to attach the connector members 388 and the connector members 422 used for flushing, to the manifold blocks 12 for causing the first fluid to diverge or merge. In the structure, in comparison with the case of providing the manifold apparatus 10C used for flushing separately and additionally, it is possible to reduce the installation area (footprint) of the manifold apparatus 10C.

Fourth Embodiment

Next, a fluid flow system 520 including a manifold apparatus 10D according to a fourth embodiment of the present invention will be described with reference to FIGS. 37 to 40. The constituent elements of the manifold apparatus 10D according to the fourth embodiment that are identical to those of the above described manifold apparatuses 10A to 10C are labeled with the same reference numeral, and detailed description thereof is omitted.

Figure 37:
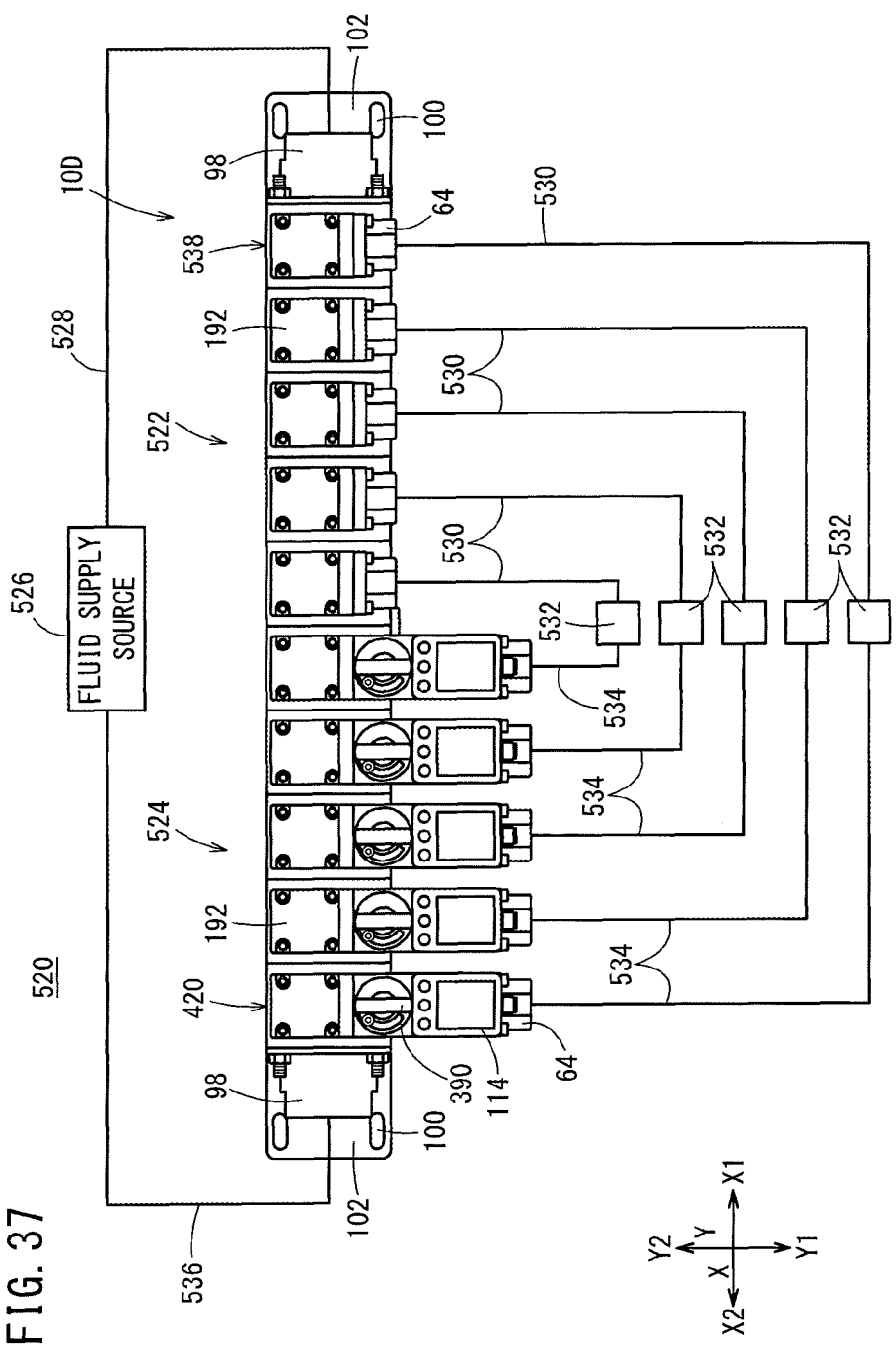
FIG. 37 is a view schematically showing a fluid flow system including a manifold apparatus according to a fourth embodiment of the present invention.

As shown in FIG. 37, the fluid flow system 520 includes the manifold apparatus 10D formed by combining a first unit 522 and a second unit 524. The fluid flow system 520 is configured to return the fluid from a fluid supply source 526 to this fluid supply source 526 through a first main tube 528, the first unit 522, first branch tubes 530, fluid supply destinations 532, second branch tubes 534, the second unit 524, and a second main tube 536.

Figure 38:
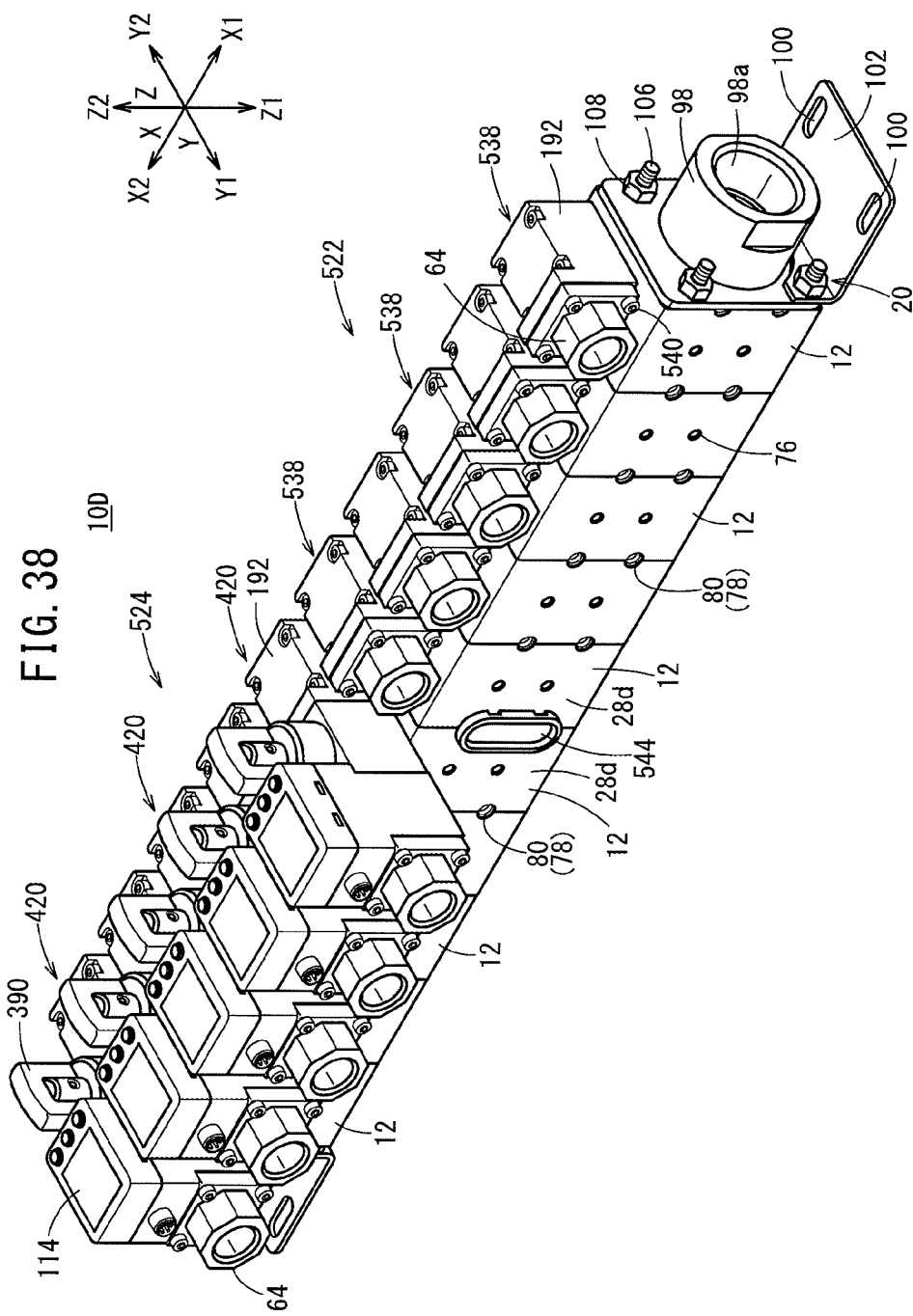
FIG. 38 is a perspective view of the manifold apparatus shown in FIG. 37.
Figure 39:
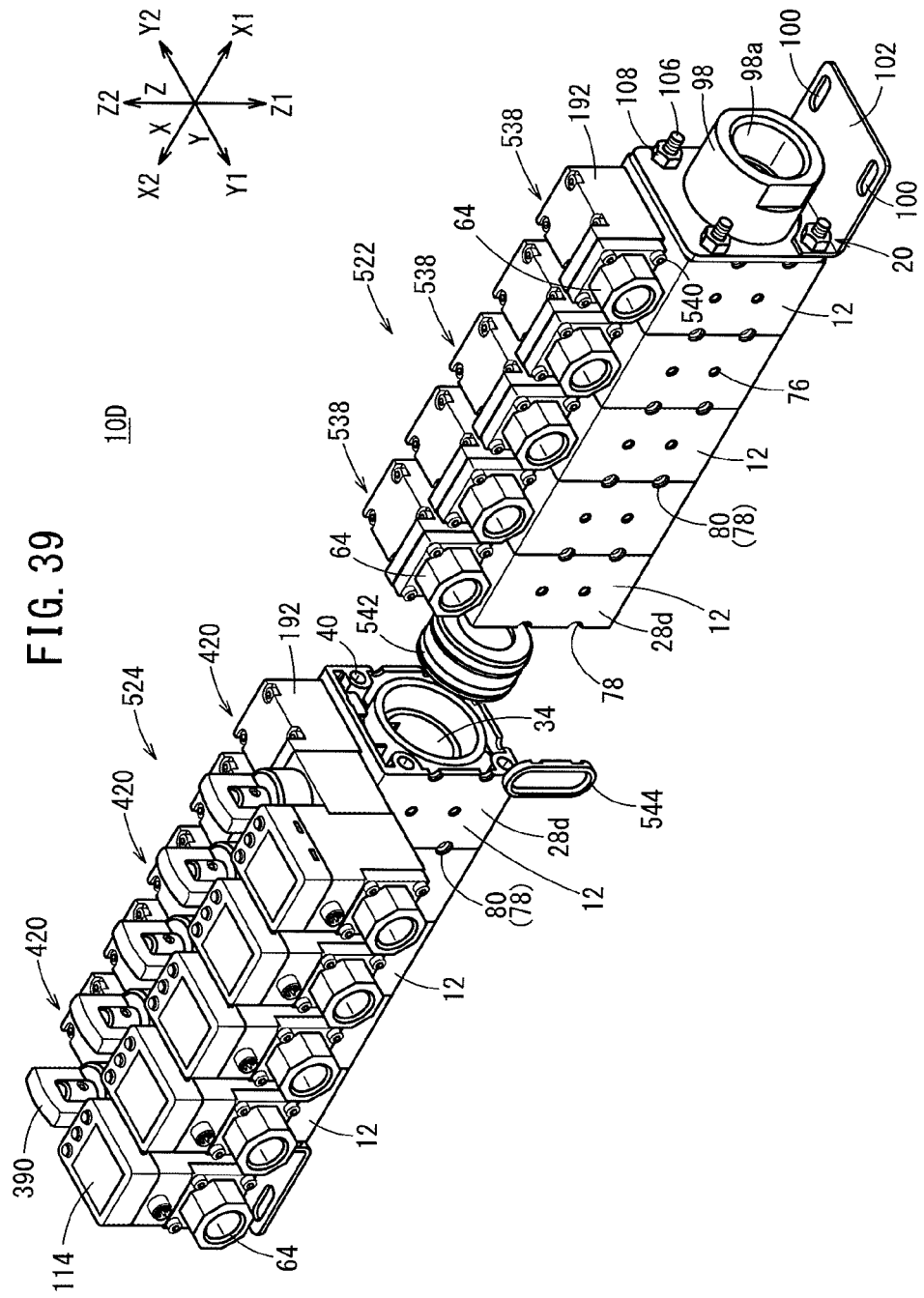
FIG. 39 is an exploded perspective view of the manifold apparatus shown in FIG. 38.
Figure 40:
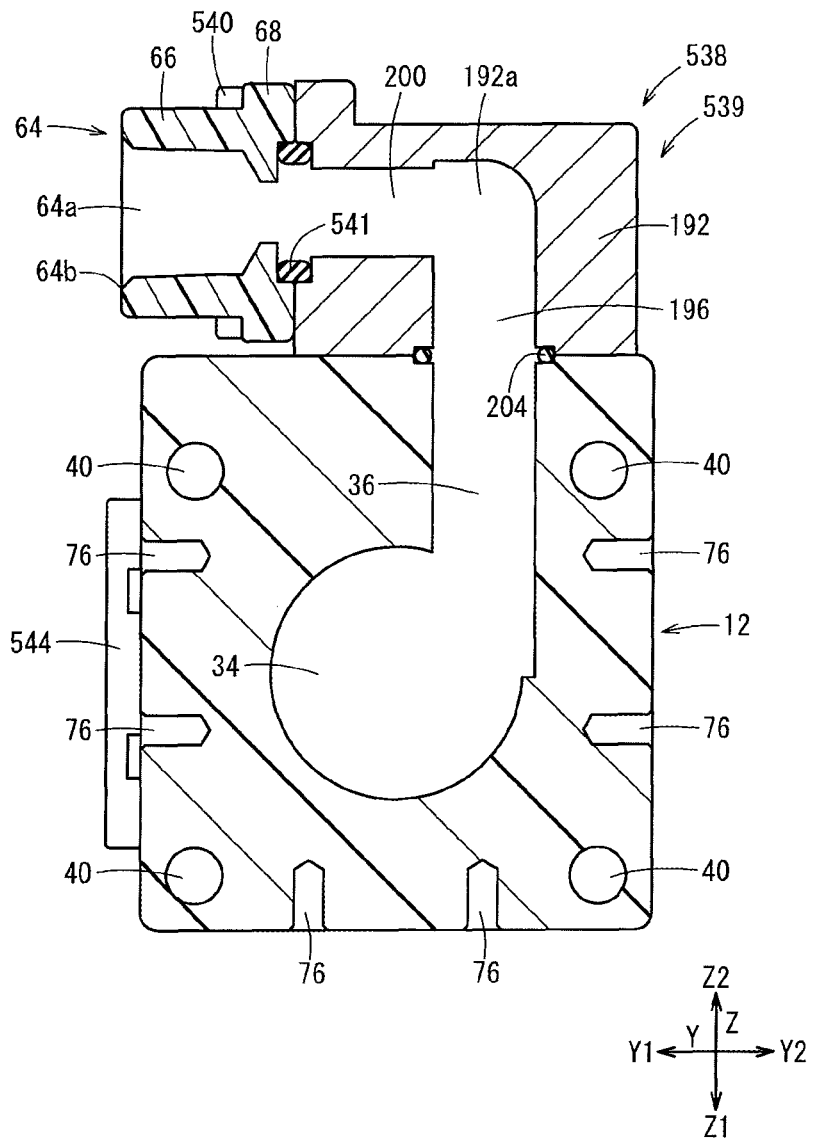
FIG. 40 is a cross sectional view of a connector member and a manifold block of a first unit of the manifold apparatus shown in FIG. 37.

As shown in FIGS. 38 and 39, the manifold apparatus 10D is formed by coupling a plurality of (e.g., 10) manifold blocks 12 together in a line. Five blocks of the manifold blocks 12 arranged in the X1 direction form the first unit 522, and the other five manifold blocks 12 arranged in the X2 direction form the second unit 524. A connector member 538 is attached to each of the manifold blocks 12 of the first unit 522. The connector member 538 includes a connector member body 539 having a coupling block 192 for coupling the branch adaptor 64 and the manifold block 12 (see FIG. 40). The coupling block 192 and the branch adaptor 64 have the structure as described above.

The branch adaptor 64 is fixed to the coupling block 192 by a plurality of (four) screw members 540. In the connector member 538, the branch port 36 communicates with the inner hole 64a of the branch adaptor 64 through the fluid channel 192a of the coupling block 192 (see FIG. 40). An annular seal member 541 for suppressing leakage of the fluid to the outside is provided between the coupling block 192 and the branch adaptor 64. The above described connector member 420 is attached to each of the manifold blocks 12 of the second unit 524.

In FIG. 39, instead of the coupling pipe 14, a closing member 542 is provided between the first unit 522 and the second unit 524. The closing member 542 has a shape designed to close the inner hole 14a of the coupling pipe 14. The closing member 542 interrupts communication between the main port 34 of the first unit 522 and the main port 34 of the second unit 524.

Further, an indication member 544 indicating a boundary between the first unit 522 and the second unit 524 is provided on the manifold apparatus 10D. The indication member 544 has the same structure as the leg 82 as described above, and detailed description thereof is omitted. The indication member 544 is attached to two mount holes 80 formed between a fourth wall 28d of the manifold block 12 of the first unit 522 and a fourth wall 28d of the manifold block 12 of the second unit 524.

FIG. 38 shows an example where the indication member 544 is attached to a side of the manifold blocks 12 in the Y1 direction. It is a matter of course that the indication member 544 may be attached to a side of the manifold blocks 12 in the Y2 direction. The indication member 544 may be colored in a color (e.g., blue) which is different from the color of the manifold blocks 12. In this manner, it is possible to highlight the indication member 544 with respect to the manifold blocks 12.

In the embodiment of the present invention, it is possible to provide the first unit 522 and the second unit 524 integrally in a coupling direction of the manifold blocks 12. Further, since the position of the closing member 542 can be indicated by the indication member 544, it is possible to easily recognize the boundary between the first unit 522 and the second unit 524.

In the embodiment of the present invention, instead of the connector member 538, for example, the first unit 522 may be provided with any of the above described connector members 62, 110, 190, 386, 420. Further, instead of the connector member 420, the second unit 524 may be provided with, for example, any of the above described connector members 62, 110, 190, 386, 538.

Fifth Embodiment

Next, a manifold apparatus 10E according to a fifth embodiment will be described with reference to FIGS. 41 to 42B. The constituent elements of the manifold apparatus 10E according to the fifth embodiment that are identical to those of the above described manifold apparatus 10A to 10D are labeled with the same reference numeral, and detailed description thereof is omitted.

Figure 41:
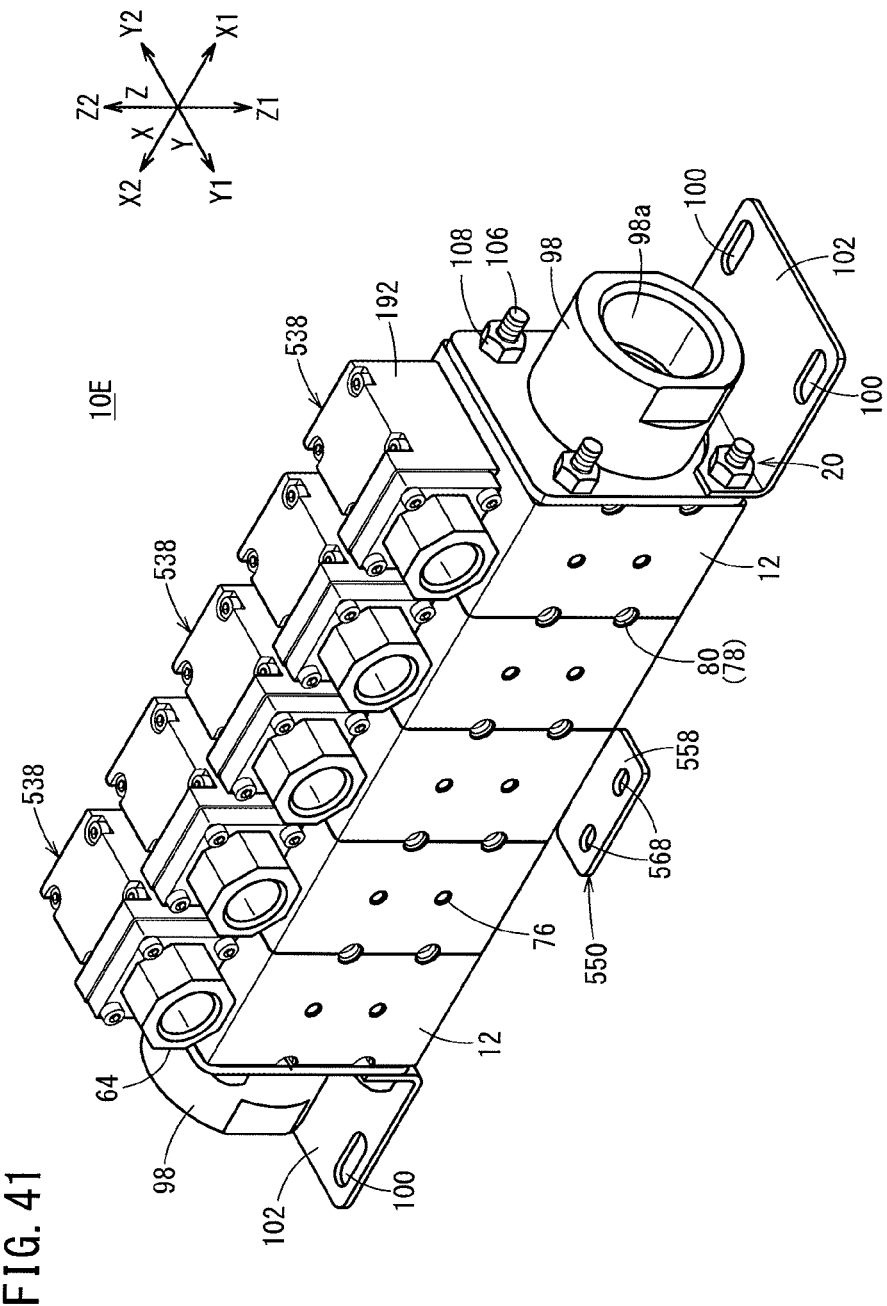
FIG. 41 is a perspective view of a manifold apparatus according to a fifth embodiment of the present invention.
Figure 42A:
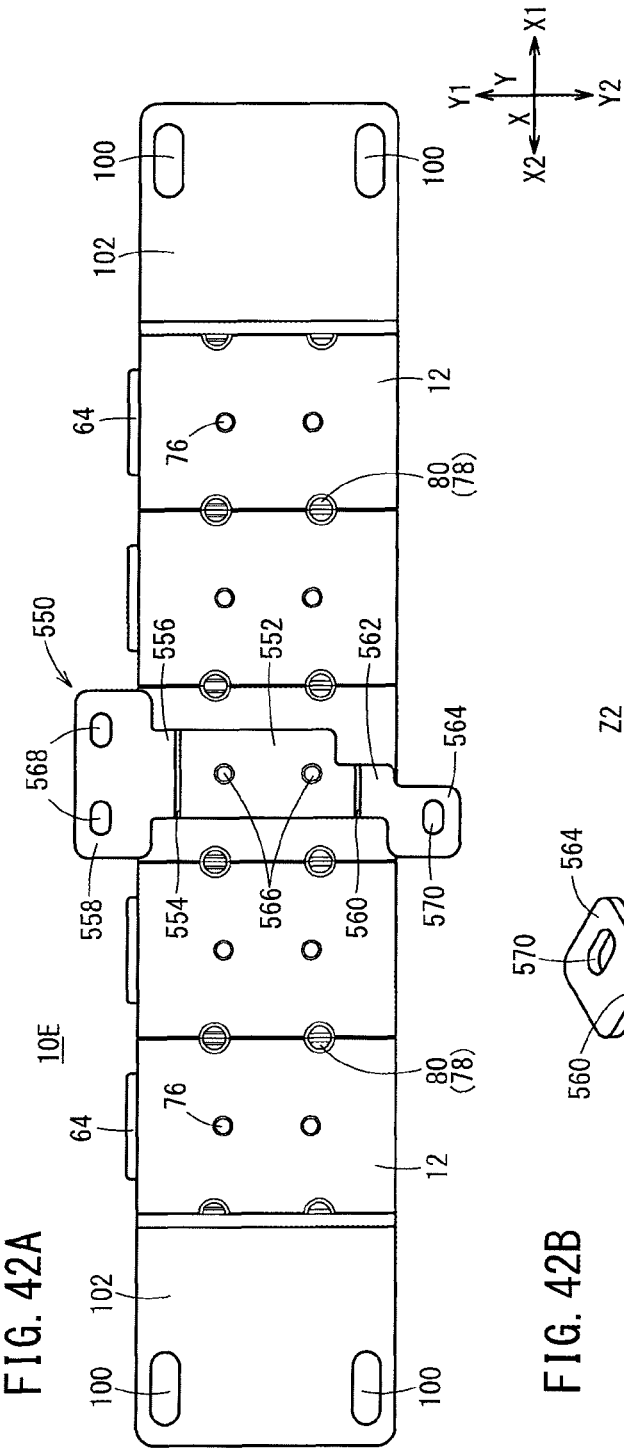
FIG. 42A is a bottom view of the manifold apparatus shown in FIG. 41.

As shown in FIGS. 41 and 42A, the manifold apparatus 10E according to the embodiment of the present invention is formed by coupling a plurality of (e.g., 5) manifold blocks 12 together in a line. The above described connector members 538 are attached to the manifold blocks 12. A fixing member 550 for fixing the manifold blocks 12 to the installation location 700 is attached to the manifold block 12 positioned at the center in the coupling direction.

Figure 42B:
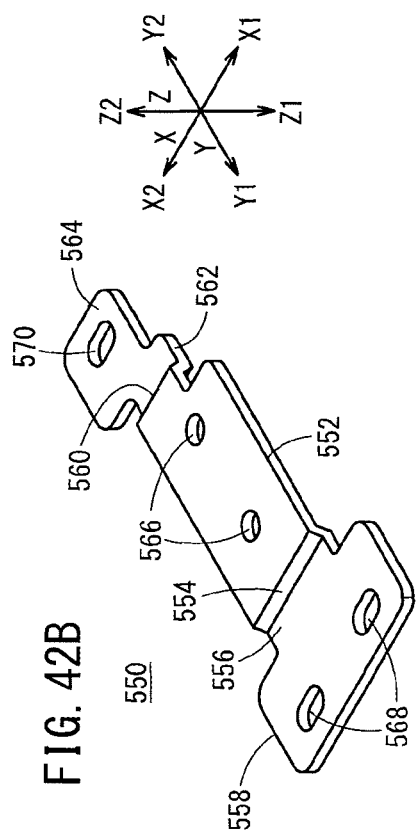
FIG. 42B is a perspective view of a fixing member.

As shown in FIGS. 42A and 42B, the fixing member 550 is a plate shaped member extending in one direction (Y direction). The fixing member 550 includes a rectangular central part 552, a first extension 556 extending from the central part 552 in the Y1 direction through a first step 554, a first end 558 provided on the first extension 556, a second extension 562 extending from the central part 552 in the Y2 direction through a second step 560, and a second end 564 provided on the second extension 562.

Two central holes 566 are formed at the central part 552 in a longitudinal direction of the fixing member 550. The pitch of the central holes 566 is the same as the pitch of the fixing holes 76. The first step 554 protrudes from the central part 552 in the Z1 direction. The first step 554 is provided over the entire width of the central part 552. The first extension 556 has the same width as the first step 554. The first end 558 extends toward both sides beyond the first extension 556 in the X direction. Two first installation holes 568 elongated in the X direction are formed at the first end 558. The first installation holes 568 are arranged in the X direction.

The second step 560 protrudes from the central part 552 in the Z2 direction by the same size as the first step 554. The second step 560 is provided so as to extend from the center of the central part 552 in the width direction (X direction) to the end in the X2 direction. The second extension 562 has the same width as the second step 560. The second end 564 extends beyond the second extension 562 in the X2 direction. One second installation hole 570 is formed in the second end 564. The second installation hole 570 is elongated in the X direction.

The fixing member 550 having the above structure is attached to the manifold block 12 by inserting two tapping screws through the central holes 566 of the fixing member 550 and tightening the two tapping screws respectively into the fixing holes 76 in the Z1 direction of the manifold block 12 positioned at the center. At this time, the first end 558 is arranged at a position protruding from the manifold block 12 in the Y1 direction, and the second end 564 is arranged at a position protruding from the manifold block 12 in the Y2 direction.

Then, screw members (not shown) are inserted into the first installation holes 568 of the first end 558 and the second installation hole 570 of the second end 564, and these screw members are tightened to the installation location 700. In this manner, the manifold block 12 is fixed to the installation location 700 through the fixing member 550. Thus, it is possible to reliably fix the manifold apparatus 10E to the installation location 700.

In the embodiment of the present invention, instead of the connector member 538, the manifold apparatus 10E may be provided with, for example, any of the above described connector members 62, 110, 190, 386, 420.

Sixth Embodiment

Next, a manifold apparatus 10F according to a sixth embodiment of the present invention will be described with reference to FIGS. 43 and 44. The constituent elements of the manifold apparatus 10F according to the sixth embodiment that are identical to those of the manifold apparatuses 10A to 10E are labeled with the same reference numeral, and description thereof is omitted.

Figure 43:
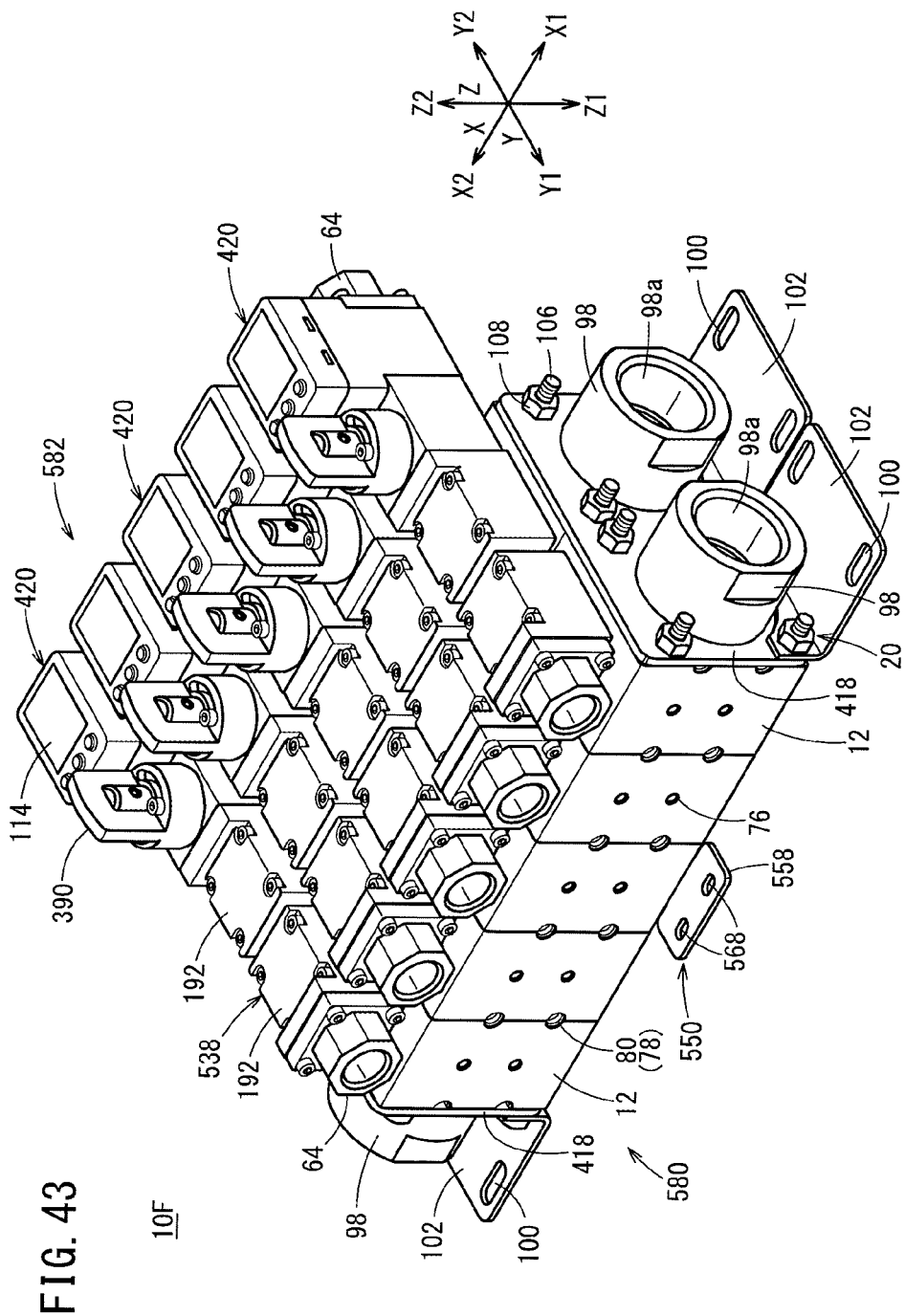
FIG. 43 is a perspective view of a manifold apparatus according to a sixth embodiment of the present invention.
Figure 44:
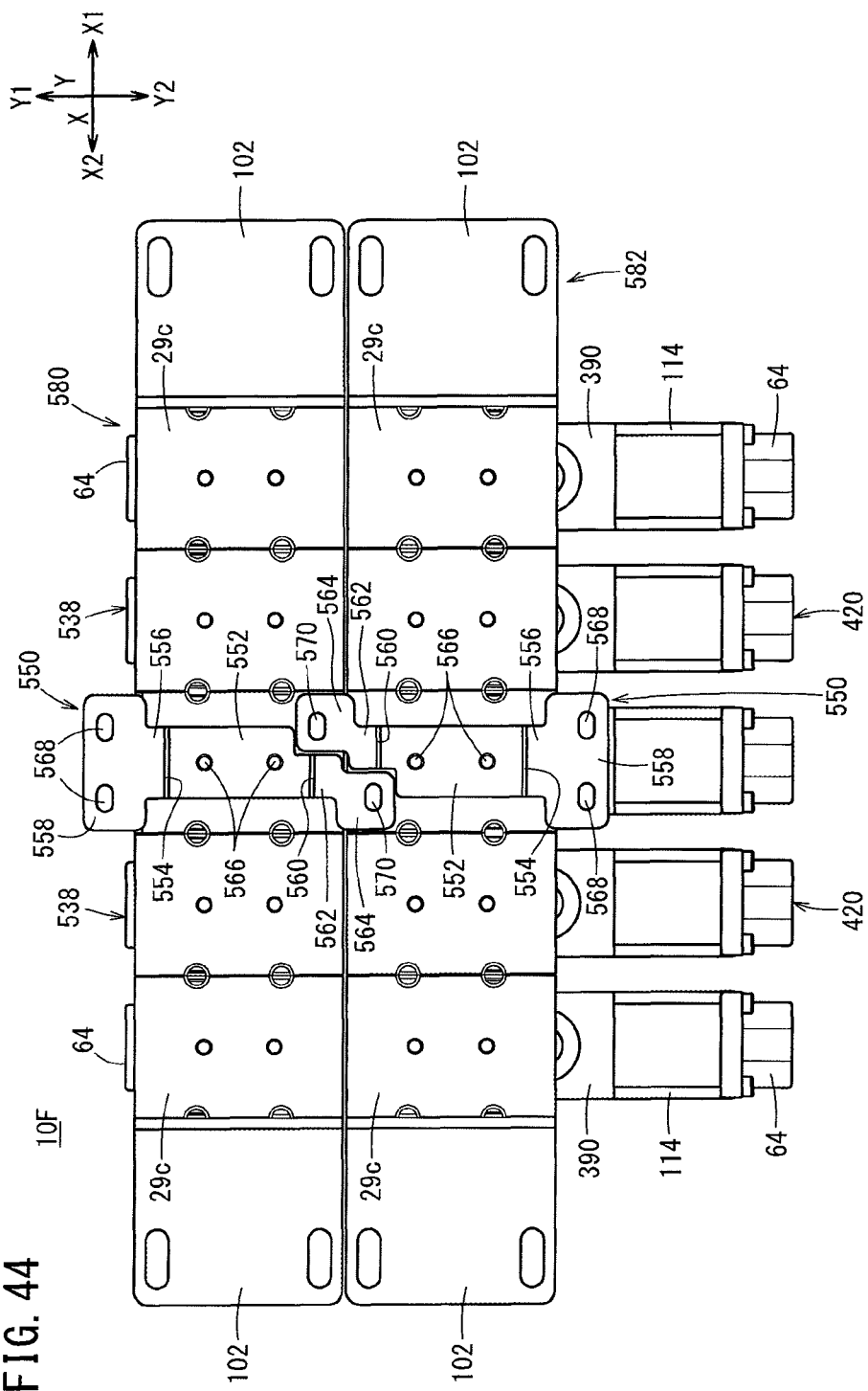
FIG. 44 is a bottom view of a manifold apparatus shown in FIG. 43.

As shown in FIGS. 43 and 44, the manifold apparatus 10F according to the embodiment of the present invention includes a first unit 580 and a second unit 582 arranged in the Y direction. The first unit 580 has the same structure as the above described manifold apparatus 10E according to the fifth embodiment. Therefore, detailed description of the first unit 580 is omitted.

The second unit 582 is formed by coupling a plurality of (e.g., 5) manifold blocks 12 together in a line. The above described connector member 420 is attached to each of the manifold blocks 12 of the second unit 582. End plates 418 according to the embodiment of the present invention fix the manifold blocks 12 of the first unit 580 and the manifold blocks 12 of the second unit 582 by sandwiching these manifold blocks 12 from both sides.

A fixing member 550 is attached to an outer surface 29c in the Z1 direction, of the manifold block 12 at the center in the coupling direction in the second unit 582, in a manner that the first end 558 of the fixing member 550 is oriented in the Y2 direction, and the second end 564 of the fixing member 550 is oriented in the Y1 direction. The orientation of the fixing member 550 of the second unit 582 is different from the orientation of the fixing member 550 of the first unit 580 by 180°. In the structure, it is possible to position the second end 564 of the fixing member 550 of the second unit 582 without any interference with the second end 564 of the fixing member 550 of the first unit 580.

In this case, by inserting four screw members (not shown) into the first installation holes 568 of the fixing member 550 of the first unit 580 and the first installation holes 568 of the fixing member 550 of the second unit 582 and tightening the four screw members with respect to the installation location 700, it is possible to easily and reliably fix the first unit 580 and the second unit 582 to the installation location 700.

In the embodiment of the present invention, for example, instead of the connector member 538, any of the above described connector members 62, 110, 190, 386, 420 may be provided on the first unit 580. Further, for example, instead of the connector member 420, any of the above described connector members 62, 110, 190, 386, 538 may be provided on the second unit 582.

The manifold apparatus according to the present invention is not limited to the above described embodiments. It is a matter of course that various structures may be adopted without deviating from the scope of the present invention.

What is claimed is:

1. A manifold apparatus comprising:
    a plurality of manifold blocks coupled together in a line; and
    a plurality of connector members each provided on an outer surface of each of the manifold blocks, branch tubes being attachable to and detachable from the connector members,
    the manifold blocks each comprising:
    a main port for a passage of fluid, the main port extending through the manifold block in a coupling direction in which the plurality of manifold blocks are coupled together; and
    a branch port opened on the outer surface of the manifold block, the branch port being configured to allow an inner hole of each of the branch tubes attached to the connector members and the main port to communicate with each other;
    an axial line of the branch port of each of the manifold blocks is deviated from an axial line of the main port in a direction perpendicular to the coupling direction; and
    the plurality of manifold blocks are coupled together in a state where adjacent ones of the manifold blocks are inverted 180° relative to adjacent manifold blocks about an axis extending parallel to an axial direction of the branch port,
    wherein said outer surface of each of the manifold blocks has, in a circumferential direction of an opening of the branch port, a plurality of holes adapted to receive a fastener for fastening one of said connector members, and wherein a center that is equidistant from the plurality of said holes is out of alignment with a line connecting the centers of manifold blocks,
    wherein each of the manifold blocks further comprises:
    an inner pipe having an inner hole as the main port;
    an outer pipe provided around the inner pipe, and extending beyond the inner pipe on both sides in the coupling direction; and
    an inner joining portion configured to join the inner pipe and the outer pipe together,
    wherein the manifold apparatus further includes a coupling pipe fitted into each of the adjacent outer pipes, and the coupling pipe is configured to allow the inner holes of the adjacent inner pipes to communicate with each other,
    wherein each of the manifold blocks further comprises:
    a rectangular ring shaped outer frame provided around the outer pipe and forming the outer surface of the manifold block; and
    an outer joining portion configured to join the outer pipe and the outer frame together,
    wherein each manifold block further comprises:
    screw members configured to attach the connector member to the manifold block; and
    fixing members configured to be inserted between the outer frame and the outer pipe,
    wherein a plurality of screw insertion holes are formed in the connector member, and the screw members are inserted into the screw insertion holes; wherein:
    a plurality of through holes are formed in the outer frame, and the screw members are inserted into the through holes;
    a plurality of attachment holes are formed in the fixing members, the screw members being brought into screw engagement with the attachment holes;
    the connector members and the fixing members are replaceable with a plurality of types of connector members having different pitches of the screw insertion holes, and a plurality of types of fixing members with the attachment holes having pitches corresponding to the pitches of the screw insertion holes; and
    each of the through holes has a size configured to communicate with the screw insertion holes of the plurality of types of the connector members and a plurality of types of the attachment holes.

2. The manifold apparatus according to claim 1, further comprising:
    two main adaptors provided so as to sandwich the manifold blocks coupled together from both sides thereof in the coupling direction, main tubes being attachable to and detachable from the main adaptors,
    wherein the main port communicates with an inner hole of each of the main tubes attached to the main adaptors.

3. The manifold apparatus according to claim 1, further comprising a leg configured to support the manifold blocks coupled together,
    wherein the leg is attached to another outer surface of the manifold block that is different from the outer surface where the connector member is provided.

4. The manifold apparatus according to claim 3, wherein a cutout opened in the coupling direction is formed in the outer surface of each of the manifold blocks;
    the cutouts of the manifold blocks that are adjacent to each other are connected together to form a mount hole; and
    the leg has a shaft configured to be attached to and detached from the mount hole.

5. The manifold apparatus according to claim 1, wherein each connector member comprises:
    a branch adaptor, the branch tube being attachable to and detachable from the branch adaptor; and
    a connector member body configured to couple the branch adaptor and the manifold block.

6. The manifold apparatus according to claim 5, wherein the connector member body includes at least one of a flow rate regulating valve, a stop valve, and a flow rate meter.

7. The manifold apparatus according to claim 5, wherein the connector member body comprises a coupling block having a fluid channel configured to allow an inner hole of the branch adaptor and the branch port to communicate with each other, and
    the fluid channel comprises:
    a first communication port opened on a first outer surface of the coupling block, and communicating with the branch port; and a second communication port opened on a second outer surface extending perpendicularly to the first outer surface, and communicating with the inner hole of the branch adaptor.

8. The manifold apparatus according to claim 5, wherein the connector member body comprises:
    an intermediate block provided on the outer surface of the manifold block; and
    a first open/close valve and a second open/close valve provided on the intermediate block,
    the intermediate block comprises:
    an intermediate channel communicating with an inner hole of the branch adaptor;
    a first intermediate communication port configured to allow the branch port and the intermediate channel to communicate with each other; and
    a second intermediate communication port communicating with the intermediate channel, wherein fluid which is different from fluid flowing through the branch port flows through the second intermediate communication port,
    and wherein the first open/close valve is configured to open and close the first intermediate communication port; and
    the second open/close valve is configured to open and close the second intermediate communication port.

9. The manifold apparatus according to claim 1, wherein the manifold apparatus further comprises:
    a first unit configured to cause fluid supplied from a fluid supply source to diverge into a plurality of channels, and guide the fluid to a plurality of fluid supply destinations; and
    a second unit configured to cause the fluid utilized at each of the fluid supply destinations to merge, and guide the fluid to the fluid supply source; and
    each of the first unit and the second unit is formed by coupling the plurality of manifold blocks provided with the connector members.

10. The manifold apparatus according to claim 9, wherein the first unit and the second unit are provided integrally by coupling the manifold blocks together; and
    a closing member configured to interrupt communication between the main ports of the manifold blocks that are adjacent to each other is provided between the first unit and the second unit.

11. The manifold apparatus according to claim 10, further comprising an indication member attached to the manifold block to indicate a position of the closing member.

12. The manifold apparatus according to claim 1, wherein the manifold apparatus further comprises a fixing member configured to fix the plurality of manifold blocks coupled together to an installation location where the manifold apparatus is installed; and
    the fixing member is attached to another outer surface of the manifold block that is different from the outer surface where the connector member is provided.

* * * * *